US012345014B2

(12) United States Patent
Kunizawa et al.

(10) Patent No.: US 12,345,014 B2
(45) Date of Patent: Jul. 1, 2025

(54) SWIVELING WORKING MACHINE

(71) Applicant: KUBOTA CORPORATION, Osaka (JP)

(72) Inventors: Teruo Kunizawa, Osaka (JP); Junki Ito, Osaka (JP); Yoshiaki Araki, Osaka (JP); Takahiro Takaki, Osaka (JP); Go Takaki, Osaka (JP); Akihiro Kishimoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 467 days.

(21) Appl. No.: 17/744,926

(22) Filed: May 16, 2022

(65) Prior Publication Data

US 2022/0275601 A1 Sep. 1, 2022

Related U.S. Application Data

(63) Continuation of application No. PCT/JP2020/042647, filed on Nov. 16, 2020.

(30) Foreign Application Priority Data

Nov. 18, 2019 (JP) .................................. 2019-208094
Nov. 18, 2019 (JP) .................................. 2019-208095
(Continued)

(51) Int. Cl.
*E02F 3/32* (2006.01)
*E02F 3/42* (2006.01)
(Continued)

(52) U.S. Cl.
CPC .............. *E02F 3/325* (2013.01); *E02F 3/425* (2013.01); *E02F 9/0866* (2013.01);
(Continued)

(58) Field of Classification Search
CPC ....... E02F 9/0866; E02F 9/0883; E02F 9/123; E02F 9/163; E02F 9/2091; E02F 9/2095;
(Continued)

(56) References Cited

U.S. PATENT DOCUMENTS 6,199,307 B1    3/2001  Kagoshima et al.
9,297,143 B2 *  3/2016  Murakami ............ E02F 9/2275
(Continued)

FOREIGN PATENT DOCUMENTS

DE    11 2019 000 007 T5    12/2020
JP           03-076711 U      7/1991
(Continued)

OTHER PUBLICATIONS

European Search Report dated Nov. 24, 2023 in family member European Patent Application No. 20889783.5.
(Continued)

*Primary Examiner* — Kira Nguyen
(74) *Attorney, Agent, or Firm* — Greenblum & Bernstein, P.L.C.

(57) ABSTRACT

A swiveling working machine includes a swivel base; a working device provided on a front side of the swivel base; a battery unit; an electric motor that is driven by electric power output by the battery unit; and a hydraulic pump that delivers a hydraulic fluid by driving of the electric motor. The battery unit is disposed at a rear portion of the swivel base. The electric motor and the hydraulic pump are disposed sideward of the battery unit side by side in a front-rear direction.

14 Claims, 31 Drawing Sheets

(30) Foreign Application Priority Data

| Nov. 18, 2019 | (JP) | 2019-208096 |
| --- | --- | --- |
| Nov. 18, 2019 | (JP) | 2019-208097 |
| Nov. 18, 2019 | (JP) | 2019-208098 |
| Nov. 18, 2019 | (JP) | 2019-208099 |
| Nov. 18, 2019 | (JP) | 2019-208100 |

(51) Int. Cl.
| | |
| --- | --- |
| *E02F 9/08* | (2006.01) |
| *E02F 9/12* | (2006.01) |
| *E02F 9/16* | (2006.01) |
| *E02F 9/20* | (2006.01) |
| *F01P 5/02* | (2006.01) |
| *F01P 7/02* | (2006.01) |
| *E02F 3/38* | (2006.01) |
| *E02F 9/22* | (2006.01) |

(52) U.S. Cl.
CPC ............ *E02F 9/0883* (2013.01); *E02F 9/123* (2013.01); *E02F 9/163* (2013.01); *E02F 9/2091* (2013.01); *E02F 9/2095* (2013.01); *F01P 5/02* (2013.01); *F01P 7/02* (2013.01); *E02F 3/384* (2013.01); *E02F 9/2225* (2013.01); *E02F 9/2285* (2013.01); *E02F 9/2292* (2013.01); *E02F 9/2296* (2013.01)

(58) Field of Classification Search
CPC ..... E02F 9/2225; E02F 9/2285; E02F 9/2292; E02F 9/2296; F01P 5/02; F01P 7/02
USPC .......................................................... 701/50
See application file for complete search history.

(56) References Cited

U.S. PATENT DOCUMENTS

| | | | | |
| --- | --- | --- | --- | --- |
| 2006/0108309 | A1* | 5/2006 | Sato | E02F 3/325 |
| | | | | 212/232 |
| 2009/0235879 | A1 | 9/2009 | Ikeda | |
| 2012/0325568 | A1 | 12/2012 | Takeo | |
| 2013/0318956 | A1 | 12/2013 | Yunoue et al. | |
| 2014/0288768 | A1* | 9/2014 | Fujiwara | E02F 9/226 |
| | | | | 701/33.4 |
| 2014/0360354 | A1* | 12/2014 | Kurushima | E02F 9/2275 |
| | | | | 92/145 |
| 2015/0266386 | A1 | 9/2015 | Matsuda et al. | |
| 2017/0349039 | A1* | 12/2017 | Rayner | B62K 27/14 |
| 2018/0362098 | A1* | 12/2018 | Staal | B62D 21/186 |

FOREIGN PATENT DOCUMENTS

| | | |
| --- | --- | --- |
| JP | 11-140906 A | 5/1999 |
| JP | 2000-130161 A | 5/2000 |
| JP | 2002180501 A | 6/2002 |
| JP | 2006161606 A | 6/2006 |
| JP | 2007-321463 A | 12/2007 |
| JP | 2008019589 A | 1/2008 |
| JP | 2009-220811 A | 10/2009 |
| JP | 2011020640 A | 2/2011 |
| JP | 2011078277 A | 4/2011 |
| JP | 2011-89369 A | 5/2011 |
| JP | 2011-122307 A | 6/2011 |
| JP | 2012-102502 A | 5/2012 |
| JP | 2014009564 A | 1/2014 |
| JP | 2014-237943 A | 12/2014 |
| JP | 2015140643 A | 8/2015 |
| JP | 5778752 B2 | 9/2015 |
| JP | 2018-193670 A | 12/2018 |
| JP | 2019-70311 A | 5/2019 |
| JP | 2019-127751 A | 8/2019 |
| KR | 2012 0085618 A | 8/2012 |
| WO | 2012/114794 A1 | 8/2012 |
| WO | 2014/061052 A1 | 4/2014 |

OTHER PUBLICATIONS

Office Action issued Jan. 31, 2023 in Japanese family member application No. 2019-208094, along with an English translation thereof.
Office Action issued Jan. 31, 2023 in Japanese family member application No. 2019-208095, along with an English translation thereof.
Office Action issued Feb. 7, 2023 in Japanese family member application No. 2019-208097, along with an English translation thereof.
Office Action issued Feb. 7, 2023 in Japanese family member application No. 2019-208098, along with an English translation thereof.
Office Action issued Feb. 7, 2023 in Japanese family member application No. 2019-208100, along with an English translation thereof.
Notification of Reasons for Rejection dated Jun. 27, 2023 in connection with family member Japanese Patent Application No. 2019-208097 with English language translation thereof.
International Search Report and Written Opinion of the International Searching Authority issued in International Patent Application No. PCT/JP2020/042647, dated Jan. 26, 2021, along with an English translation thereof.

* cited by examiner

SWIVELING WORKING MACHINE

CROSS REFERENCE TO RELATED APPLICATIONS

This application is a continuation application of International Application No. PCT/JP2020/042647, filed on Nov. 16, 2020, which claims the benefit of priority to Japanese Patent Application No. 2019-208099, filed on Nov. 18, 2019, to Japanese Patent Application No. 2019-208100, filed on Nov. 18, 2019, to Japanese Patent Application No. 2019-208094, filed on Nov. 18, 2019, to Japanese Patent Application No. 2019-208095, filed on Nov. 18, 2019, to Japanese Patent Application No. 2019-208096, filed on Nov. 18, 2019, to Japanese Patent Application No. 2019-208098, filed on Nov. 18, 2019, and to Japanese Patent Application No. 2019-208097, filed on Nov. 18, 2019. The entire contents of each of these applications are hereby incorporated herein by reference.

BACKGROUND OF THE INVENTION

1. Field of the Invention

The present invention relates to, for example, a swiveling working machine, such as a backhoe or the like.

2. Description of the Related Art

There is a known swiveling working machine that includes a swivel base, a working device provided at the swivel base, a support substrate provided at the swivel base, a battery unit, an electric motor that is driven by electric power output by the battery unit, and a hydraulic pump that delivers a hydraulic fluid by driving of the electric motor, the battery unit including a main secondary battery disposed at a center portion of the swivel base, and an auxiliary secondary battery detachably mounted on a side portion of the swivel base (for example, Japanese Unexamined Patent Application Publication No. 2014-237943). In this technology in Japanese Unexamined Patent Application Publication No. 2014-237943, electrical components, such as a junction box and the like, are provided below the auxiliary secondary battery, and the hydraulic pump and the electric motor are disposed at a rear portion of the swivel base.

There is another known swiveling working machine that includes a swivel base, a working device provided at the swivel base, a prime mover, a fan provided at the prime mover, a radiator unit that cools cooling water by cooling air generated by the fan, and a fluid cooler unit that cools a hydraulic fluid by cooling air (for example, Japanese Unexamined Patent Application Publication No. 2019-70311).

There is also an electrical construction machine that includes a plurality of batteries connected in parallel to each other and that selectively uses any one of the batteries (for example, Japanese Patent No. 5778752). When a residual amount of stored electric power has become zero as a result of a battery that supplies electric power to an electric motor completely discharging, the technology in Japanese Patent No. 5778752 stops the electric motor and, after a lapse of a predetermined time, switches such that electric power is supplied to the electric motor from another battery to thereby notify an operator that the residual amount of stored electric power of the battery is zero.

In addition, there is a known work vehicle that includes an electric motor that drives a hydraulic pump for supplying a hydraulic fluid to a hydraulic actuator; a battery that supplies direct current; an inverter that causes the electric motor to operate at a desired rotation speed by converting direct-current power of the battery into alternating current power having a voltage value of a desired magnitude and supplying the alternating current power; an operation device that operates the hydraulic actuator; and a control controller that commands the inverter a rotation speed lower than a standard rotation speed when a state in which the operation device has not been operated for a predetermined time is continued (for example, Japanese Unexamined Patent Application Publication No. 2007-321463).

Further, there is a known swiveling working machine that includes a swivel base; a protecting mechanism that is provided on the swivel base and that protects an operator seat; a heater device that performs heating of the inside of the protecting mechanism; a working device provided at the swivel base; a battery unit; an electric motor that is driven by electric power output by the battery unit; a hydraulic pump that delivers a hydraulic fluid by driving of the electric motor; hydraulic equipment that is driven by the hydraulic fluid delivered by the hydraulic pump; and a cooling fan that sends cooling air from the electric motor and the hydraulic pump toward the heater device and warms up the heater device (for example, Japanese Unexamined Patent Application Publication No. 2011-89369).

SUMMARY OF THE INVENTION

In the technology in Japanese Unexamined Patent Application Publication No. 2014-237943, however, the center of gravity in the width direction is not well balanced because the main secondary battery is disposed at a center portion of the swivel base, the auxiliary secondary battery is disposed at a right side portion of the swivel base, and an additional auxiliary secondary battery can be provided, as necessary, or the auxiliary secondary battery can be detached and placed at an engine power generator. In the technology in Japanese Unexamined Patent Application Publication No. 2014-237943, electrical components are provided at a rear lower portion of the auxiliary secondary battery, the relatively heavy battery unit is positioned at an upper portion of the swiveling working machine, and the position of the center of gravity is high. In addition, in the technology in Japanese Unexamined Patent Application Publication No. 2014-237943, the hydraulic pump, the electric motor, the main secondary battery, and the auxiliary secondary battery are disposed at positions different from each other. Therefore, it takes time and labor to mount these devices and set cables and the like for connecting the devices, which increases the number of steps of assembling the swiveling working machine.

The technology in Japanese Unexamined Patent Application Publication No. 2019-70311 is not possible to control cooling of the cooling water and cooling of the hydraulic fluid individually due to performing the cooling of the cooling water and the cooling of the hydraulic fluid by the same fan and may be not possible to cool the both efficiently. Moreover, warming-up of the hydraulic fluid may be obstructed since the fan is driven, even when cooling of the hydraulic fluid is unnecessary, to cool the hydraulic fluid.

The technology in Japanese Patent No. 5778752 simultaneously performs, when switching the batteries, processing of switching connection with one battery into a close state and processing of switching connection with another battery into an open state. Thus, output from both batteries may be simultaneously performed temporarily and may cause a problem that, for example, excessive current flows.

The technology in Japanese Unexamined Patent Application Publication No. 2007-321463 requires that a controller is provided with a mechanism for detecting the amount of operation with respect to the operation device and sending a control signal to the control controller, resulting in a problem that manufacturing costs are increased.

The technology in Japanese Unexamined Patent Application Publication No. 2011-89369 requires supply of extra energy, such as electric power, to cause the heater device to perform heating.

The present invention has been made to solve such problems in the related art. An object of the present invention is to provide a swiveling working machine that achieves both ensuring an arrangement position of a battery unit and the balance of the center of gravity of devices provided at a swivel base. In addition, an object of the present invention is to provide a swiveling working machine that has improved stability with the position of the center of gravity being set to be relatively low. In addition, an object of the present invention is to provide a swiveling working machine to which a battery unit, an electric motor, and a hydraulic pump can be easily assembled. In addition, an object of the present invention is to provide a swiveling working machine capable of individually controlling cooling of cooling water and cooling of a hydraulic fluid. In addition, an object of the present invention is to reliably avoid, in an electric working machine that includes a plurality of batteries in a switchable manner, excessive current from flowing during switching of the batteries. In addition, an object of the present invention is to provide a working machine that can achieve energy saving in an electric motor at relatively low costs. In addition, an object of the present invention is to provide a swiveling working machine that can efficiently perform heating of the inside of a protecting mechanism by using the heat of a hydraulic fluid.

A swiveling working machine according to one aspect of the present invention includes a swivel base; a working device provided on a front side of the swivel base; a battery unit; an electric motor that is driven by electric power output by the battery unit; and a hydraulic pump that delivers a hydraulic fluid by driving of the electric motor. The battery unit is disposed at a rear portion of the swivel base. The electric motor and the hydraulic pump are disposed sideward of the battery unit side by side in a front-rear direction. According to the aforementioned configuration, the battery unit, the electric motor, and the hydraulic pump can be disposed at a rear portion of the swivel base, and the electric motor and the hydraulic pump can be disposed in a space sideward of the battery unit. Consequently, it is possible to position the center of gravity at the rear side of the swivel base and dispose the electric motor and the hydraulic pump compactly.

The swivel base may be rotatable around a swiveling axis extending in an up-down direction, and the battery unit, the electric motor, and the hydraulic pump may be disposed rearward of the swiveling axis. According to the aforementioned configuration, by positioning the center of gravity rearward of the swiveling axis, the swiveling working machine can maintain an orientation even when the working device is driven.

The swiveling working machine may include a lower traveling body that supports the swivel base rotatably around the swiveling axis and that is capable of traveling, and a rear portion of the battery unit may be positioned rearward of a rear end portion of the lower traveling body. According to the aforementioned configuration, by positioning the relatively heavy battery unit rearward, the orientation of the swiveling working machine can be easily maintained.

The swiveling working machine may include a cooling mechanism that is disposed sideward of the battery unit and above the hydraulic pump and the electric motor and that cools the hydraulic fluid and the electric motor. According to the aforementioned configuration, the cooling mechanism can be positioned in an excess space of the battery unit, the hydraulic pump, and the electric motor.

The swiveling working machine may include a cover that covers the battery unit, the electric motor, and the hydraulic pump. The cooling mechanism may discharge air outwardly in the width direction from a space defined by the cover. According to the aforementioned configuration, the cooling mechanism can discharge, to the outside of the cover, heat released sideward from the battery unit and heat released upward from the electric motor and the hydraulic pump.

The swiveling working machine may include a lower traveling body that supports the swivel base rotatably around a swiveling axis and that is capable of traveling; a cover that covers the battery unit, the electric motor, and the hydraulic pump; and a support frame that is provided at the swivel base and that supports the cover. A rear portion of the support frame may be positioned rearward of a rear portion of the lower traveling body. According to the aforementioned configuration, by positioning the support frame rearward of the lower traveling body, the strength of the rear potion of the swiveling working machine can be improved.

The swiveling working machine may include a protecting mechanism that is provided on the swivel base and that protects an operator seat. The protecting mechanism may be supported by the support frame. According to the aforementioned configuration, the protecting mechanism can be disposed at a rear portion of the swivel base and can be supported by the support frame having a relatively high strength. Consequently, it is possible to move the center of gravity to the rear side of the swivel base and support the protecting mechanism firmly.

The swiveling working machine may include a hydraulic-fluid tank that stores a hydraulic fluid; hydraulic equipment that is driven by a hydraulic fluid delivered by the hydraulic pump; and a controlling valve that is mounted on the swivel base and that regulates the hydraulic fluid delivered by the hydraulic pump and controls the hydraulic equipment. The hydraulic-fluid tank and the controlling valve may be disposed forward of the battery unit. According to the aforementioned configuration, the balance of the center of gravity in the front-rear direction can be properly kept.

The swiveling working machine may include a protecting mechanism that is provided on the swivel base and protects an operator seat. The position of the center of gravity of the battery unit may be disposed on one side with respect to a center line of the swivel base in a width direction, the protecting mechanism may be disposed on the one side with respect to the center line and forward of the battery unit, and the controlling valve may be disposed on the one side with respect to the center line and below the protecting mechanism. The electric motor and the hydraulic pump may be disposed on another side with respect to the center line and sideward of the battery unit, and the hydraulic-fluid tank may be disposed on the other side with respect to the center line and forward of the electric motor and the hydraulic pump. According to the aforementioned configuration, by disposing the controlling valve below the protecting mechanism, the position of the center of gravity can be low. In addition, even in a small space, the battery unit, the controlling valve, the electric motor, the hydraulic pump, and the hydraulic-fluid tank can be disposed, and the balance of the center of gravity of the entirety of the swivel base can be properly kept.

The position of the center of gravity of the battery unit may be disposed on one side with respect to a center line of the swivel base in a width direction, and the working device may be disposed on another side with respect to the center line. According to the aforementioned configuration, the balance of the center of gravity in the width direction can be properly kept by the battery unit and the working device.

The swiveling working machine may include the swivel base; the working device provided at the swivel base; the battery unit; the electric motor that is driven by electric power output by the battery unit; the hydraulic pump that delivers a hydraulic fluid by driving of the electric motor; and a standing frame that supports one side surface and the other side surface of the battery unit and supports electrical components above the battery unit. According to the aforementioned configuration, by disposing the battery unit below the electrical components, the position of the center of gravity can be low. In addition, by supporting the one side surface and the other side surface of the battery unit, the standing frame can support the battery unit firmly.

The standing frame may have a first standing portion that stands at an upper portion of the swivel base and supports the one side surface of the battery unit, a second standing portion that stands at an upper portion of the swivel base and supports the other side surface of the battery unit, and a coupling stay that couples an upper portion of the first standing portion and an upper portion of the second standing portion to each other and supports the electrical components. According to the aforementioned configuration, the standing frame supports the battery unit by sandwiching the one side surface and the other side surface of the battery unit and thus can suppress a change in the relative position of the electrical components with respect to the battery unit.

The first standing portion may support, on one side of the battery unit in the width direction, the battery unit by stretching in the front-rear direction, and the second standing portion may support, on the other side of the battery unit in the width direction, the battery unit by stretching in the front-rear direction. According to the aforementioned configuration, the first standing portion and the second standing portion support the battery unit by stretching in the front-rear direction and thus can support the battery unit firmly.

The first standing portion and the second standing portion may each have a swing stopper portion stretching in the front-rear direction of the battery unit and attached to the battery unit, and an extension portion that extends upward from the swing stopper portion and supports the coupling stay and that has a shorter length in the front-rear direction than the swing stopper portion. According to the aforementioned configuration, the swing stopper portion can firmly support the battery unit with respect to a swing in the width direction, and the extension portion can support the electrical components relatively compactly.

Between the battery unit and the coupling stay, a routing space for routing cables may be formed. According to the aforementioned configuration, a change in the relative position of the coupling stay with respect to the battery unit is small. It is thus possible to route the cables while suppressing damage to the cables routed in the routing space due to vibration or the like.

The swiveling working machine may include a support substrate that supports, at a rear portion of the swivel base, the battery unit, the electric motor, the hydraulic pump, the first standing portion, and the second standing portion, and the support substrate may be attached to the swivel base via a plurality of mount devices. According to the aforementioned configuration, the battery unit, the electric motor, the hydraulic pump, the first standing portion, the second standing portion, and the support substrate are attached as a single unit to the swivel base. Therefore, attaching of the battery unit, the electric motor, the hydraulic pump, the first standing portion, and the second standing portion is easy. Further, it is possible to suppress vibration transmitted from the swivel base from reaching the battery unit, the electric motor, and the hydraulic pump.

The plurality of mount devices may include, a pair of front mount devices disposed in the width direction on the front side of the support substrate, a pair of rear mount devices disposed in the width direction on the rear side of the support substrate, and an intermediate mount device disposed between the rear mount devices on the rear side of the support substrate. According to the aforementioned configuration, a plurality of mount members are disposed regularly, and thus, the battery unit, the electric motor, the hydraulic pump, the first standing portion, and the second standing portion that are supported by the support substrate can be supported firmly.

The intermediate mount device may be positioned rearward of the rear mount devices. According to the aforementioned configuration, among the plurality of mount devices, the intermediate mount device is disposed furthermost rearward. Therefore, the intermediate mount device can support the battery unit, the electric motor, the hydraulic pump, the first standing portion, and the second standing portion firmly with respect to a swing in the front-rear direction.

The battery unit may have a connecter for outputting electric power. The connector may be disposed at a front portion of the battery unit. According to the aforementioned configuration, by disposing the connector at the front portion, it is possible to avoid the connector from being damaged when impact or the like is applied to the rear side of the battery unit.

The electrical components may include at least any one of a junction box and an inverter that are connected to the battery unit. According to the aforementioned configuration, the junction box or the inverter connected to the battery unit can be disposed in the vicinity of the battery unit and can be supported firmly.

The swiveling working machine may include the swivel base; the working device provided at the swivel base; the support substrate provided at the swivel base; the battery unit; the electric motor that is driven by electric power output by the battery unit; the hydraulic pump that delivers a hydraulic fluid by driving of the electric motor; and a coupling portion that couples the electric motor and the hydraulic pump to each other. The support substrate may have a first placement portion on which the battery unit is placed and a second placement portion on which the coupling portion is placed. According to the aforementioned configuration, the support substrate can support the battery unit, and the electric motor and the hydraulic pump that are coupled to the coupling portion. In other words, the battery unit, the electric motor, and the hydraulic pump are one structure body supported by the support substrate to be easily attached to the swivel base.

The support substrate may be attached to the swivel base via a plurality of mount devices. According to the aforementioned configuration, it is possible to suppress vibration transmitted from the swivel base from reaching the battery unit, the electric motor, and the hydraulic pump.

The plurality of mount devices may include, a pair of front mount devices disposed in the width direction on the front side of the support substrate, a pair of rear mount devices disposed in the width direction on the rear side of the support substrate, and an intermediate mount device disposed between the rear mount devices on the rear side of the support substrate. According to the aforementioned configuration, a plurality of mount members are disposed at regularly intervals, and thus, the battery unit, the electric motor, the hydraulic pump, the first standing portion, and the second standing portion that are supported by the support substrate can be supported firmly.

The intermediate mount device may be positioned rearward of the rear mount devices. According to the aforementioned configuration, by disposing, among the plurality of mount devices, the intermediate mount device furthermost rearward, it is possible to support the battery unit, the electric motor, the hydraulic pump, the first standing portion, and the second standing portion firmly with respect to a swing in the front-rear direction.

The coupling portion may be a coupling that supports the electric motor and the hydraulic pump so that power is transmitted from the electric motor to the hydraulic pump. According to the aforementioned configuration, it is possible to suppress the relative positions between the electric motor and the hydraulic pump from changing. Therefore, it is possible, in transmission of power from the electric motor to the hydraulic pump, to suppress a loss of the power.

The swiveling working machine may include, between the coupling portion and the battery unit, a swing stopper portion that stands at an upper portion of the swivel base and that is attached to one side surface of the battery unit. According to the aforementioned configuration, it is possible to suppress contact between the electric motor and the hydraulic pump due to a swing of the battery unit.

The swiveling working machine may include, at the other side surface of the battery unit, a swing stopper portion that stands at an upper portion of the swivel base and that is attached to the other side surface of the battery unit separately from the swing stopper portion attached to the one side surface of the battery unit. According to the aforementioned configuration, the battery unit is supported at the one side surface and the other side surface thereof by the swing stopper portions. It is thus possible to further suppress a swing of the battery unit.

A swiveling working machine includes a swivel base; a working device provided at the swivel base; a radiator fan that cools a radiator; and a fluid-cooler fan that cools a fluid cooler separately from the radiator fan. According to the aforementioned configuration, it is possible to drive the radiator fan and the fluid-cooler fan individually.

The swiveling working machine may include a controller that controls driving of the radiator fan and driving of the fluid-cooler fan. The controller may control each of the radiator fan and the fluid-cooler fan independently. According to the aforementioned configuration, it is possible to perform cooling of the radiator and cooling of the fluid cooler by different controls.

The swiveling working machine may include a water-temperature detector that detects the temperature of cooling water and a fluid-temperature detector that detects the temperature of a hydraulic fluid. The controller may control driving of the radiator fan on the basis of the temperature of the cooling water detected by the water-temperature detector and control driving of the fluid-cooler fan on the basis of the temperature of the hydraulic fluid detected by the fluid-temperature detector. According to the aforementioned configuration, it is possible to drive the radiator fan in accordance with the temperature of the cooling water and drive the fluid-cooler fan in accordance with the temperature of the hydraulic fluid. Therefore, it is possible, when the temperature of one of the radiator and the fluid cooler is low and does not require cooling while the temperature of the other is high and requires cooling, to perform cooling in accordance with respective temperatures thereof. Further, since the radiator fan and the fluid-cooler fan can be independently controlled, it is possible, when cooling is not required, to reduce noise generated by the driving of the radiator fan and the fluid-cooler fan.

When the temperature of the hydraulic fluid detected by the fluid-temperature detector is less than a predetermined temperature, the controller may stop driving of the fluid-cooler fan. According to the aforementioned configuration, when the temperature of the hydraulic fluid is low and warming-up of the hydraulic fluid is required, rotation of the fan of the fluid cooler is stopped to suppress the fluid cooler from hindering warming-up, which can encourage warming-up.

The swiveling working machine may include a shroud that surrounds and supports both of the radiator fan and the fluid-cooler fan. According to the aforementioned configuration, it is possible to fix the relative positions of the radiator fan and the fluid-cooler fan and suppress the radiator fan and the fluid-cooler fan from interfering with the other members and the like.

The shroud may support the radiator fan and the fluid-cooler fan so as to be arranged in the front-rear direction. According to the aforementioned configuration, since warm air moves upward, it is possible by arranging the radiator fan and the fluid-cooler fan in the front-rear direction to suppress the heat of one of the radiator and the fluid cooler from reaching the other and possible to perform cooling efficiently.

The shroud may have a fixation portion that surrounds the radiator fan and the fluid-cooler fan, and a guide portion that extends rearward and outward in the width direction from a front portion of the fixation portion and that guides at least one of cooling air generated by driving of the radiator fan and cooling air generated by driving of the fluid-cooler fan. According to the aforementioned configuration, it is possible by guiding cooling air by the guide portion to suppress air from remaining around the radiator fan and the fluid-cooler fan. Consequently, it is possible to improve efficiency in removing heat of the radiator fan and the fluid-cooler fan.

The swiveling working machine may include the battery unit, the electric motor that is driven by electric power output by the battery unit, and the hydraulic pump that delivers a hydraulic fluid by driving of the electric motor. The electric motor and the hydraulic pump may be disposed sideward of the battery unit. The radiator fan and the fluid-cooler fan may be disposed sideward of the battery unit and above the hydraulic pump and the electric motor. According to the aforementioned configuration, the radiator fan and the fluid-cooler fan can be positioned in an excess space of the battery unit, the hydraulic pump, and the electric motor.

The swiveling working machine may include a cover that covers the battery unit, the electric motor, and the hydraulic pump. The radiator fan and the fluid-cooler fan may discharge air outwardly in the width direction from a space defined by the cover. According to the aforementioned configuration, the radiator fan and the fluid-cooler fan can discharge, to the outside of the cover, heat released sideward from the battery unit and heat released upward from the electric motor and the hydraulic pump.

An electric working machine (swiveling working machine) according to one aspect of the present invention is a swiveling working machine that includes an electric motor, a battery unit that supplies electric power to the electric motor, a hydraulic pump that is driven by the electric motor and delivers a hydraulic fluid, hydraulic equipment that is driven by the hydraulic fluid, and a working device that is operated by the hydraulic equipment. The battery unit includes a plurality of batteries connected in parallel to each other. The swiveling working machine includes a controller that selects, among the plurality of batteries, an output battery that supplies electric power to the electric motor, and a connection switch unit that switches, for each of the batteries, a power supply path from the battery to the electric motor between a connected state and an interrupted state. The controller performs first processing of causing each of the batteries to be in the interrupted state when selecting the output battery; second processing of, after the first processing, causing a battery that is to be selected as the output battery to be in the connected state; and third processing of, after the second processing, causing the battery selected as the output battery to start power supply to the electric motor. According to the aforementioned configuration, it is possible to reliably avoid excessive current from flowing during switching of the output battery and possible to extend the drive time of the swiveling working machine with the plurality of batteries.

The swiveling working machine may include a selector that receives an instruction for selecting a battery to be selected as the output battery from an operator. The controller may select, as the output battery, the battery selected and designated via the selector. According to the aforementioned configuration, it is possible for an operator to easily switch, with the selector, a battery that is to be selected as the output battery.

The swiveling working machine may include a capacity detector that detects the remaining capacities of the plurality of batteries. The controller may limit batteries that are selectable as the output battery with the selector to batteries whose remaining capacities are more than or equal to a first threshold value. According to the aforementioned configuration, it is possible to suppress a battery whose remaining capacity is less than a predetermined capacity from being selected as the output battery and possible to preferentially use a battery having a sufficient capacity.

The swiveling working machine may include a notification device that notifies of a decrease in the capacity of a battery. When the remaining capacity of a battery selected as the output battery is decreased to be less than the first threshold value, the controller may cause the notification device to issue a notification to urge switching of the output battery. According to the aforementioned configuration, it is possible to suppress the swiveling working machine from stopping due to the remaining capacity of the output battery becoming zero during work.

When the remaining capacity of the battery selected as the output battery is decreased to be less than the first threshold value and when the other batteries do not include a battery whose remaining capacity is more than or equal to the first threshold value, the controller may cause the notification device to issue a notification to urge charging. According to the aforementioned configuration, it is possible to charge the plurality of batteries at a proper timing and possible to perform work efficiently.

When the remaining capacity of the battery selected as the output battery is decreased to be less than a second threshold value that is smaller than the first threshold value, the controller may cause the notification device to issue a warning notification of depletion of the remaining capacity. According to the aforementioned configuration, by a warning notification, an operator can recognize that, due to depletion of the remaining capacity of a battery, work is difficult to be continued and requires a prompt response.

The notification device may be any one or more of a display device, a sound outputting device, and a light emitting device. According to the aforementioned configuration, an operator can visually and acoustically recognize the remaining capacity of a battery relatively easily and immediately.

When the remaining capacity of the battery selected as the output battery is decreased to be less than the first threshold value and when the other batteries include batteries whose remaining capacities are more than or equal to the first threshold value, the controller may switch the output battery to any of the batteries whose remaining capacities are more than or equal to the first threshold value. According to the aforementioned configuration, it is possible, without an operation by an operator, to switch the output battery to a battery having a sufficient remaining capacity before the remaining capacity of the output battery becomes zero. Consequently, it is possible to achieve both extension of the driving time of the swiveling working machine and convenience.

When supply of electric power to the electric motor is stopped due to a lack of the remaining capacity of the battery that is selected as the output battery and when the other batteries include batteries each having a remaining capacity capable of supplying electric power to the electric motor, the controller may switch the output battery to any of the batteries each having a remaining capacity capable of supplying electric power to the electric motor. According to the aforementioned configuration, it is possible, without an operation by an operator, to supply electric power to the electric motor by another battery when the output battery stops supplying electric power to the electric motor. Consequently, it is possible to achieve both extension of the driving time of the swiveling working machine and convenience.

A driving limitation device that prohibits or limits driving of the working device may be included. The controller may perform switching of the output battery after the driving of the working apparatus is prohibited or limited by the driving limitation device. According to the aforementioned configuration, it is possible to avoid supply of electric power from a battery from being stopped while the working device is driven.

The driving limitation device may prohibit or limit driving of the hydraulic equipment by interrupting supply of the hydraulic fluid from the hydraulic pump to the hydraulic equipment. According to the aforementioned configuration, it is possible to reliably suppress the hydraulic equipment from operating during switching of the output battery.

The driving limitation device may prohibit or limit driving of the hydraulic equipment by restraining the movement of an operation member for an operator to operate the hydraulic equipment. According to the aforementioned configuration, it is possible to reliably suppress the hydraulic equipment from operating during switching of the output battery due to an operator accidentally contacting with the operation member or carelessly operating the operation member.

In addition, an inverter that is provided in the power supply path and regulates electric power that is to be output to the electric motor may be included. The controller may cause the battery selected as the output battery and the inverter to be in a mutually connected state in the second processing. According to the aforementioned configuration, connection to and disconnection from a battery are performed on the upstream side of the inverter that regulates electric power that is to be output to the electric motor. It is thus possible to more reliably switch connection between the battery and the electric motor.

The swivel base on which the battery unit, the electric motor, and the working device are mounted and a swiveling device (swiveling motor) that swivels the swivel base may be included. It may be possible to realize a swiveling working machine, such as a backhoe or the like, that exerts the excellent effects described above.

The swiveling working machine may include a swivel base; a protecting mechanism that is provided on the swivel base and protects an operator seat; a working device that is provided at the swivel base; a battery unit; an electric motor that is driven by electric power output by the battery unit; a hydraulic circuit having a hydraulic pump that delivers a hydraulic fluid by driving of the electric motor, and hydraulic equipment that is driven by the hydraulic fluid delivered by the hydraulic pump; and a heater that performs heating of the inside of the protecting mechanism by the heat of the hydraulic fluid. According to the aforementioned configuration, since the heater performs heating of the inside of the protecting mechanism by the heat of the hydraulic fluid and does not consume the electric power of the battery unit, it is possible to achieve energy saving.

The hydraulic circuit may have a fluid passage through which a hydraulic fluid flows. The heater may be provided at the fluid passage and perform heating of the inside of the protecting mechanism by the heat of the hydraulic fluid that flows in the fluid passage. According to the aforementioned configuration, the heater can acquire the heat of the hydraulic fluid via the fluid passage. Consequently, the heater can easily perform heat exchange.

The fluid passage may include a first pipe line through which the hydraulic fluid delivered by the hydraulic pump flows toward the hydraulic equipment, and a second pipe line through which the hydraulic fluid discharged from the hydraulic equipment flows. The heater may be provided at, of the hydraulic circuit, any one of the first pipe line and the second pipe line. According to the aforementioned configuration, the heater is provided at, of the fluid passage, a part through which the hydraulic fluid having a relatively high temperature flows. Therefore, the heater can perform heat exchange efficiently.

The hydraulic circuit may have a fluid cooler that is connected to the second pipe line and that drives the fluid-cooler fan and cools the hydraulic fluid that flows in the second pipe line. The fluid passage may include a third pipe line connecting the fluid cooler and the hydraulic pump to each other and through which the hydraulic fluid flows from the fluid cooler to the hydraulic pump. According to the aforementioned configuration, the heater is provided at the first pipe line, which differs from the third pipe line at which the fluid cooler is provided. The heater exchanges heat with at least the hydraulic fluid delivered from the hydraulic pump or the hydraulic fluid discharged from the hydraulic equipment. Therefore, heat exchange is not performed with the cooled hydraulic fluid discharged from the fluid cooler. Therefore, it is thus possible to suppress the heater from exchanging heat with a hydraulic fluid having a relatively low temperature.

The swiveling working machine may include a controller that controls driving of the fluid-cooler fan, and a fluid-temperature detector that detects the temperature of the hydraulic fluid. When a fluid temperature detected by the fluid-temperature detector is less than a predetermined temperature, the controller may stop driving of the fluid-cooler fan. According to the aforementioned configuration, driving of the fluid-cooler fan is stopped when the temperature of the hydraulic fluid is less than a predetermined temperature, in other words, has a relatively low temperature. It is thus possible to suppress the fluid cooler from impeding warming-up and possible to perform warming-up immediately. Therefore, the heater can perform heating early by utilizing the warmed-up hydraulic fluid.

The heater may have a blower fan that is provided around the first pipe line or the second pipe line and that sends air toward the inside of the protecting mechanism. According to the aforementioned configuration, the blower fan can deliver, to the inside of the protecting mechanism, peripheral air warmed by the hydraulic fluid that flows in the inside of the first pipe line or the second pipe line. Consequently, the heater can perform heating of the inside of the protecting mechanism with a simple configuration.

At least one of the first pipe line and the second pipe line may be routed in the protecting mechanism. According to the aforementioned configuration, of the fluid passage, at least one of the first pipe line and the second pipe line through which the hydraulic fluid having a relatively high temperature flows is routed in the protecting mechanism, and it is thereby possible for the warm air with which heat exchange has been performed, to warm the inside of the protecting mechanism while maintaining the temperature thereof.

A working machine may include a battery unit; an electric motor that is driven by electric power output by the battery unit; an inverter that is connected to the battery unit and the electric motor and regulates electric power that is to be output to the electric motor; a hydraulic pump that is driven by the electric motor and delivers a hydraulic fluid; hydraulic equipment that is driven by the hydraulic fluid delivered by the hydraulic pump; a controlling valve that regulates the hydraulic fluid that is to be output to the hydraulic equipment from the hydraulic pump; an operation device that operates the hydraulic equipment by regulating a pilot fluid that acts on the controlling valve and controlling the controlling valve; a controller that controls the motor rotation speed of the electric motor; and a current detector (BMU) that detects the value of current output from the battery unit or the inverter. When a current value detected by the BMU is more than or equal to a predetermined value, the controller may set a motor rotation speed of the electric motor in accordance with the current value that changes in response to an operation of the operation device. When a current value detected by the BMU is less than the predetermined value, the controller may set the motor rotation speed of the electric motor to an idling rotation speed. According to the aforementioned configuration, by detecting the value of current output from the battery unit or the inverter, it is possible to detect the load of the electric motor, that is, driving states of the hydraulic pump and the hydraulic equipment. Consequently, the motor rotation speed can be temporarily decreased when the hydraulic equipment is stopped or does not require a large amount of the hydraulic fluid. Therefore, it is possible, with a relatively simple configuration in which the current of the electric power output from the battery unit or the inverter is detected, to change the motor rotation speed automatically and to achieve energy saving of the electric motor.

When a current value detected by the BMU is less than a predetermined value, the controller may set, for a predetermined time since the current value became less than the predetermined value, the motor rotation speed of the electric motor in accordance with the current value that changes in response to an operation of the operation device and, after a lapse of the predetermined time, may set the motor rotation speed of the electric motor to a predetermined idling rotation speed. According to the aforementioned configuration, it is possible to improve responsiveness of the hydraulic equipment by maintaining the motor rotation speed of the electric motor for a predetermined time when a current value detected by the BMU is less than a predetermined value, that is, when the hydraulic equipment is stopped or does not require a large amount of the hydraulic fluid.

The working machine may include a rotation-speed operation actuator that sets a range of the motor rotation speed of the electric motor when the motor rotation speed of the electric motor is to be set in accordance with a current value that changes in response to an operation of the operation device. When a current value detected by the BMU is more than or equal to a predetermined value, the controller may set, within the range, the motor rotation speed of the electric motor in accordance with the current value that changes in response to an operation of the operation device and may set the idling rotation speed to a rotation speed that is lower than a lower limit value of the range of the motor rotation speed settable by using the rotation-speed operation actuator. According to the aforementioned configuration, when the hydraulic equipment is driven and the load of the electric motor is increased, the electric motor is driven at a motor rotation speed that is optionally set by the rotation-speed operation actuator and, when the hydraulic equipment is stopped or does not require a large amount of the hydraulic fluid, it is possible, without a special operation, to set a rotation speed lower than the range of the motor rotation speed set by the rotation-speed operation actuator. Therefore, it is possible to set an idling rotation speed easily without increasing an operation load of an operator.

When a current value detected by the BMU is less than a predetermined value, the controller may set, for a predetermined time since the current value became less than the predetermined value, the rotation speed of the electric motor to a lower limit value of the motor rotation speed in the range set by the rotation-speed operation actuator and, after a lapse of the predetermined time, may set the motor rotation speed of the electric motor to the idling rotation speed. According to the aforementioned configuration, when the hydraulic equipment is driven and the load of the electric motor is increased, the electric motor is driven at a motor rotation speed optionally set by the rotation-speed operation actuator, and, when the hydraulic equipment is stopped or does not require a large amount hydraulic fluid, the controller first sets the motor rotation speed to a lower limit value of the range set by the rotation-speed operation actuator and, after a lapse of a predetermined time, sets the motor rotation speed to an idling rotation speed lower than the lower limit value. Consequently, it is possible to achieve further energy saving of the electric motor by gradually decreasing the motor rotation speed.

The current detector may be provided at the battery unit. According to the aforementioned configuration, it is possible to achieve energy saving of the electric motor at reduced costs.

The working machine may include a swivel base and a working device that is mounted on the swivel base and that is operated by hydraulic equipment. According to the aforementioned configuration, it is possible to realize a working machine (swiveling working machine), such as a backhoe or the like, that exerts the excellent effects described above.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
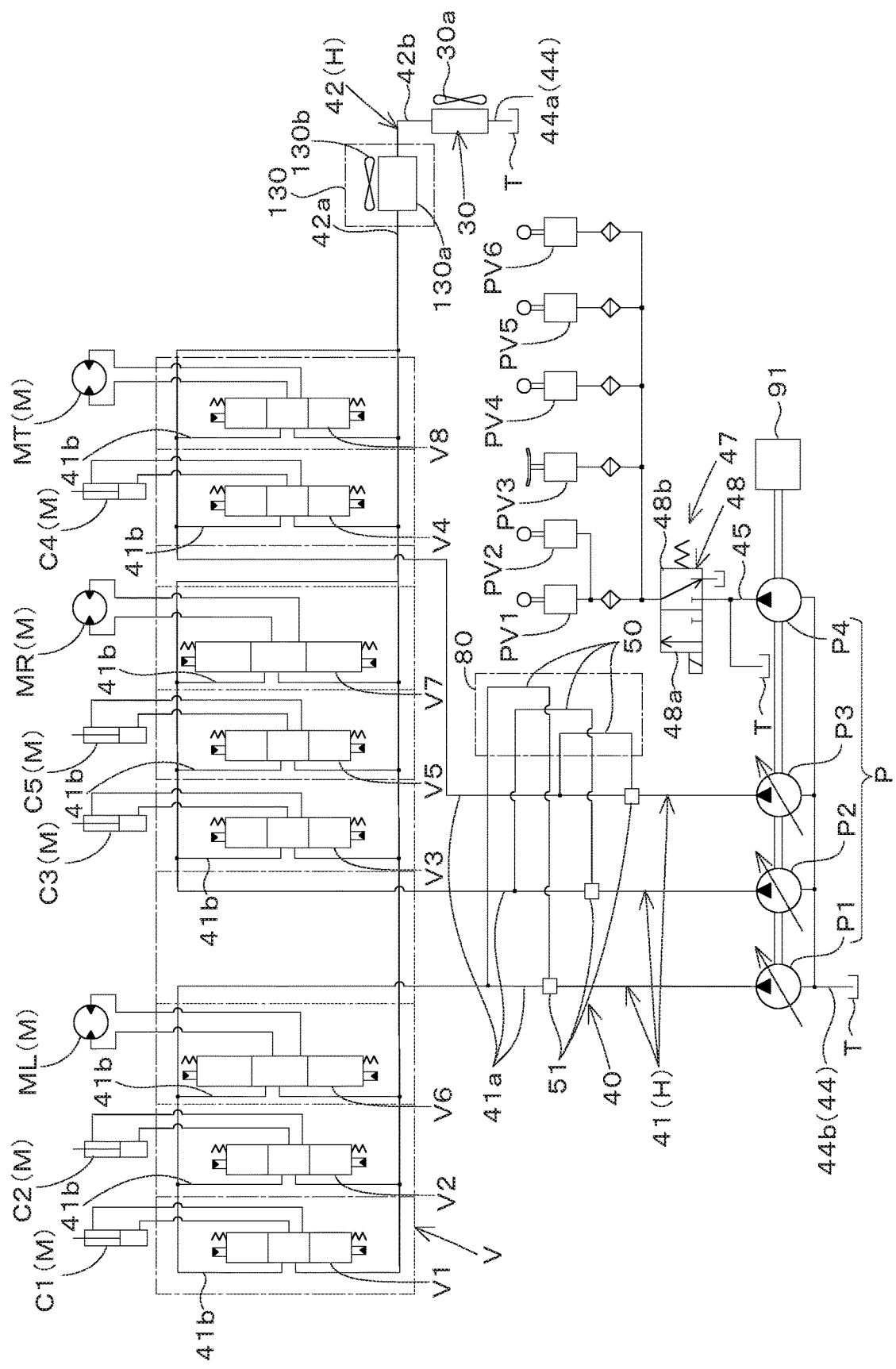
FIG. 1 is a diagram illustrating a hydraulic circuit of a swiveling working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, one embodiment of the present invention will be described with reference to the drawings.

Figure 23:
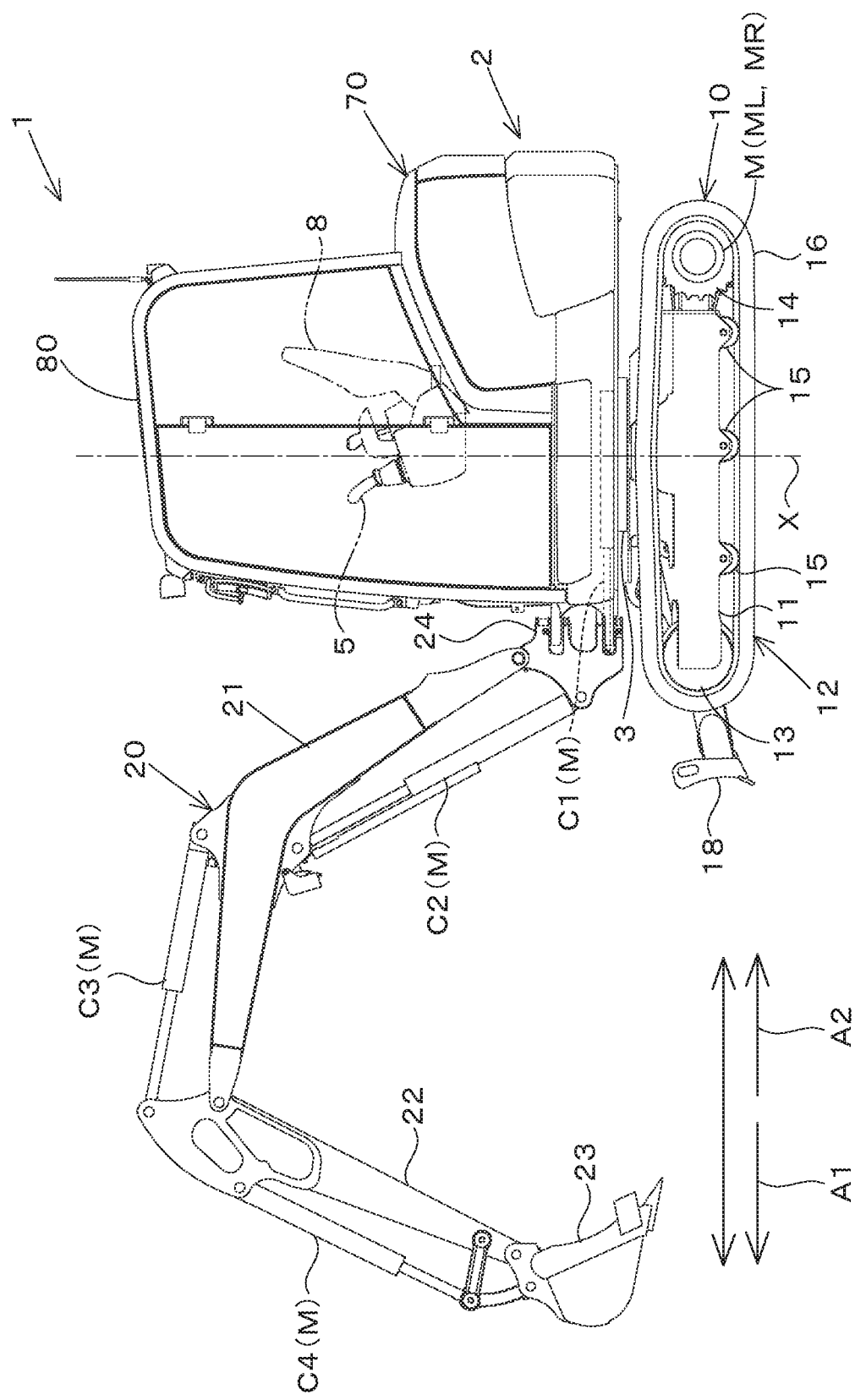
FIG. 23 is a schematic side view illustrating a swiveling working machine.

First, an overall configuration of a working machine 1 will be described. As illustrated in FIG. 23, the working machine 1 is a swiveling working machine, such as a backhoe or the like, including, for example, a swivel base (machine body) 2, a lower traveling body 10, and a working device 20. The swiveling working machine 1 is an electric working machine that is driven by electric power. On the swivel base 2, an operator seat 8 on which an operator is to sit is provided. The periphery of the operator seat 8 is covered by a protecting mechanism 80.

The present embodiment will be described on the premise that the front side (the arrow A1 direction in FIG. 23 and FIG. 24) of an operator sitting on the operator seat 8 of the swiveling working machine 1 is forward, the rear side (the arrow A2 direction in FIG. 23 and FIG. 24) of the operator is rearward, the left side (the near side in FIG. 23 and the arrow B1 direction in FIG. 24 and FIG. 25) of the operator is leftward, and the right side (the far side in FIG. 23 and the arrow B2 direction in FIG. 24 and FIG. 25) of the operator is rightward. The description is on the premise that the horizontal direction, which is a direction orthogonal to the front-rear direction, is the width direction (refer to FIG. 24 and FIG. 25). The description is also on the premise that a direction from a center portion of the swivel base 2 in the width direction toward a right portion or a left portion thereof is outward in the width direction. At the periphery of the operator seat 8, an operable operation device 5 is provided. The swiveling working machine 1 is operated by operating the operation device 5.

The swivel base 2 is rotatable around a swiveling axis (vertical axis) X extending in the up-down direction. Specifically, the swivel base 2 is supported above the lower traveling body 10 via a swivel bearing 3 rotatably (to be capable of swiveling to the left side and the right side) around the swiveling axis X. The center of the swivel bearing 3 is the swiveling axis X (center of swiveling). A swiveling motor (swiveling device) MT, which is described later, is mounted on the swivel base 2. The swiveling motor MT is hydraulic equipment M driven by a hydraulic fluid delivered by a hydraulic pump P and is a motor that rotatably drives the swivel base 2 around the swiveling axis X. The swiveling motor MT is provided below the protecting mechanism 80 and below a front portion of the operator seat 8 and is mounted on a swivel substrate 60, which is described later. The swivel base 2 is provided with an exterior cover (cover) 70, a bracket, a stay, and the like. The exterior cover 70 forms, at a rear portion of the swivel base 2, a space (rear room) R in which devices, tanks, other components, and the like are disposed. The bracket, the stay, and the like are members for mounting the aforementioned components and the like.

Figure 24:
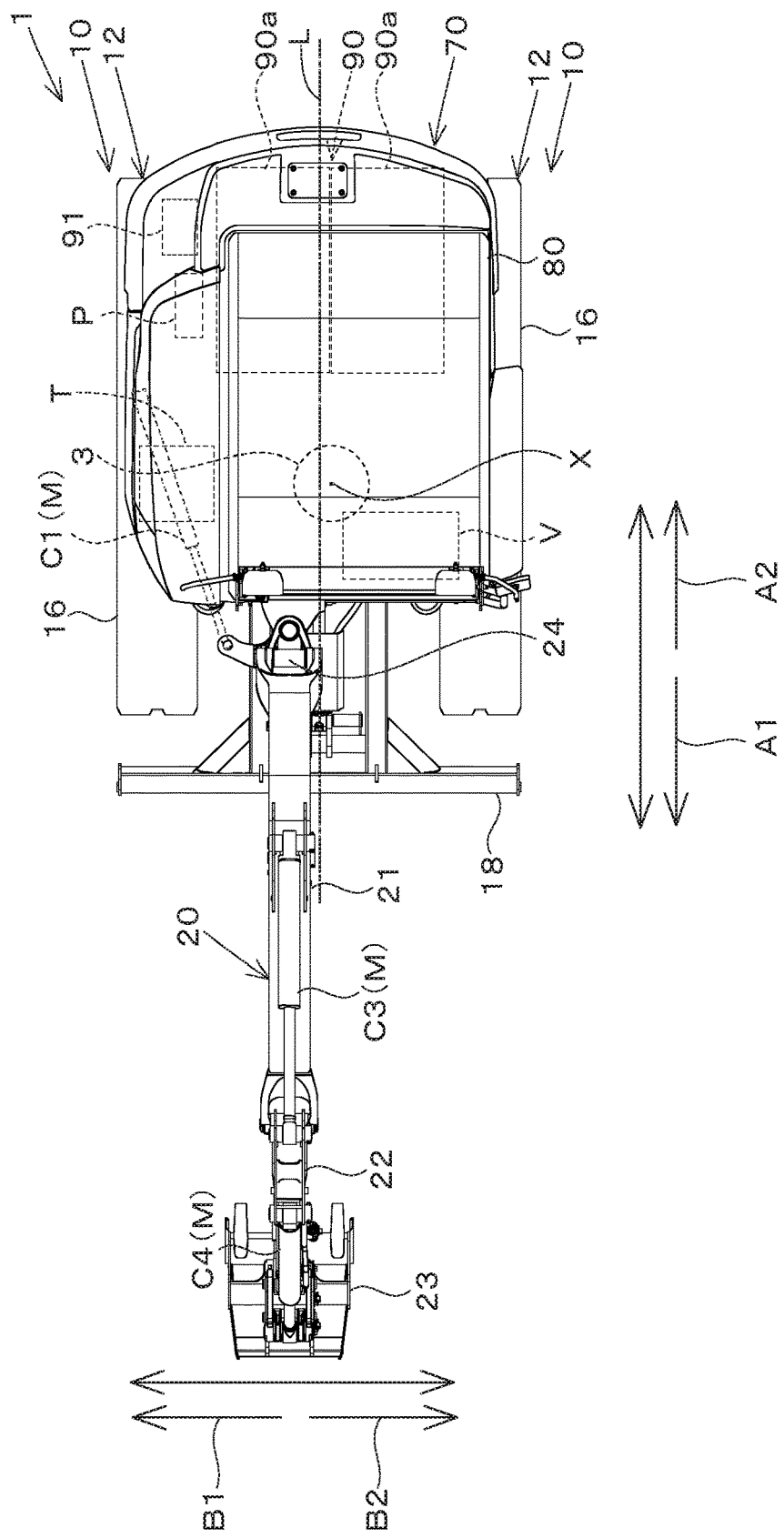
FIG. 24 is a schematic plan view illustrating a swiveling working machine.

As illustrated in FIG. 23 and FIG. 24, the lower traveling body 10 has a traveling frame 11 and a traveling mechanism 12. The traveling frame (track frame) 11 is a structure body on which the traveling mechanism 12 is mounted and that supports the swivel base 2 at an upper portion.

Figure 25:
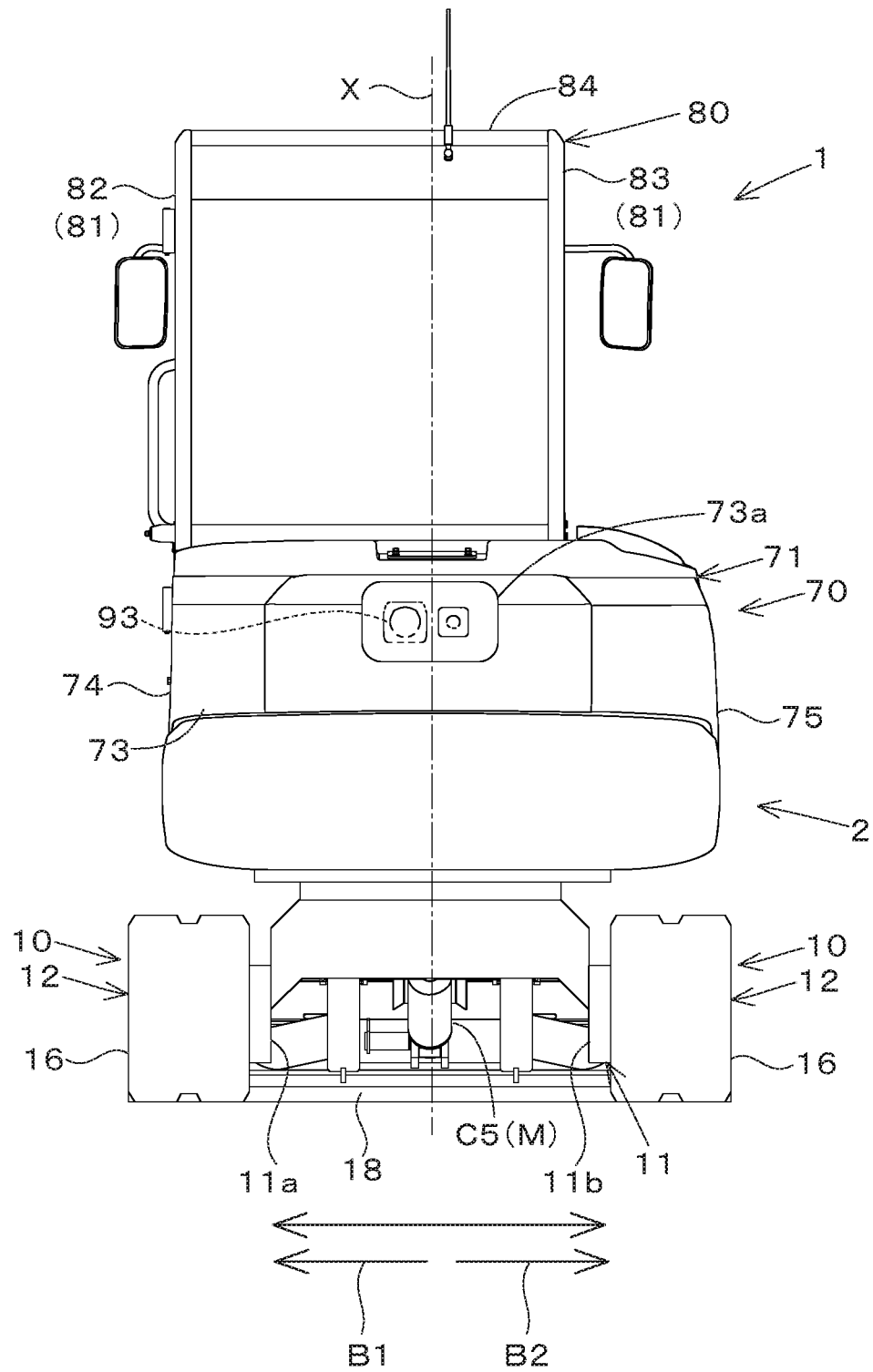
FIG. 25 is a schematic back view illustrating a swiveling working machine.

The traveling mechanism 12 is, for example, of a crawler type. As illustrated in FIG. 25, the traveling mechanism 12 is provided at each of a traveling portion 11a on one side (left side) of the traveling frame 11 in the width direction and a traveling portion 11b on the other side (right side) thereof. The traveling mechanism 12 has an idler 13, a driving wheel 14, a plurality of rolling wheels 15, an endless crawler belt 16, and hydraulic equipment M (traveling motors ML and MR) of a traveling system that is driven by a hydraulic fluid delivered by the hydraulic pump P. The idler 13 is disposed at a front portion of the traveling frame 11, and the driving wheel 14 is disposed at a rear portion of the traveling frame 11. The plurality of rolling wheels 15 are provided between the idler 13 and the driving wheel 14. The crawler belt 16 stretches to be wound around the idler 13, the driving wheel 14, and the rolling wheels 15. The traveling motors ML and MR17 each include a hydraulic motor and cause the crawler belt 16 to circulate in the circumferential direction by driving the driving wheel 14. At a front portion of the lower traveling body 10, a dozer apparatus 18 is attached. The dozer apparatus 18 is pivotably supported at a front portion of the traveling frame 11 and is swingable by a support arm. The support arm is driven upward and downward by the expansion and contraction of a dozer cylinder C5, which is a hydraulic cylinder (hydraulic actuator).

As illustrated in FIG. 23 and FIG. 24, the working device 20 is provided on the front side of the swivel base 2 and is driven by a hydraulic fluid. The working device 20 is disposed on the other side (right side) with respect to a center line L of the swivel base 2 in the width direction. The working device 20 is operated by the operation device 5. As illustrated in FIG. 23, the working device 20 has a boom 21, an arm 22, and a bucket (working tool) 23. The base end side of the boom 21 is pivotably attached to a swing bracket 24 to be rotatable around a lateral axis (an axis extending in the machine-body width direction). The boom 21 is swingable in the up-down direction (vertical direction). The arm 22 is pivotably attached to the distal end side of the boom 21 to be rotatable around the lateral axis. The arm 22 is swingable in the front-rear direction or the up-down direction. The bucket 23 is provided on the distal end side of the arm 22 to be capable of performing a shoveling operation and a dumping operation. Instead of or in addition to the bucket 23, a different working tool (hydraulic attachment) drivable by a hydraulic fluid can be attached to the swiveling working machine 1. Examples of the different working tool are a hydraulic breaker, a hydraulic crusher, an angle broom, an earth auger, a pallet fork, a sweeper, a mower, a snow blower, and the like.

As illustrated in FIG. 23, the swiveling working machine 1 includes hydraulic equipment M of a working system that is operated by a hydraulic fluid delivered by the hydraulic pump P. The working device 20 is operated by driving of the hydraulic equipment M of the working system. In the present embodiment, the hydraulic equipment M includes a swing cylinder C1, a boom cylinder C2, an arm cylinder C3, and a bucket cylinder C4. The swing cylinder C1, the boom cylinder C2, the arm cylinder C3, and the bucket cylinder C4 each include a hydraulic cylinder (hydraulic actuator). As illustrated in FIG. 23, the swing bracket 24 is swingable by the expansion and contraction of the swing cylinder C1 provided on the right side of the swivel base 2. The boom 21 is swingable by the expansion and contraction of the boom cylinder C2. The arm 22 is swingable by the expansion and contraction of the arm cylinder C3. The bucket 23 is capable of performing a shoveling operation and a dumping operation by the expansion and contraction of the bucket cylinder C4.

Hereinafter, a hydraulic circuit of the swiveling working machine 1 will be described. As illustrated in FIG. 1, the hydraulic circuit of the swiveling working machine 1 includes the hydraulic equipment M, the hydraulic pump P, a hydraulic-fluid tank T, a control valve V, a fluid passage 40, and a fluid cooler 30. The hydraulic pump P is driven by a driving source that is mounted on the swivel base 2 and that outputs power. The hydraulic pump P includes a first hydraulic pump P1, a second hydraulic pump P2, a third hydraulic pump P3, and a fourth hydraulic pump P4.

The first hydraulic pump P1, the second hydraulic pump P2, and the third hydraulic pump P3 are pumps that deliver a hydraulic fluid to the hydraulic equipment M of the working system that drives the working device 20 and to the hydraulic equipment M of the traveling system that drives the lower traveling body 10. Specifically, the first hydraulic pump P1 supplies a hydraulic fluid for driving the swing cylinder C1, the boom cylinder C2, and the traveling motor ML. The second hydraulic pump P2 supplies a hydraulic fluid for driving the arm cylinder C3, the dozer cylinder C5, and the traveling motor MR. The third hydraulic pump P3 supplies a hydraulic fluid for driving the bucket cylinder C4 and the swiveling motor MT. The first hydraulic pump P1, the second hydraulic pump P2, and the third hydraulic pump P3 are each a variable displacement hydraulic pump that includes a pump-displacement controlling mechanism, such as a swash plate or the like.

The fourth hydraulic pump P4 is a pump for supplying a hydraulic fluid for signals, control, or the like, that is, a pilot fluid. As long as the hydraulic pump P is capable of delivering a hydraulic fluid that causes the hydraulic equipment M to operate and a pilot fluid that controls the hydraulic equipment M, the configuration of the hydraulic pump P is not limited to the aforementioned configuration.

The hydraulic-fluid tank T is a tank for storing a hydraulic fluid.

As illustrated in FIG. 1, the control valve V has controlling valves V1 to V8. The controlling valves V1 to V8 regulate the hydraulic fluid that is to be output to the hydraulic equipment M from the hydraulic pump P The control valve V has the swing controlling valve V1 that controls the swing cylinder C1, the boom controlling valve V2 that controls the boom cylinder C2, the arm controlling valve V3 that controls the arm cylinder C3, the bucket controlling valve V4 that controls the bucket cylinder C4, the dozer controlling valve V5 that controls the dozer cylinder C5, the left traveling controlling valve V6 that controls the traveling motor ML of the traveling mechanism 12 on the left side, the right traveling controlling valve V7 that controls the traveling motor MR of the traveling mechanism 12 on the right side, and the swiveling controlling valve V8 that controls the swiveling motor MT.

The spools of the controlling valves V1 to V8 are moved by a pilot fluid acting thereon in proportion to the amounts of operations of remote control valves (operation valves) PV1 to PV6 by an operation lever (operation member) 5a of the operation device 5. In other words, the operation device 5 can operate the hydraulic equipment M by regulating the hydraulic fluid (pilot fluid) that acts on the controlling valves V1 to V8 and controlling the controlling valves V1 to V8. The controlling valves V1 to V8 supply a hydraulic fluid of an amount in proportion to a moved amount of each of respective spools to the hydraulic equipment M (the swing cylinder C1, the boom cylinder C2, the arm cylinder C3, the bucket cylinder C4, the dozer cylinder C5, the traveling motors ML and MR, and the swiveling motor MT) to be controlled.

The fluid cooler 30 is a device that cools the hydraulic fluid flowing in the fluid passage 40. The fluid cooler 30 is cooled by a rotatably driven fluid-cooler fan 30a. The fluid-cooler fan 30a sucks air around the fluid cooler 30 and discharges the sucked air to the outside from the inside of a rear room R formed by the exterior cover 70.

As illustrated in FIG. 1, the fluid passage 40 connects the hydraulic equipment M, the hydraulic pump P, the controlling valves V1 to V8 (control valve V), and the like to each other, and the hydraulic fluid and the pilot fluid flow through the fluid passage 40. The fluid passage 40 includes a first pipe line 41, a second pipe line 42, a third pipe line 44, and a second delivery fluid passage 45.

As illustrated in FIG. 1, the hydraulic fluid delivered by the hydraulic pump P (the first hydraulic pump P1, the second hydraulic pump P2, and the third hydraulic pump P3) flows toward the hydraulic equipment M through the first pipe line (first delivery fluid passage) 41. Specifically, the first pipe line 41 includes a first supply fluid passage 41a connected to the first hydraulic pump P1, and a plurality of second supply fluid passages 41b that branch from the first supply fluid passage 41a into the plurality of supply fluid passages. The plurality of second supply fluid passages 41b are each connected to a corresponding one of the controlling valves V1 to V8. That is, the hydraulic fluid that flows through the first pipe line 41 is supplied to the hydraulic equipment M through the first supply fluid passage 41a, the second supply fluid passages 41b, and the controlling valves V1 to V8. Note that, although the first pipe line 41 includes the first supply fluid passage 41a and the plurality of second supply fluid passages 41b in the present embodiment, the first pipe line 41 is not limited to having the aforementioned configuration and may include a fluid passage that connects the controlling valves V1 to V8 to the hydraulic equipment M as long as being a fluid passage through which at least the hydraulic fluid delivered by the hydraulic pump P flows toward the hydraulic equipment M.

As illustrated in FIG. 1, the hydraulic fluid discharged from the hydraulic equipment M flows through the second pipe line 42. Specifically, the second pipe line 42 is connected at one end side to the controlling valves V1 to V8, joins at a mid portion, and is connected at the other end side to the fluid cooler 30. Therefore, the hydraulic fluid discharged from the hydraulic equipment M returns to the second pipe line 42 through the controlling valves V1 to V8 and flows into the fluid cooler 30. Note that, although the second pipe line 42 is connected to the controlling valves V1 to V8 in the present embodiment, the second pipe line 42 is not limited to having the aforementioned configuration and may include a fluid passage connecting the controlling valves V1 to V8 to the hydraulic equipment M and through which the hydraulic fluid discharged from the hydraulic equipment M flows, as long as being a fluid passage through which at least the hydraulic fluid discharged from the hydraulic equipment M flows.

As illustrated in FIG. 1, the third pipe line 44 connects the fluid cooler 30 and the hydraulic pump P (the first hydraulic pump P1, the second hydraulic pump P2, and the third hydraulic pump P3) to each other. Through the third pipe line 44, the hydraulic fluid flows from the fluid cooler 30 to the first hydraulic pump P1, the second hydraulic pump P2, and the third hydraulic pump P3. Specifically, the third pipe line 44 includes a discharge fluid passage 44*a* through which the hydraulic fluid cooled by the fluid cooler 30 flows to the hydraulic-fluid tank T, and a suction fluid passage 44*b* through which the hydraulic fluid in the hydraulic-fluid tank T is sucked by the first hydraulic pump P1, the second hydraulic pump P2, and the third hydraulic pump P3. Therefore, the hydraulic fluid cooled by the fluid cooler 30 is returned to the hydraulic-fluid tank T through the discharge fluid passage 44*a*, and the hydraulic fluid stored in the hydraulic-fluid tank T is supplied to the first hydraulic pump P1, the second hydraulic pump P2, and the third hydraulic pump P3 through the suction fluid passage 44*b*.

As illustrated in FIG. 1, the second delivery fluid passage 45 connects the hydraulic pump P (the fourth hydraulic pump P4) to the remote control valves PV1 to PV6. The hydraulic fluid delivered by the fourth hydraulic pump P4 flows to the remote control valves PV1 to PV6 through the second delivery fluid passage 45. The second delivery fluid passage 45 branches at a mid portion into a plurality of second delivery fluid passages that are each connected to a port (primary port) on the primary side of a corresponding one of the remote control valves PV1 to PV6.

As illustrated in FIG. 1, the swiveling working machine 1 includes a driving limitation device 47 that prohibits or limits driving of the working device 20. The driving limitation device 47 prohibits or limits driving of the hydraulic equipment M by interrupting supply of the hydraulic fluid from the hydraulic pump P to the hydraulic equipment M. For example, the driving limitation device 47 can switch between an allowed state in which supply of the hydraulic fluid to the remote control valves PV1 to PV6 is allowed to enable operations of the controlling valves V1 to V8, that is, an operation of the hydraulic equipment M and a state in which supply of the hydraulic fluid to the remote control valves PV1 to PV6 is stopped to prohibit or limit operations of the controlling valves V1 to V8, that is, an operation of the hydraulic equipment M. Thus, the driving limitation device 47 prohibits or limits driving of the hydraulic equipment M, in other words, prohibits or limits driving of the working device 20.

In the present embodiment, the driving limitation device 47 includes an unload valve 48 provided in the second delivery fluid passage 45, and an unload lever (unload operation actuator) 5*b* for operating the unload valve 48. The unload valve 48 is a two-position switching valve switchable between a supply position 48*a* and an interruption position 48*b*. At the supply position 48*a*, the unload valve 48 supplies the hydraulic fluid flowing through the second delivery fluid passage 45 to the remote control valves PV1 to PV6. At the interruption position 48*b*, the unload valve 48 interrupts supply of the hydraulic fluid to the remote control valves PV1 to PV6, in other words, stops supply of the hydraulic fluid in the second delivery fluid passage 45 to the remote control valves PV1 to PV6.

The unload valve 48 is urged by a spring in a direction in which the unload valve 48 is to be switched to the interruption position (unload position) 48*b* and is switched to the interruption position 48*b* by deenergization of a solenoid and is switched to the supply position 48*a* by energization of the solenoid. Specifically, the unload valve 48 is energized at a position where the unload operation actuator 5*b* is lowered, and is deenergized by lifting of the unload operation actuator 5*b*.

Therefore, when the unload operation actuator 5*b* is lowered, the unload valve 48 is switched to the supply position 48*a*, and the hydraulic fluid (delivered fluid) delivered from the fourth hydraulic pump P4 is supplied via the unload valve 48 to the primary-side ports of the remote control valves PV1 to PV6.

When the unload operation actuator 5*b* is lifted, the unload valve 48 is switched to the interruption position 48*b*, and the hydraulic fluid (pilot fluid) is not supplied to the remote control valves PV1 to PV6 to disable the operation of the hydraulic equipment M.

In the present embodiment, the driving limitation device 47 is the unload valve 48 that prohibits or limits driving of the hydraulic equipment M by interrupting supply of the hydraulic fluid from the hydraulic pump P to the hydraulic equipment M; However, the driving limitation device 47 may have a configuration in which an operable locking piece (not illustrated) is attached to the operation device 5 (operation lever 5*a*) for operating the hydraulic equipment M (working device 20), and driving of the hydraulic equipment M is prohibited or limited by restraining the movement of the operation lever 5*a*. In such a case, the driving limitation device 47 is a lever lock that restrains the movement of the operation lever 5*a*.

Figure 2:
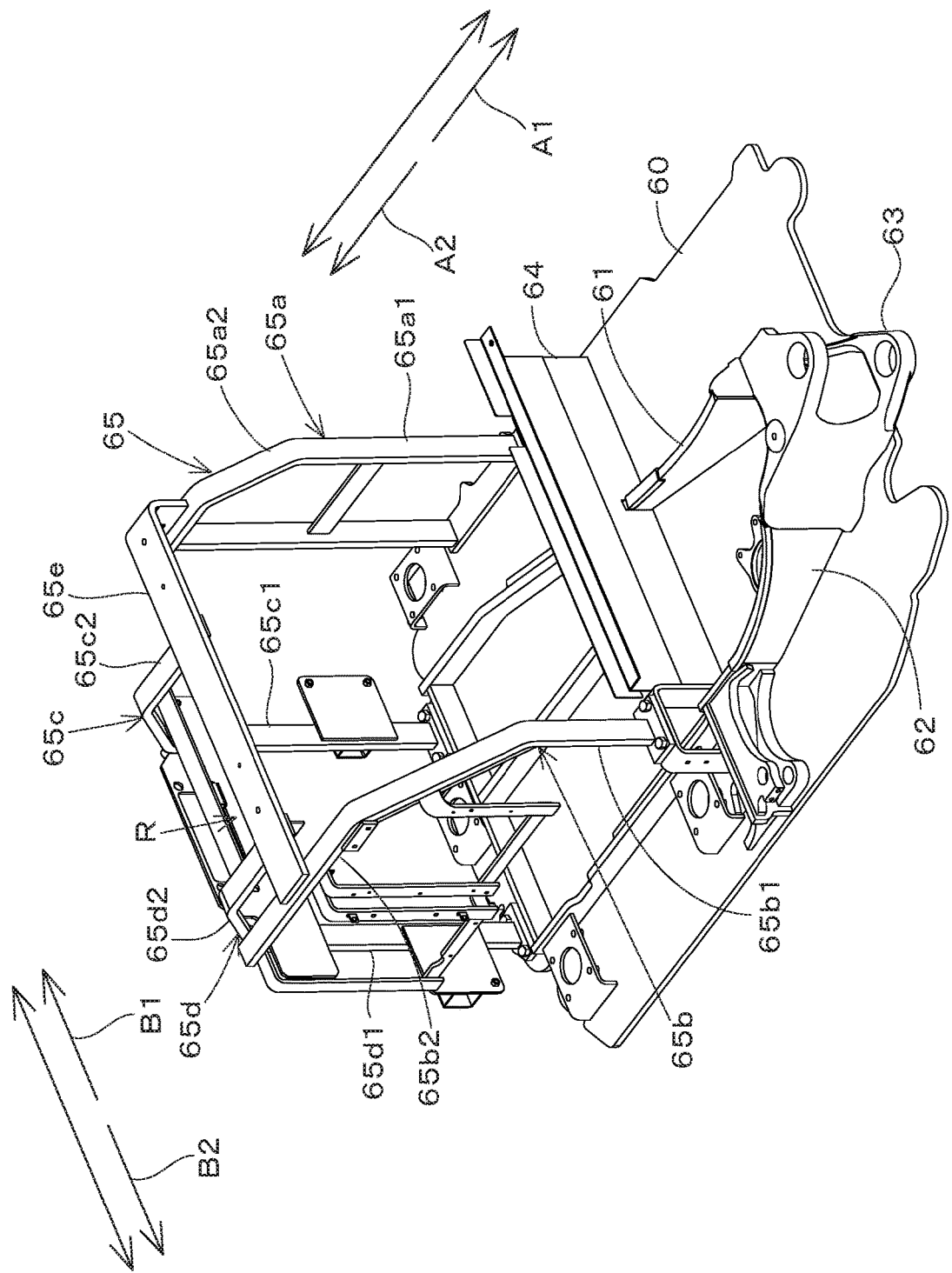
FIG. 2 is a right-front perspective view illustrating a swivel base.
Figure 3:
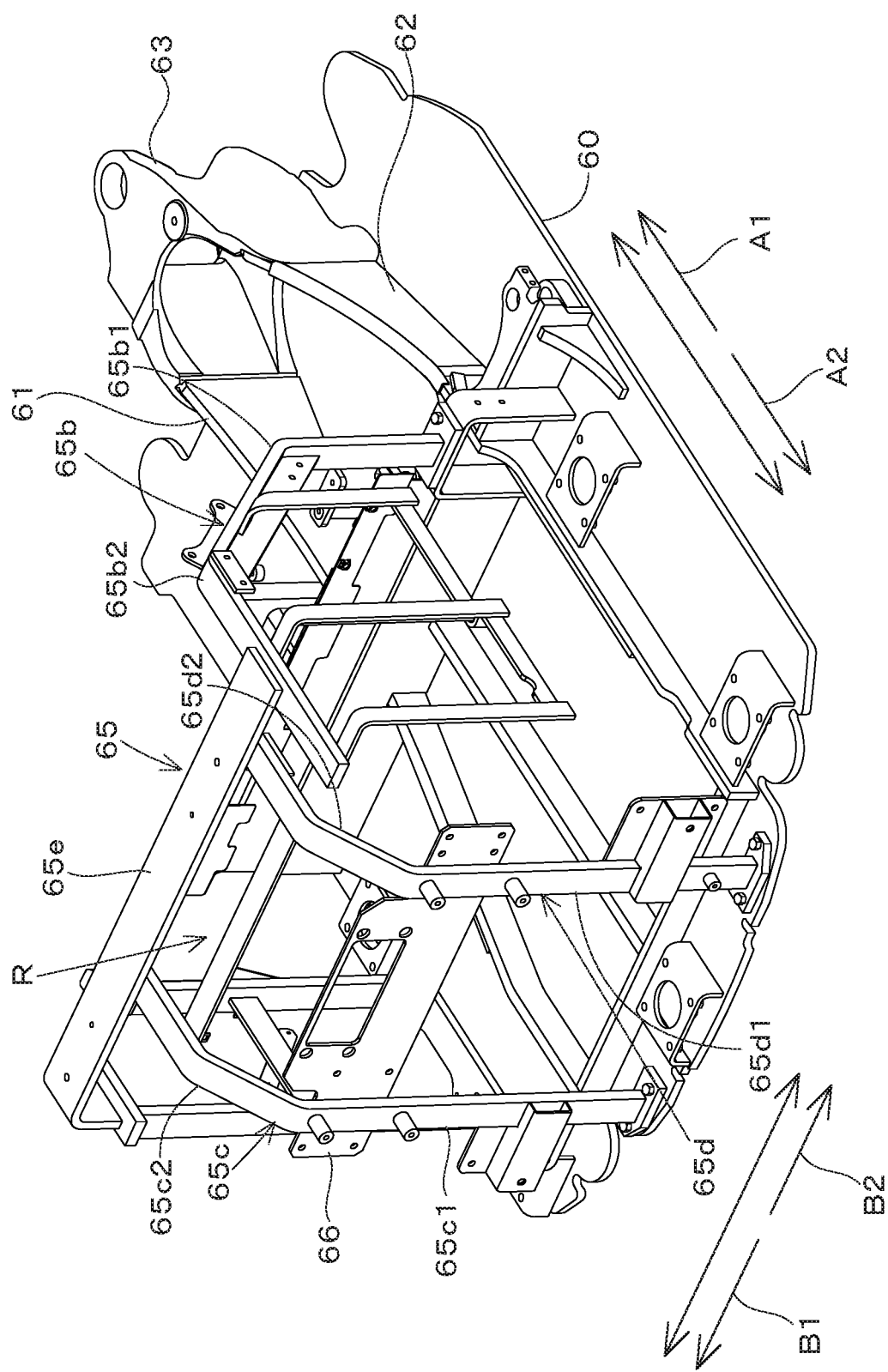
FIG. 3 is a right-rear perspective view illustrating a swivel base.

Hereinafter, the swivel base 2 will be described. As illustrated in FIG. 2 and FIG. 3, the swivel base 2 has the swivel substrate (substrate) 60, a plurality of vertical ribs (a first vertical rib 61 and a second vertical rib 62), a support bracket 63, a partition plate 64, and a support frame 65. The swivel substrate 60 is formed of a thick steel sheet or the like and disposed such that plate surfaces thereof are directed upward and downward. The swivel substrate 60 is supported above the lower traveling body 10 via the swivel bearing 3 to be rotatable around the swiveling axis X.

As illustrated in FIG. 2 and FIG. 3, the first vertical rib 61 and the second vertical rib 62 are members that reinforce the swivel substrate 60 and are provided to extend from a front portion to a rear portion of the swivel substrate 60. The first vertical rib 61 and the second vertical rib 62 stand on the swivel substrate 60 and are arranged side by side to be away from each other in the width direction. The first vertical rib 61 is disposed on the left side of the swivel substrate 60, and the second vertical rib 62 is disposed on the right side of the swivel substrate 60.

Figure 4:
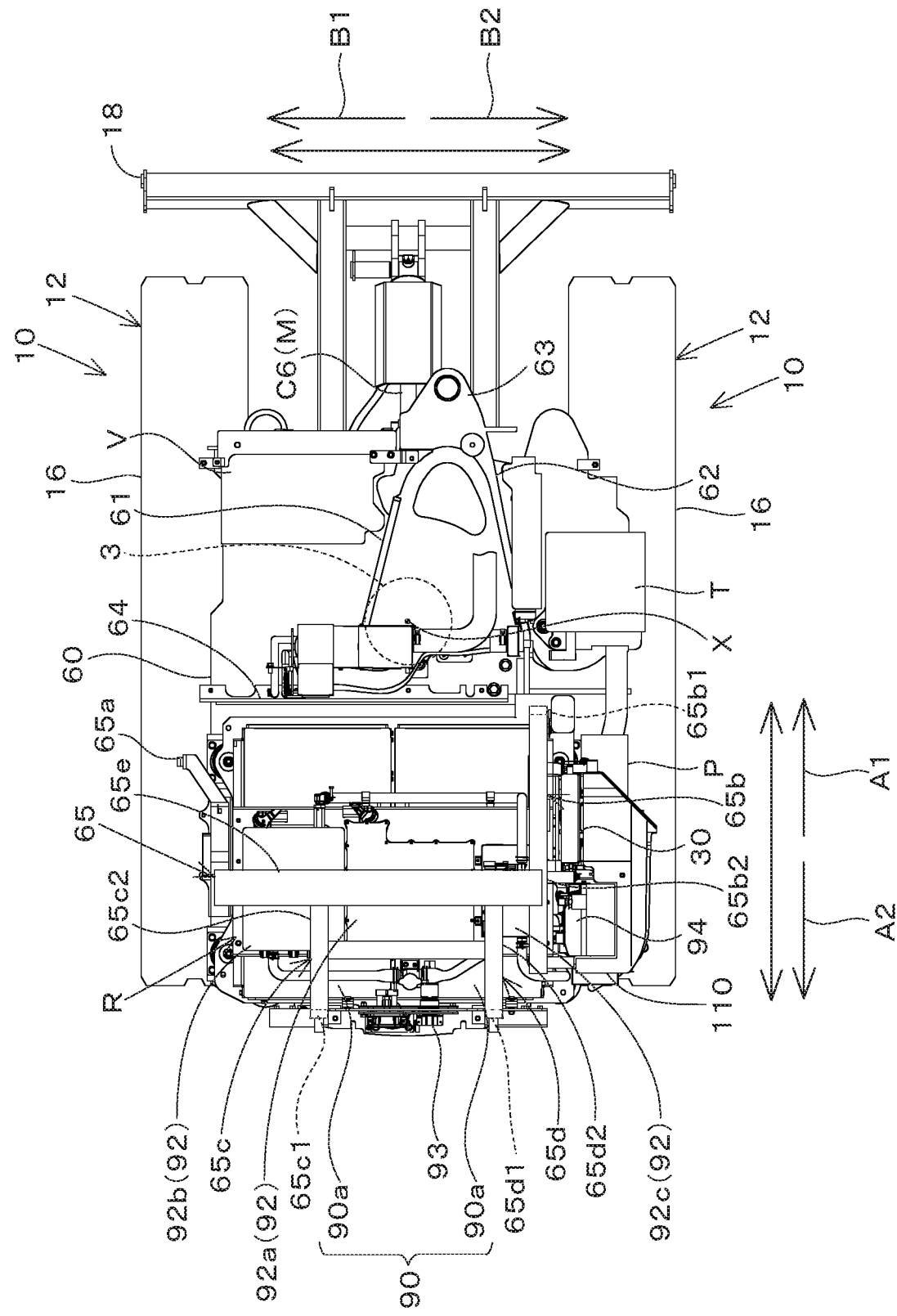
FIG. 4 is a plan view illustrating a lower traveling body, a swivel base, and various devices and the like disposed at the swivel base.

As illustrated in FIG. 2 and FIG. 3, the support bracket 63 is provided at a front portion of the first vertical rib 61 and the second vertical rib 62. As illustrated in FIG. 4, the support bracket 63 and the front portion of the first vertical rib 61 and the second vertical rib 62 are each provided at a position deviated rightward from the center of the swivel substrate 60 in the width direction. As illustrated in FIG. 23, the swing bracket 24 is attached to the support bracket 63 to be swingable around the vertical axis (an axis extending in the up-down direction). The proximal end side of the working device 20 (boom 21) is attached to the swing bracket 24 to be rotatable around the lateral axis.

As illustrated in FIG. 2, the partition plate 64 is a member that partitions a front lower portion of the rear room R. The partition plate 64 has plate surfaces that are directed forward and rearward and is disposed at a rear portion of the swivel substrate 60 to stretch from one side (left side) to the other side (right side) in the width direction.

As illustrated in FIG. 2, FIG. 3, and FIG. 4, the support frame 65 stands at a rear portion of the swivel substrate 60 and rearward of the partition plate 64. A rear portion of the support frame 65 is positioned rearward of a rear portion of the lower traveling body 10. Specifically, the support frame 65 is disposed inside the rear room R and supports the exterior cover 70 and peripheral components disposed in the inside of the exterior cover 70. The support frame 65 has a plurality of leg members (a first leg 65*a*, a second leg 65*b*, a third leg 65*c*, and a fourth leg 65*d*) that stand at the swivel substrate 60, and a rod member 65*e* that is fixed to upper portions of the plurality of leg members.

As illustrated in FIG. 2 and FIG. 3, the first leg 65*a* has a first pillar portion 65*a*1 and a first extension portion 65*a*2. The first pillar portion 65*a*1 stands on the left side of a front portion of the rear room R and extends in the up-down direction. Specifically, the lower end of the first pillar portion 65*a*1 is attached to the left side of a rear surface of the partition plate 64. The first extension portion 65*a*2 extends rearward and upward from the upper end of the first pillar portion 65*a*1, is bent at a mid portion, and extends rearward.

As illustrated in FIG. 2 and FIG. 3, the second leg 65*b* has a second pillar portion 65*b*1 and a second extension portion 65*b*2. The second pillar portion 65*b*1 stands on the right side of a front portion of the rear room R and extends in the up-down direction. Specifically, the lower end of the second pillar portion 65*b*1 is attached to the right side of the partition plate 64. In other words, the lower end of the second pillar portion 65*b*1 is positioned forward of the first pillar portion 65*a*1. The second extension portion 65*b*2 extends rearward and upward from the upper end of the second pillar portion 65*b*1, is bent at a mid portion, and extends rearward.

As illustrated in FIG. 2 and FIG. 3, the third leg 65*c* has a third pillar portion 65*c*1 and a third extension portion 65*c*2. The third pillar portion 65*c*1 stands on the left side of a rear portion of the rear room R and extends in the up-down direction. A rear portion of the third pillar portion 65*c*1 is positioned rearward of a rear portion of the lower traveling body 10. The third extension portion 65*c*2 extends forward and upward from the upper end of the third pillar portion 65*c*1, is bent at a mid portion, and extends forward.

As illustrated in FIG. 2 and FIG. 3, the fourth leg 65*d* has a fourth pillar portion 65*d*1 and a fourth extension portion 65*d*2. The fourth pillar portion 65*d*1 stands at a rear portion of the rear room R and extends in the up-down direction. A rear portion of the fourth pillar portion 65*d*1 is positioned rearward of the rear portion of the lower traveling body 10. The fourth extension portion 65*d*2 extends forward and upward from the upper end of the fourth pillar portion 65*d*1, is bent at a mid portion, and extends forward.

Figure 6:
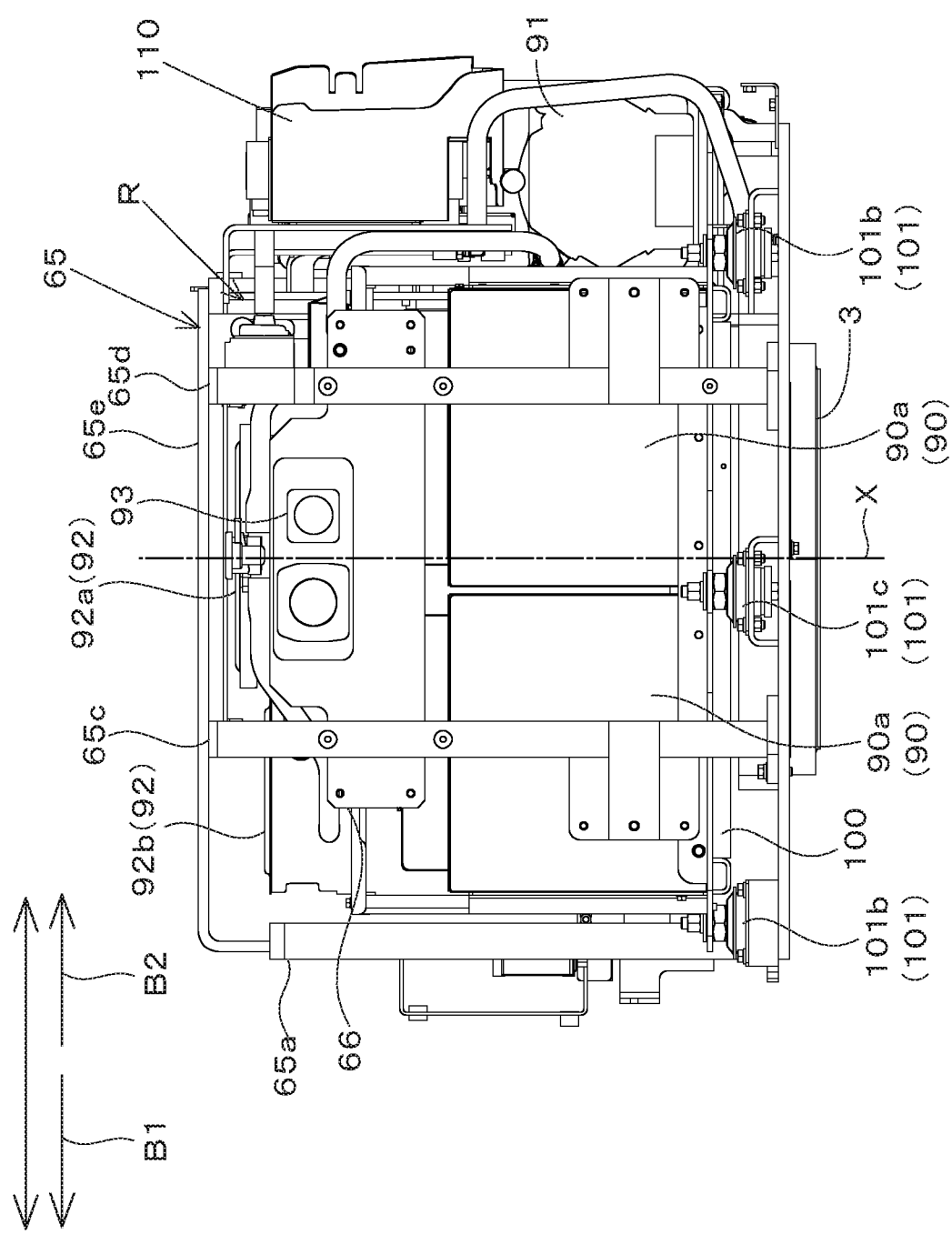
FIG. 6 is a back view illustrating a lower traveling body, a swivel base, and various devices and the like disposed at the swivel base.

As illustrated in FIG. 2 and FIG. 3, the rod member 65*e* has plate surfaces that are directed upward and downward and is disposed to extend in the width direction. The rod member 65*e* stretches to be placed on the upper end of the first extension portion 65*a*2, the upper end of the second extension portion 65*b*2, and the upper ends of the third extension portion 65*c*2 and the fourth extension portion 65*d*2 and is fixed to these extension portions. Specifically, as illustrated in FIG. 6, the rod member 65*e* extends leftward from the upper end of the first extension portion 65*a*2, is bent downward at a left end portion, and reaches the upper end of the second extension portion 65*b*2.

Figure 7:
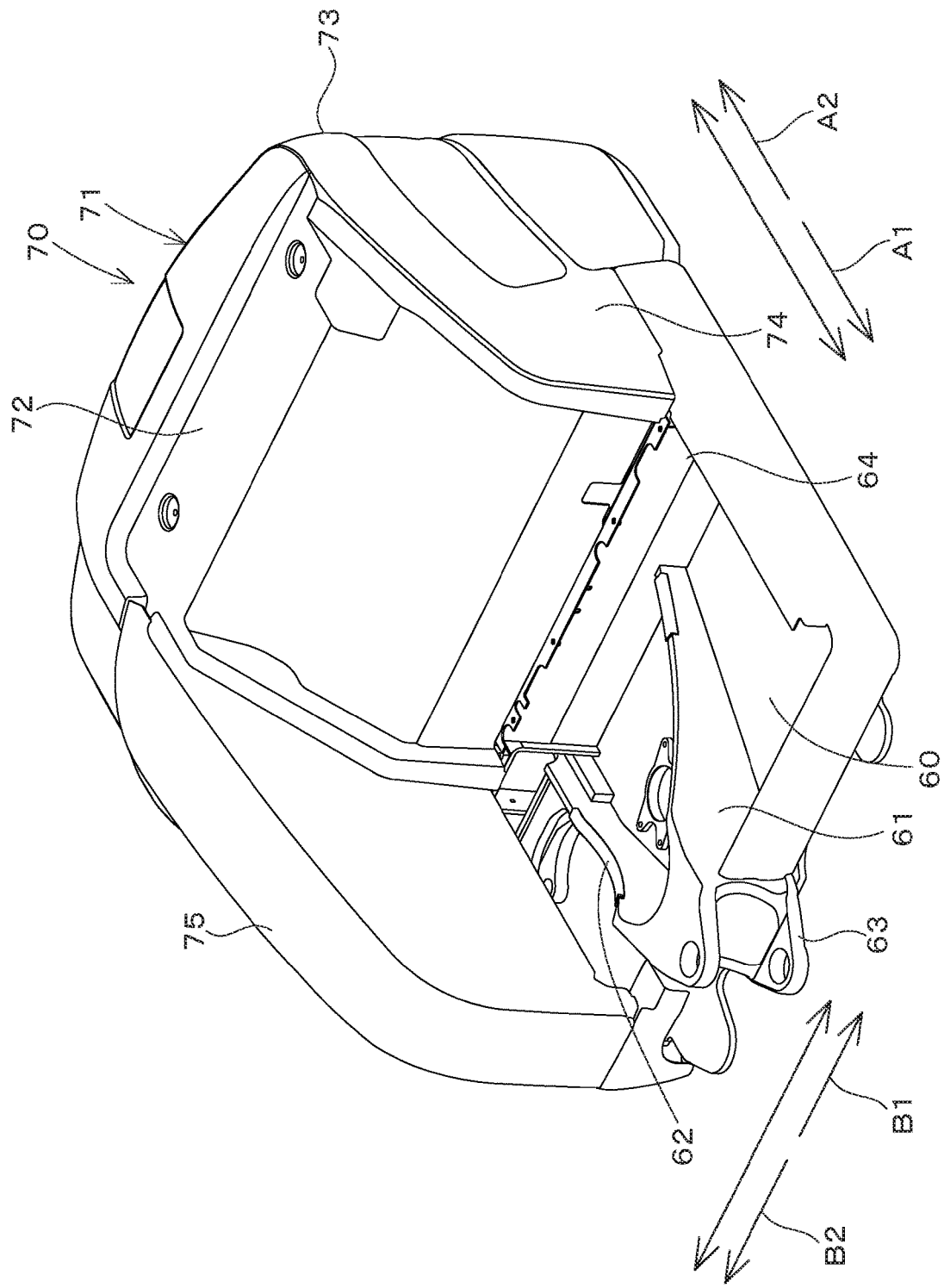
FIG. 7 is a left-front perspective view illustrating a swivel base and an exterior cover.
Figure 8:
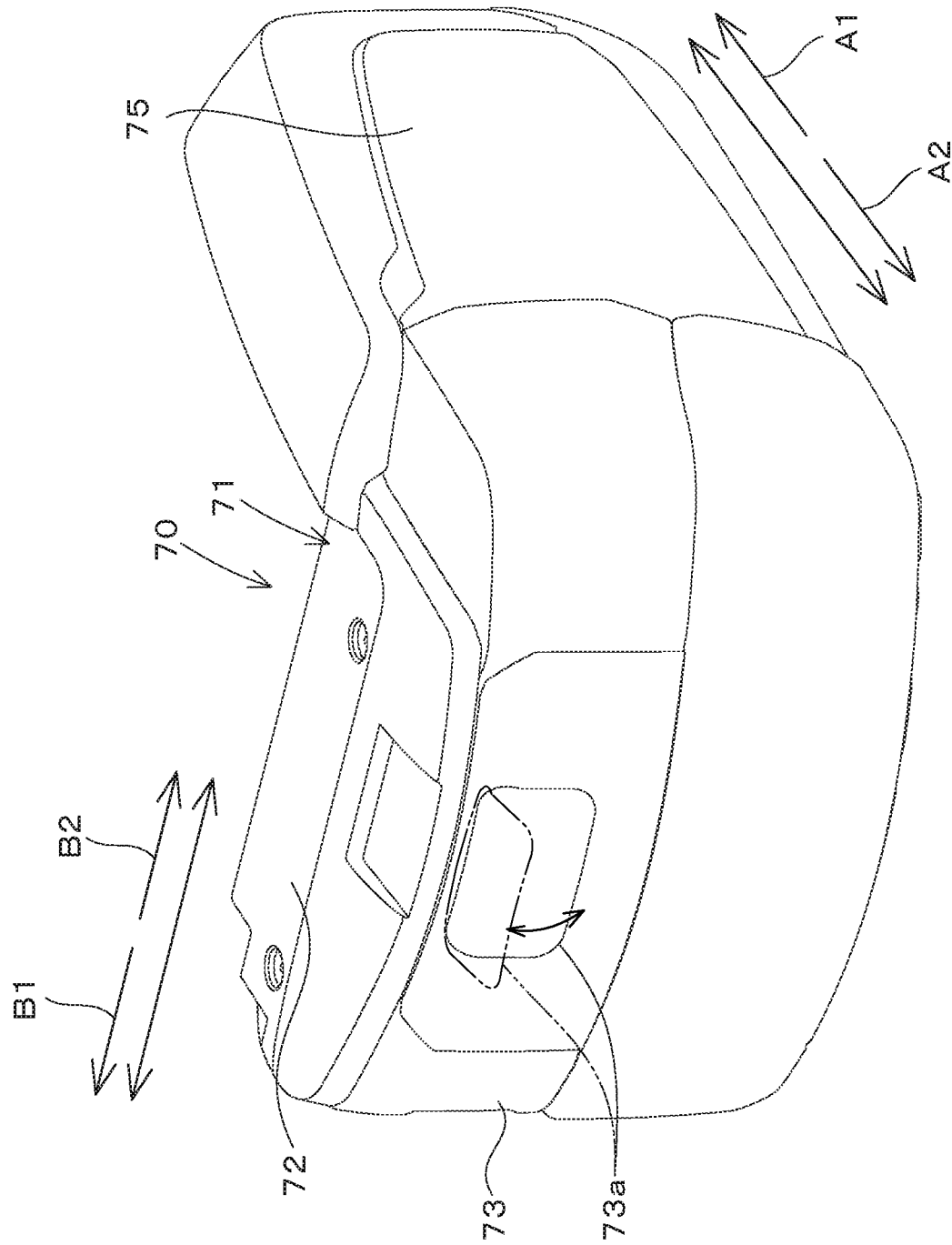
FIG. 8 is a right-rear perspective view illustrating a swivel base and an exterior cover.

As illustrated in FIG. 7 and FIG. 8, the exterior cover 70 has a hood 71. The hood 71 includes a hood center 72, a rear hood 73, a first side hood 74, and a second side hood 75. The hood center 72 is a cover member that forms the upper side and the front side of the rear room R and insulates the side of the inside (interior) of the protecting mechanism 80 and the side of the rear room R from each other. The hood center 72 is attached to an upper portion of the rod member 65*e*, and a lower portion of the hood center 72 is attached to an upper portion of the partition plate 64. The rear hood 73 is a cover member that forms the rear side of the rear room R and is attached to the support frame 65. The first side hood 74 is a cover member that forms the left side of the rear room R. The second side hood 75 is a cover member that forms the right side of the rear room R. The second side hood 75 has an opening through which the inside of the rear room R (hood 71) and the outside are in communication with each other.

Figure 9:
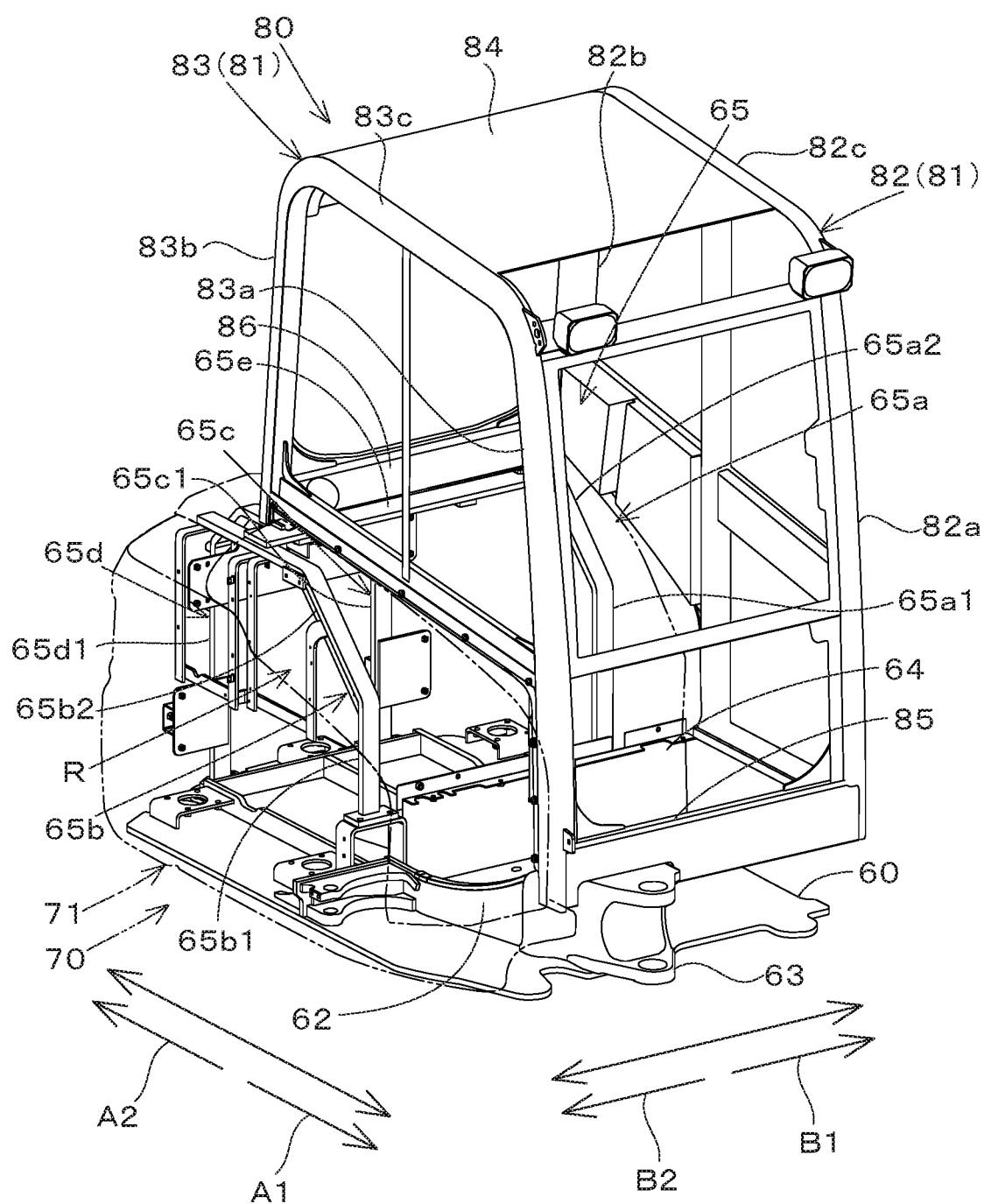
FIG. 9 is a right-front perspective view illustrating a swivel base and a protecting mechanism.

Hereinafter, the protecting mechanism 80 that is provided on the swivel base 2 and that covers the operator seat 8 will be described. As illustrated in FIG. 23 and FIG. 24, the protecting mechanism 80 is mounted near a front portion of the swivel base 2 and protects the operator seat 8. The protecting mechanism 80 is disposed on one side (left side) with respect to the center line L of the swivel base 2 in the width direction. As illustrated in FIG. 9, the protecting mechanism 80 has a pillar 81 and a roof 84 that is supported by the pillar 81. In the present embodiment, the pillar 81 has a first pillar 82 disposed on one side (left side) of the swivel base 2 in the width direction, and a second pillar 83 disposed on the other side (right side) thereof in the width direction, and the protecting mechanism 80 is a cabin. The structure of the protecting mechanism 80 is not limited to having the aforementioned configuration and may be a cabin having a two-pillar structure or a three-pillar structure or may be a canopy.

As illustrated in FIG. 9, the first pillar 82 includes a first front pillar 82*a* disposed at a front portion on one side (left side) of the swivel base 2 in the width direction, a first rear pillar 82*b* disposed at a left-side rear portion of the swivel base 2, and a first upper coupling portion 82*c* that couples the upper end of the first front pillar 82*a* and the upper end of the first rear pillar 82*b* to each other. The first front pillar 82*a* and the first rear pillar 82*b* are provided on the left side of the swivel base 2 to be spaced from each other in the front-rear direction and each extend in the up-down direction. The first upper coupling portion 82*c* is curved rearward from the upper end of the first front pillar 82*a*, is curved downward at a mid portion, and reaches the upper end of the first rear pillar 82*b*.

As illustrated in FIG. 9, the second pillar 83 includes a second front pillar 83*a* disposed at a front portion on the other side (right side) of the swivel base 2 in the width direction, a second rear pillar 83*b* disposed at a right-side rear portion of the swivel base 2, and a second upper coupling portion 83*c* that couples the upper end of the second front pillar 83*a* and the upper end of the second rear pillar 83*b* to each other. The second front pillar 83*a* and the second rear pillar 83b are provided on the right side of the swivel base 2 to be spaced from each other in the front-rear direction and each extend in the up-down direction. The second upper coupling portion 83c is curved rearward from the upper end of the second front pillar 83a, is curved downward at a mid portion, and reaches the upper end of the second rear pillar 83b.

As illustrated in FIG. 9, the roof 84 is a structure body disposed above the operator seat 8 and having a substantially plate shape in plan view and is supported at an upper portion of the pillar 81 such that plate surface thereof are directed upward and downward. The roof 84 is provided to stretch between the first upper coupling portion 82c and the second upper coupling portion 83c, extends to stretch from a front portion to a rear portion of the swivel base 2, and extends to stretch from one side (left side) to the other side (right side) of the swivel base 2 in the width direction.

As illustrated in FIG. 9, the lower end portion of a front portion of the protecting mechanism 80 is provided with a front lower frame 85. The front lower frame 85 is provided to stretch between the lower end portion of the first front pillar 82a and the lower end portion of the second front pillar 83a. The front lower frame 85 extends in the width direction and is attached to a front upper portion of the swivel base 2 via a plurality of support mounts (not illustrated).

As illustrated in FIG. 9, the lower end portion of a rear portion of the protecting mechanism 80 is provided with a rear lower frame 86. The rear lower frame 86 is provided to stretch between the lower end portion of the first rear pillar 82b and the lower end portion of the second rear pillar 83b. The rear lower frame 86 is provided at a position higher than the front lower frame 85. The rear lower frame 86 extends in the width direction and is attached to an upper portion of the hood center 72 via a plurality of support mounts (not illustrated) and disposed at an upper portion of the rod member 65e.

Figure 5:
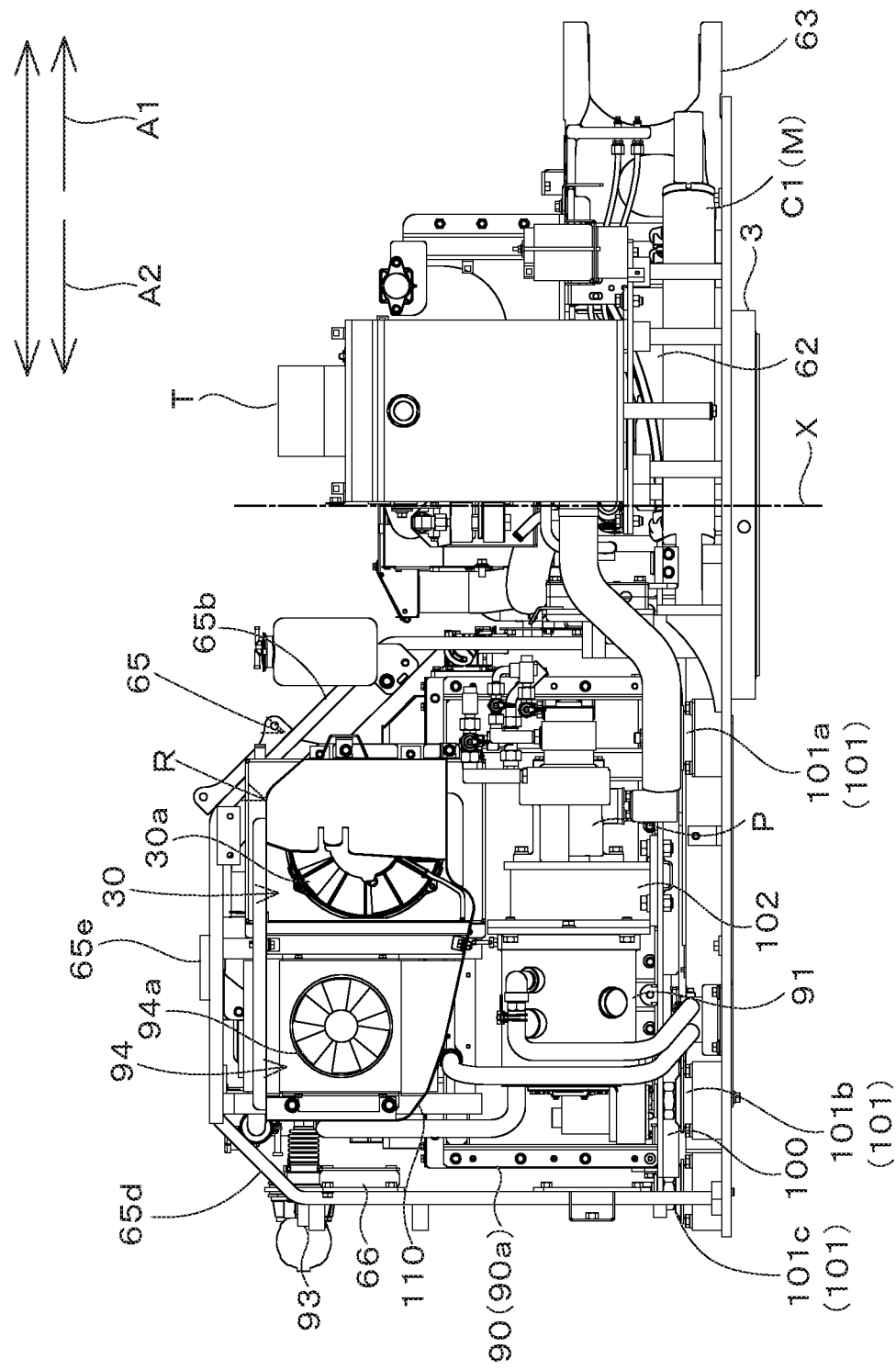
FIG. 5 is a left side view illustrating a swivel base and various devices and the like disposed at the swivel base.
Figure 11:
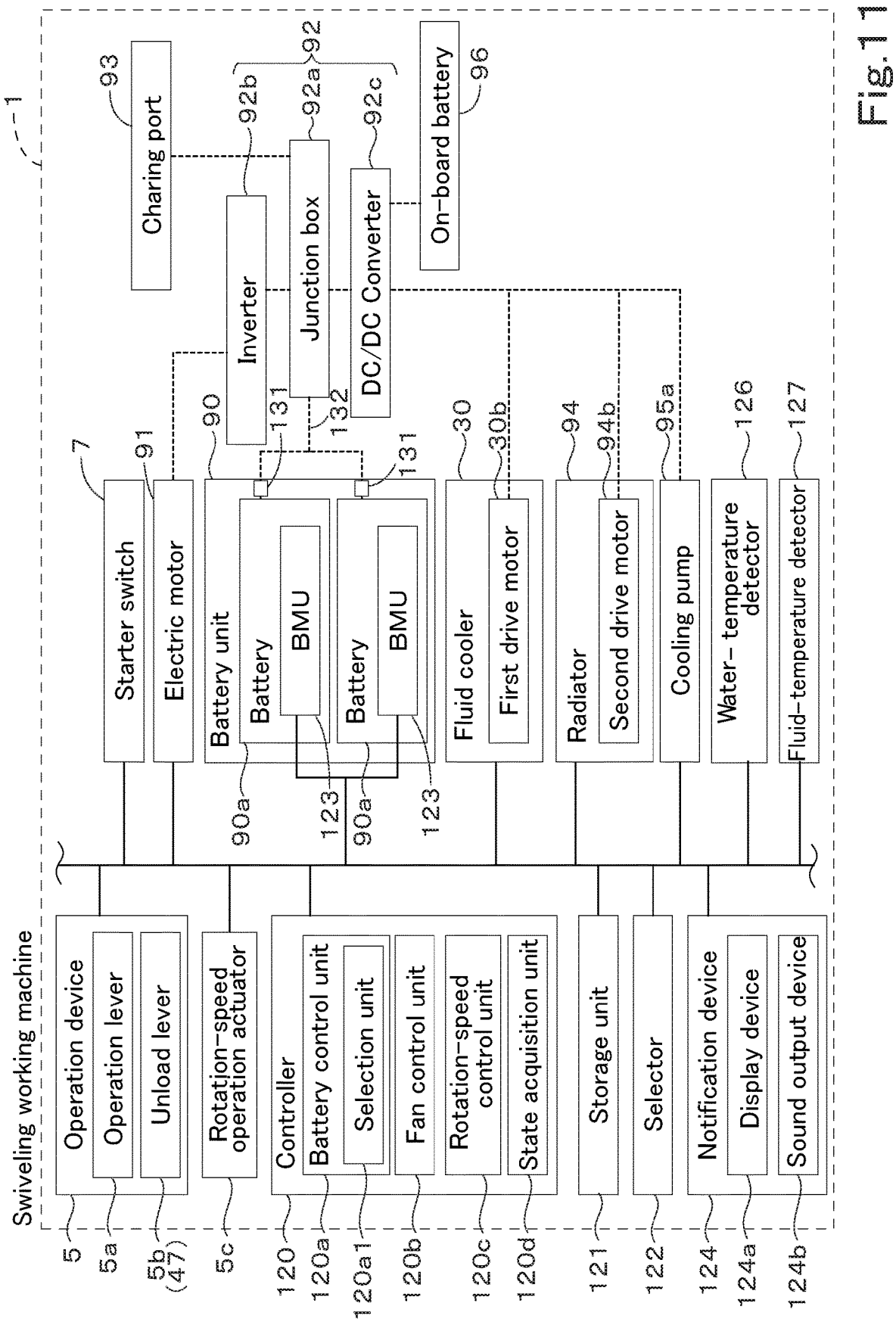
FIG. 11 is a diagram describing a system of a swiveling working machine.

Hereinafter, devices mounted in the rear room R of the swivel base 2 will be described. As illustrated in FIG. 11, the swiveling working machine 1 includes a battery unit 90, an electric motor 91, electrical components 92, a charging port 93, and a radiator 94. As illustrated in FIG. 4, FIG. 5, and FIG. 6, the battery unit 90, the electric motor 91, the electrical components 92, the charging port 93, and the radiator 94 are provided at the swivel base 2. The battery unit 90 is a structure body that can store electric power and that outputs the stored electric power.

The electric motor 91 is a driving source that is driven by electric power output by the battery unit 90. The electric motor 91 is a three-phase AC synchronous motor of an interior permanent magnet type. The electric motor 91 has a rotatable rotor (rotor element) and a stator (stator element) that generates power for rotating the rotor. The rotation speed of the electric motor 91 is operated by, for example, a rotation-speed operation actuator 5c. By the rotation-speed operation actuator 5c, a range of the motor rotation speed of the electric motor 91 when the motor rotation speed of the electric motor 91 is to be set in accordance with a current value that changes in response to an operation of the operation device 5 can be set. The rotation-speed operation actuator 5c is, for example, a dial-shaped switch, such as a selector switch or the like, having a plurality of switch positions, and target values of the rotation speed of the electric motor 91 are assigned to the plurality of switch positions. By the rotation-speed operation actuator 5c, the range of the target values of the rotation speed of the electric motor 91 can be operated and set in a range of from 1500 to 2600 rpm/min. The electric motor 91 may be a synchronous motor of a different type and may be an alternating current motor or a direct current motor. The operation of the rotation speed of the electric motor 91 is not limited to be performed by the rotation-speed operation actuator 5c and may be performed by a different member of the operation device 5. For example, the rotation speed of the electric motor 91 may be operated in accordance with the operation amount of the operation device 5 on the basis of a previously set table.

The electric motor 91 rotates the drive shaft by electric power supplied from the battery unit 90 and transmits a driving force from the drive shaft to the hydraulic pump P. The hydraulic pump P is coupled to the drive shaft of the electric motor 91 and is driven by the driving force transmitted from the drive shaft. In other words, the hydraulic pump P is driven by driving of the electric motor 91 and delivers a hydraulic fluid.

The electrical components 92 are each a device or the like that is directly or indirectly connected to the battery unit 90 and that transmits electric power supplied by the battery unit 90 or that is operated by the electric power. The electrical components 92 are, for example, a junction box 92a, an inverter 92b, and a DC/DC converter 92c. The junction box 92a is connected to the other devices including the battery unit 90 and the inverter 92b and transmits electric power supplied from the battery unit 90 to the other devices.

The inverter 92b is provided in a power supply path 132 from the battery unit 90 to the electric motor 91 and regulates electric power that is to be output to the electric motor 91. In the present embodiment, the inverter 92b is connected to the junction box 92a and the electric motor 91. The inverter 92b is an apparatus that drives the electric motor 91. The inverter 92b converts direct current power to three-phase AC power and supplies the three-phase AC power to the electric motor 91. The inverter 92b can optionally change the current and the voltage of the electric power that is to be supplied to the electric motor 91.

The DC/DC converter 92c converts the voltage of input direct current into a different voltage. In the present embodiment, the DC/DC converter 92c is a step-down converter that converts an input voltage into a lower voltage. The DC/DC converter 92c is provided at, for example, the swiveling working machine 1 and supplies electric power to an on-board battery 96 that supplies a power source to an electronic device.

The charging port 93 is a socket to which a cable is to be connected, and through the cable, electric power is supplied from outside to be stored in the battery unit 90. As illustrated in FIG. 6, the charging port 93 is attached to a rear portion of the support frame 65. The support frame 65 is attached to a support stay 66 that stretches to be attached to a mid portion of the third pillar portion 65c1 in the up-down direction and a mid portion of the fourth pillar portion 65d1 in the up-down direction. The support stay 66 is disposed to extend in the width direction and supports the charging port 93 at a center portion in the width direction. As illustrated in FIG. 8, when to be connected with the cable through which electric power is supplied from outside, the charging port 93 is exposed from the exterior cover 70 by opening a charging lid (cover member) 73a attached to the rear hood 73. The charging lid 73a is coupled by a hinge or the like to the rear hood 73 and the support frame 65 in a swingable manner and can be opened and closed around the swing axis of the hinge. At least at a portion of the rear hood 73 corresponding to the charging port 93 is openable and closable. The method of opening and closing is not limited to the above-described charging lid 73a and may be, for example, a cover member openable and closing by being slid.

The radiator 94 is an apparatus that cools cooling water (refrigerant) for cooling the electric motor 91, the battery unit 90, the electrical components 92, and the like. The radiator 94 is cooled (heat is removed) by a radiator fan 94a. The radiator fan 94a is rotatably driven to thereby generate cooling air and remove heat from the radiator 94. The radiator fan 94a sucks air around the radiator 94 and discharges the air from the inside of the rear room R through an opening of the exterior cover 70 to the outside of the rear room R. Consequently, cooling air whose temperature is increased by exchanging heat with the radiator 94 is discharged to the outside.

Figure 12:
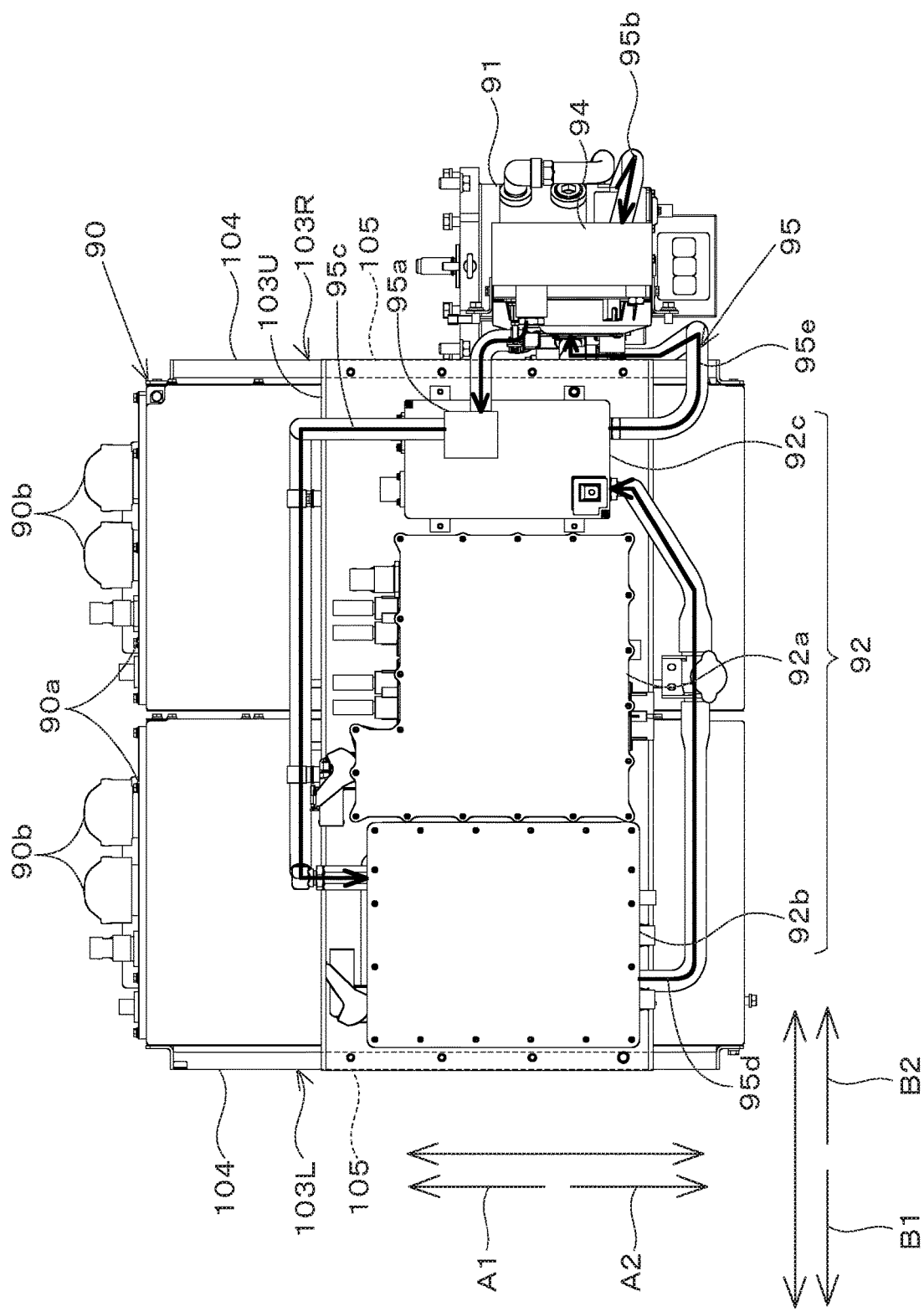
FIG. 12 is a plan view illustrating a battery unit, electrical components, and a radiator.

As illustrated in FIG. 12, the swiveling working machine 1 includes a water cooling path 95 connecting the radiator 94, the electric motor 91, the battery unit 90, the electrical components 92 (for example, the inverter 92b and the DC/DC converter 92c), and the like to each other and along which a refrigerant cooled by the radiator 94 and a refrigerant whose heat has been exchanged with the electric motor 91, the battery unit 90, and the electrical components 92 flow. The water cooling path 95 is provided with a cooling pump 95a that delivers cooling water and circulates the cooling water as a refrigerant. In the present embodiment, along the water cooling path 95, the cooling water is circulated from the radiator 94 through the inverter 92b, the DC/DC converter 92c, and the electric motor 91 to the radiator 94. Specifically, the water cooling path 95 includes a sending water path 95b, a returning water path 95c, a first water path 95d, and a second water path 95e.

As illustrated in FIG. 12, the sending water path 95b is a water path for sending a refrigerant from the electrical components 92, the electric motor 91, and the like to the radiator 94. In detail, the sending water path 95b connects the electric motor 91 and the radiator 94 to each other, and the refrigerant from the electric motor 91 toward the radiator 94 flows along the sending water path 95b. The returning water path 95c is a water path for returning the refrigerant from the radiator 94 to the electrical components 92, the electric motor 91, and the like. In detail, the returning water path 95c connects the radiator 94 and the inverter 92b to each other, and the refrigerant from the radiator 94 toward the inverter 92b flows along the returning water path 95c.

The first water path 95d connects the inverter 92b and the DC/DC converter 92c to each other, and the refrigerant from the inverter 92b toward the DC/DC converter 92c flows along the first water path 95d. The second water path 95e connects the DC/DC converter 92c and the electric motor 91 to each other, and the refrigerant from the DC/DC converter 92c toward the electric motor 91 flows along the second water path 95e. In other words, the cooling water cooled by the radiator 94 returns from the radiator 94 through the returning water path 95c, the inverter 92b, the first water path 95d, the DC/DC converter 92c, the second water path 95e, the electric motor 91, and the sending water path 95b to the radiator 94.

As illustrated in FIG. 4 and FIG. 5, the rear room R is provided with the fluid cooler 30, the hydraulic-fluid tank T, and the control valve V (controlling valves V1 to V8), in addition to the battery unit 90, the electric motor 91, the hydraulic pump P, and the electrical components 92. Hereinafter, an arrangement of the battery unit 90, the electric motor 91, the hydraulic pump P, the electrical components 92, the hydraulic-fluid tank T, and the control valve V will be described. The battery unit 90 is disposed at a rear portion of the swivel base 2. In detail, the battery unit 90 is disposed to stretch from a mid portion of the swivel base 2 in the front-rear direction to a rear portion of the swivel base 2. In other words, a rear portion of the battery unit 90 is positioned rearward of the rear portion of the lower traveling body 10. As illustrated in FIG. 24, the position of the center of gravity of the battery unit 90 is disposed on one side (left side) with respect to the center line L of the swivel base 2 in the width direction and rearward of the protecting mechanism 80.

A connecter 90b through which the battery unit 90 outputs electric power is disposed to be positioned at a front portion of the battery unit 90. The connecter 90b protrudes forward at the front portion of the battery unit 90.

As illustrated in FIG. 4, the second pillar portion 65b1 of the second leg 65b is positioned forward of the battery unit 90, and the third pillar portion 65c1 of the third leg 65c and the fourth pillar portion 65d1 of the fourth leg 65d are positioned rearward of the battery unit 90. Above the battery unit 90, the second extension portion 65b2, the third extension portion 65c2, the fourth extension portion 65d2, and the rod member 65e are positioned. The first leg 65a is positioned leftward of the battery unit 90, and the outer periphery of the battery unit 90 is surrounded by the support frame 65.

The electric motor 91 and the hydraulic pump P are disposed side by side in the front-rear direction, as illustrated in FIG. 24, on the other side with respect to the center line L of the swivel base 2 in the width direction and, as illustrated in FIG. 4 and FIG. 5, sideward of the battery unit 90. Specifically, the electric motor 91 and the hydraulic pump P are disposed on the lower side sideward (rightward) of the battery unit 90. The electric motor 91 is positioned rearward of the hydraulic pump P and disposed such that the drive shaft is directed in the front-rear direction. The hydraulic pump P is positioned forward of the electric motor 91. The rear end of the electric motor 91 substantially coincides with the rear end of the battery unit 90, and the front end of the hydraulic pump P substantially coincides with the front end of the battery unit 90.

Figure 10:
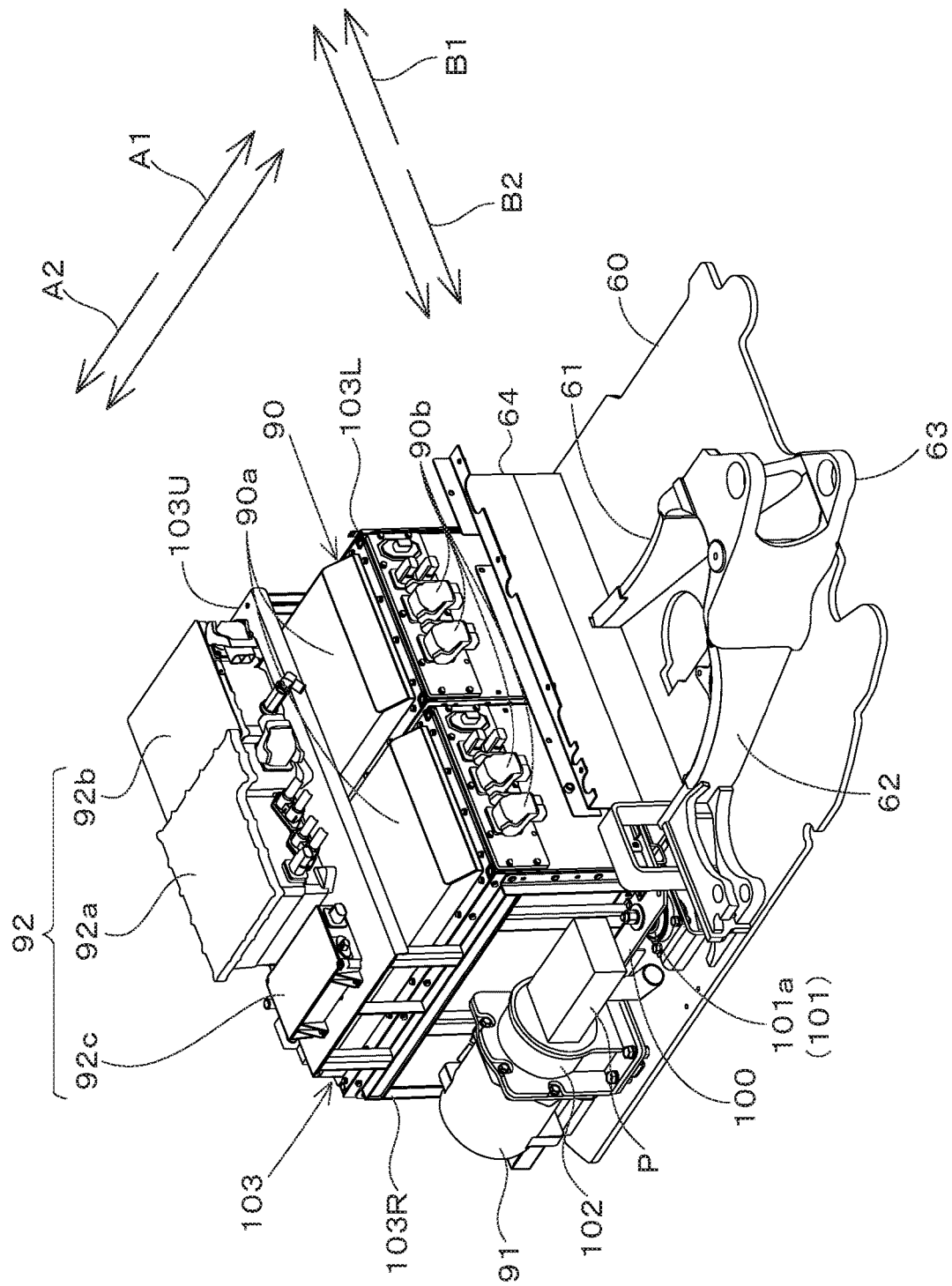
FIG. 10 is a right-front perspective view illustrating a swivel substrate, a battery unit, electrical components, an electric motor, and a hydraulic pump.

As illustrated in FIG. 4 and FIG. 10, the electrical components 92 are disposed side by side in the width direction above the battery unit 90. In other words, the battery unit 90 is disposed below the electrical components 92, and the swivel base 2, the battery unit 90, and the electrical components 92 are disposed in the order of the swivel base 2, the battery unit 90, and the electrical components 92 from the lower side toward the upper side. That is, the relatively heavy battery unit 90 is disposed below the electrical components 92, and the position of the battery unit 90 in the swiveling working machine 1 is low.

As illustrated in FIG. 5, the radiator (cooling mechanism) 94 and the fluid cooler (cooling mechanism) 30 are disposed above the hydraulic pump P and the electric motor 91. Consequently, the radiator fan 94a and the fluid-cooler fan 30a suck air that includes air into which heat has been released by the battery unit 90 and that is present around the battery unit 90 and air into which heat has been released from the hydraulic pump P and the electric motor 91 and moved upward, and discharge the sucked air to the outside of the machine body.

As illustrated in FIG. 4, FIG. 5 and FIG. 24, the battery unit 90, the electric motor 91, the hydraulic pump P, the radiator 94, and the fluid cooler 30 are disposed rearward of the swiveling axis X.

As illustrated in FIG. 4 and FIG. 24, the hydraulic-fluid tank T and the control valve V are disposed forward of the battery unit 90. The hydraulic-fluid tank T is disposed on the front side on the other side (right side) with respect to the center line L of the swivel base 2 in the width direction and is disposed rightward of the second vertical rib 62. The hydraulic-fluid tank T is disposed also forward of the electric motor 91 and the hydraulic pump P. The hydraulic-fluid tank T and the hydraulic pump P are disposed side by side in the front-rear direction on the right side of the swivel base 2.

As illustrated in FIG. 4 and FIG. 24, the control valve V is disposed on the front side on one side (left side) with respect to the center line L of the swivel base 2 in the width direction and is disposed leftward of the first vertical rib 61. The control valve V is disposed below the protecting mechanism 80. The hydraulic-fluid tank T and the control valve V are disposed forward of the swiveling axis X.

Hereinafter, attaching of the battery unit 90, the electric motor 91, the hydraulic pump P, and the electrical components 92 will be described in detail. As illustrated in FIG. 10, the swiveling working machine 1 includes a support substrate 100, a coupling portion 102, and a standing frame 103. The support substrate 100 is a structure body that supports, at a rear portion of the swivel base 2, the battery unit 90, the electric motor 91, and the hydraulic pump P.

Figure 13:
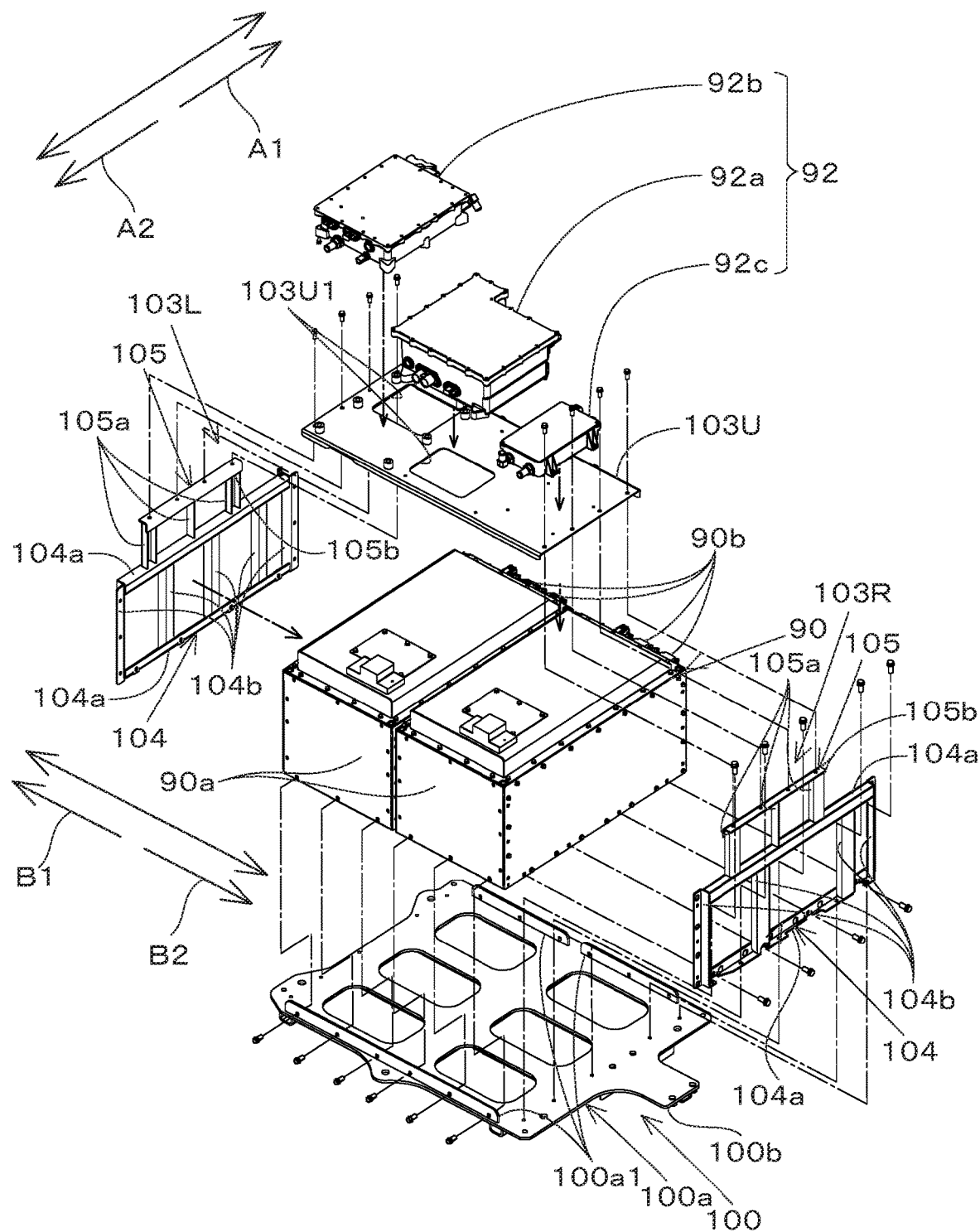
FIG. 13 is a right-rear perspective view illustrating mounting of a battery unit and electrical components.
Figure 14:
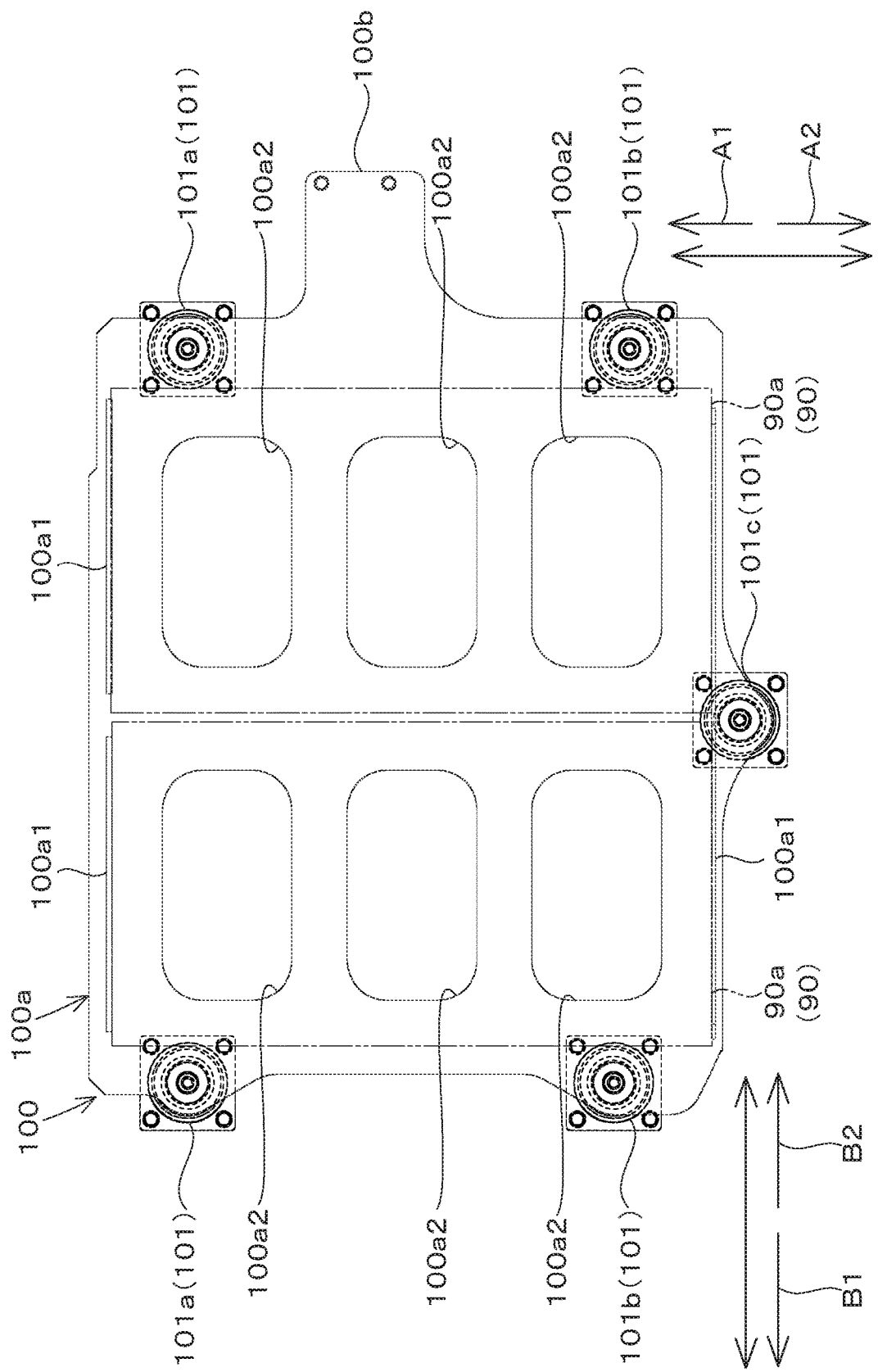
FIG. 14 is a plan view illustrating a support stay and a plurality of mount devices.

As illustrated in FIG. 13 and FIG. 14, the support substrate 100 is formed of a thick steel sheet or the like and disposed at the swivel base 2 such that plate surfaces thereof are directed upward and downward. The support substrate 100 includes a first placement portion 100*a* and a second placement portion 100*b*. The first placement portion 100*a* is a part having a substantially rectangular shape or a substantially oblong shape in plan view and on which the battery unit 90 is placed. The first placement portion 100*a* is a part of the support substrate 100 on one side (left side) in the width direction, and an attachment bracket 100*a*1 for attaching and fixing the battery unit 90 is attached to the first placement portion 100*a*.

As illustrated in FIG. 14, the attachment bracket 100*a*1 extends to stretch from one end side (left side) to the other side (right side) of the battery unit 90 in the width direction and is extended upward at each of a front portion and a rear portion of the first placement portion 100*a*. The attachment bracket 100*a*1 is attached and fixed to the lower side of a rear portion of the battery unit 90 by a fastening member, such as a bolt or the like. At a center portion of the first placement portion 100*a*, a plurality of first communication holes 100*a*2 are formed. The plurality of first communication holes 100*a*2 are holes extending through in the up-down direction. The plurality of first communication holes 100*a*2 are positioned at a position corresponding to the battery unit 90 at equal intervals, and the heat that has been released from the battery unit 90 can be released through the plurality of first communication holes 100*a*2. The number, the shapes, and the positions of the plurality of first communication holes 100*a*2 are not limited to those in the aforementioned configuration.

Figure 15:
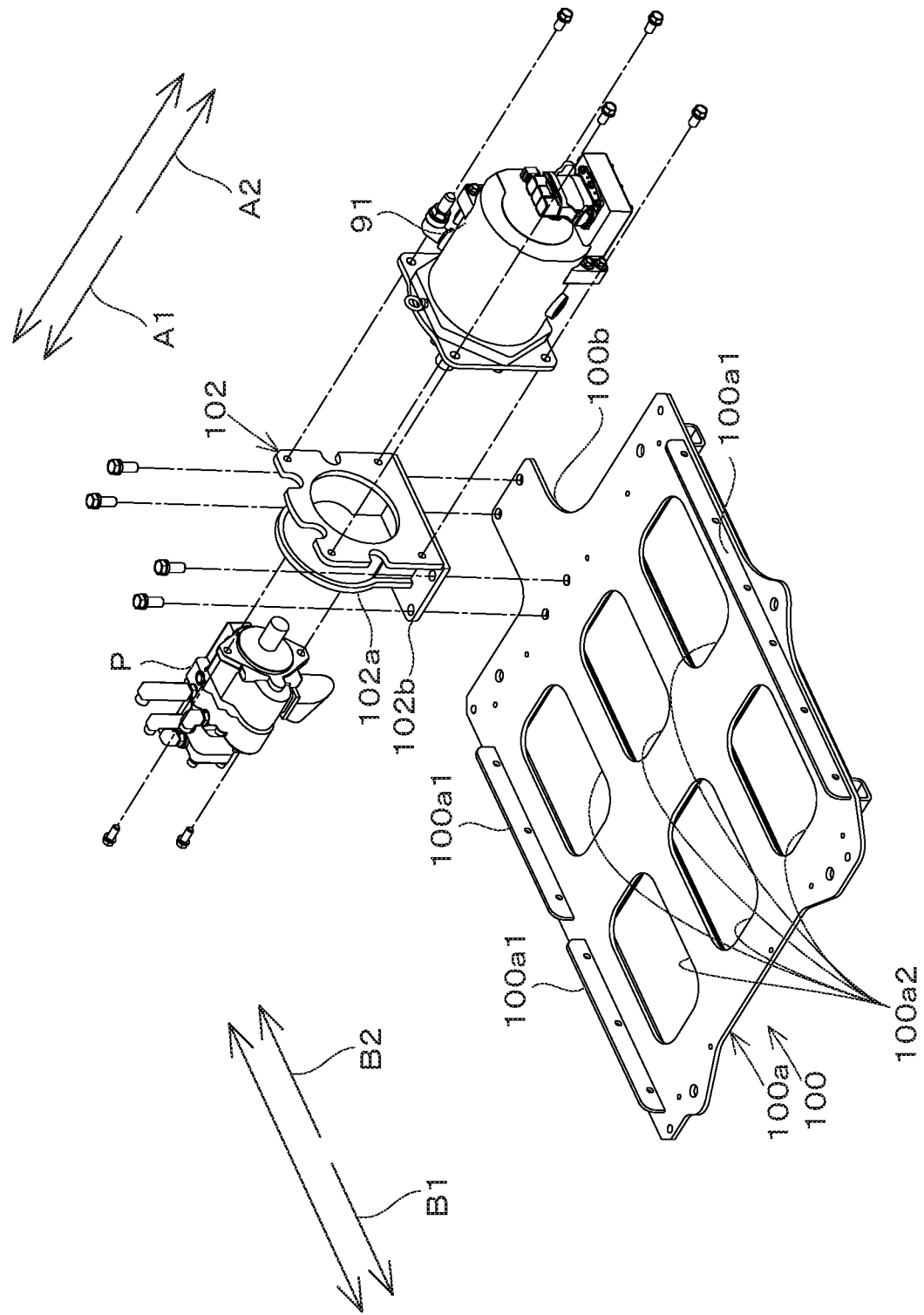
FIG. 15 is a left-rear perspective view illustrating mounting of an electric motor and a hydraulic pump.

As illustrated in FIG. 15, the second placement portion 100*b* is a part to which the electric motor 91 and the hydraulic pump P are attached. The second placement portion 100*b* is a part extending sideward from the first placement portion 100*a*. Specifically, the second placement portion 100*b* is a mid portion of the first placement portion 100*a* in the front-rear direction and extends rightward from the other side (right side) in the width direction.

As illustrated in FIG. 14, the support substrate 100 is attached to the swivel base 2 via a plurality of mount devices 101. The plurality of mount devices 101 are each an anti-vibration mechanism that includes an elastically deformable elastic member and the like. The plurality of mount devices 101 include front mount devices 101*a*, rear mount devices 101*b*, and an intermediate mount device 101*c*. On the front side of the support substrate 100, a pair of the front mount devices 101*a* is disposed in the width direction. The front mount device 101*a* on the left side supports the left front end of the support substrate 100 with respect to the swivel base 2. The front mount device 101*a* on the right side supports the right front end of the support substrate 100 with respect to the swivel base 2.

As illustrated in FIG. 14, on the rear side of the support substrate 100, a pair of the rear mount devices 101*b* is disposed in the width direction. The rear mount device 101*b* on the left side supports the left rear end of the support substrate 100 with respect to the swivel base 2. The rear mount device 101*b* on the right side supports the right rear end of the support substrate 100 with respect to the swivel base 2.

As illustrated in FIG. 14, the intermediate mount device 101*c* is disposed between the rear mount devices 101*b* and supports a center portion of the rear end of the support substrate 100 with respect to the swivel base 2. The intermediate mount device 101*c* is positioned rearward of the rear mount devices 101*b*. In other words, the intermediate mount device 101*c* is positioned offset rearward with respect to the rear mount devices 101*b*.

As illustrated in FIG. 5, FIG. 10, and FIG. 15, the coupling portion 102 is a coupling that couples the electric motor 91 and the hydraulic pump P to each other. The coupling portion 102 couples the electric motor 91 and the hydraulic pump P to each other such that the drive shaft of the electric motor 91 is coupled to the hydraulic pump P. As illustrated in FIG. 15, the coupling portion 102 includes a cylindrical portion 102*a* and an attachment portion 102*b*. The cylindrical portion 102*a* extends in the front-rear direction, and the drive shaft of the electric motor 91 and an input shaft of the hydraulic pump P are coupled to each other in the inside of the cylindrical portion 102*a*. The attachment portion 102*b* is a part that is placed at the second placement portion 100*b* and is, for example, a part having a substantially L-shape in side view. The attachment portion 102*b* is attached and fixed to the second placement portion 100*b* by a fastening member, such as a bolt or the like. The font side of the attachment portion 102*b* is provided with the cylindrical portion 102*a*, and the electric motor 91 is attached and fixed to an opposite side (rear side) of the cylindrical portion 102*a* by a fastening member, such as a bolt or the like.

As illustrated in FIG. 10 and FIG. 13, the standing frame 103 is a structure body that supports one side surface (left surface) and the other side surface (right surface) of the battery unit 90 and that supports the electrical components 92 above the battery unit 90. The standing frame 103 has a first standing portion 103L, a second standing portion 103R, and a coupling stay 103U. The first standing portion 103L stands at an upper portion of the swivel base 2 and supports the one side surface of the battery unit 90. Specifically, the first standing portion 103L is fixed to an upper portion of the support substrate 100. The first standing portion 103L is fixed to, of the support substrate 100, the left side of the first placement portion 100*a*. As illustrated in FIG. 12, the front end of the first standing portion 103L is substantially flush with the front surface of the battery unit 90, and the rear end of the first standing portion 103L is substantially flush with the rear surface of the battery unit 90. Thus, the first standing portion 103L supports, on one side (left side) of the battery unit 90 in the width direction, the battery unit 90 by stretching in the front-rear direction.

As illustrated in FIG. 10 and FIG. 13, the second standing portion 103R stands at an upper portion of the swivel base 2 and supports the other side surface (right surface) of the battery unit 90. Specifically, the second standing portion 103R is fixed to an upper portion of the support substrate 100. The second standing portion 103R is fixed to, of the support substrate 100, the right side of the first placement portion 100*a*. As illustrated in FIG. 12, the front end of the second standing portion 103R is substantially flush with the front surface of the battery unit 90, and the rear end of the second standing portion 103R is substantially flush with the rear surface of the battery unit 90. Thus, the second standing portion 103R supports, on the other side (right side) of the battery unit 90 in the width direction, the battery unit 90 by stretching in the front-rear direction. In other words, the battery unit 90 is sandwiched by the first standing portion 103L and the second standing portion 103R in the width direction.

As illustrated in FIG. 13, the first standing portion 103L and the second standing portion 103R each have swing stopper portions 104 and an extension portion 105. The swing stopper portions 104 stretch in the front-rear direction to be attached to the battery unit 90. The swing stopper portions 104 are provided one each on the left side and the right side of the first placement portion 100*a*. The swing stopper portion 104 of the second standing portion 103R stands between the coupling portion 102 and the battery unit 90 and is attached to the other side surface (right surface) of the battery unit 90. The swing stopper portion 104 of the first standing portion 103L stands, on the one side surface (left surface) of the battery unit 90, at an upper portion of the first placement portion 100*a* (swivel base 2) and is attached to the one side surface of the battery unit 90 separately from the swing stopper portion 104 of the second standing portion 103R.

In the present embodiment, the swing stopper portions 104 each include a plurality of rod-shaped members being coupled to each other. For example, as illustrated in FIG. 13, the swing stopper portions 104 each have a plurality of first lateral bars 104*a* and a plurality of first vertical bars 104*b*. The plurality of first lateral bars 104*a* are disposed to extend in the front-rear direction and disposed at an upper portion and a lower portion of the swing stopper portion 104 to be away from each other. The plurality of the first lateral bars 104*a* and the battery unit 90 are attached and fixed to each other by a fastening member, such as a bolt or the like.

As illustrated in FIG. 13, the plurality of first vertical bars 104*b* are members that extend in the up-down direction, that are disposed to be away from each other in the front-rear direction, and that couple the first lateral bar 104*a* on the upper side and the first lateral bar 104*a* on the lower side to each other. Specifically, the plurality of first vertical bars 104*b* are disposed at a front portion, a mid portion, and a rear portion of the swing stopper portion 104 to be away from each other. The first vertical bar 104*b* on the front side couples the front ends of the first lateral bars 104*a* to each other, the first vertical bar 104*b* at the mid portion couples the mid portions of the first lateral bars 104*a* to each other, and the first vertical bar 104*b* on the rear side couples the rear ends of the first lateral bars 104*a* to each other. The plurality of first vertical bars 104*b* and the battery unit 90 are attached and fixed to each other by a fastening member, such as a bolt or the like.

As illustrated in FIG. 13, the extension portion 105 is a part that extends upward from the swing stopper portion 104. As illustrated in FIG. 12 and FIG. 13, the length of the extension portion 105 in the front-rear direction is shorter than that of the swing stopper portion 104. The extension portion 105 has a plurality of second vertical bars 105*a* and a second lateral bar 105*b*. The plurality of second vertical bars 105*a* extend in the up-down direction and are disposed to be away from each other in the front-rear direction. Among the plurality of second vertical bars 105*a*, the second vertical bar 105*a* on the front side is positioned rearward of the first vertical bar 104*b* of the swing stopper portions 104 on the front side, and the second vertical bar 105*a* on the rear side is positioned forward of the first vertical bar 104*b* of the swing stopper portions 104 on the rear side. Among the plurality of second vertical bars 105*a*, the second vertical bar 105*a* at a mid portion is positioned between the second vertical bar 105*a* on the front side and the second vertical bar 105*a* on the rear side.

As illustrated in FIG. 13, the second lateral bar 105*b* is disposed to extend in the front-rear direction and couples upper portions of the plurality of second vertical bars 105*a* to each other. The second lateral bar 105*b* is disposed to stretch from the second vertical bar 105*a* on the front side to the second vertical bar 105*a* on the rear side.

As illustrated in FIG. 12 and FIG. 13, the coupling stay 103U is a stay that couples an upper portion of the first standing portion 103L and an upper portion of the second standing portion 103R to each other and that supports the electrical components 92. In other words, the coupling stay 103U is used for both reinforcement of the first standing portion 103L and the second standing portion 103R and supporting of the electrical components 92. Specifically, the coupling stay 103U is formed of, for example, a thick steel sheet or the like and disposed such that plate surfaces thereof are directed upward and downward. The length of the coupling stay 103U in the width direction is longer than the length thereof in the front-rear direction, and the length thereof in the front-rear direction is shorter than the length of the battery unit 90 in the front-rear direction. An end portion (left end portion) of the coupling stay 103U on one side in the width direction is attached to an upper portion of the first standing portion 103L, that is, to the second lateral bar 105*b*. A left end portion of the coupling stay 103U is attached and fixed to the second lateral bar 105*b* by a fastening member, such as a bolt or the like. An end portion (right end portion) of the coupling stay 103U on the other side in the width direction is attached to an upper portion of the second standing portion 103R, that is, to the second lateral bar 105*b*. A right end portion of the coupling stay 103U is attached and fixed to the second lateral bar 105*b* by a fastening member, such as a bolt or the like.

As illustrated in FIG. 12 and FIG. 13, the electrical components 92 are placed side by side in the width direction at an upper portion of the coupling stay 103U. The electrical components 92 are disposed at the upper portion of the coupling stay 103U in the order of the inverter 92*b*, the junction box 92*a*, and the DC/DC converter 92*c* from one side (left side) in the width direction. The electrical components 92 and the coupling stay 103U are attached and fixed to each other by a fastening member, such as a bolt or the like. As illustrated in FIG. 13, the coupling stay 103U has a plurality of second communication holes 103U1 at position corresponding to the electrical components 92. The plurality of second communication holes 103U1 are holes extending through in the up-down direction, and cables that are connected to the electrical components 92 placed at the coupling stay 103U can be routed in the holes. Through the plurality of communication holes, the heat that has been released from the electrical components 92 can be released. The number, the shapes, and the positions of the plurality of second communication holes 103U1 are not limited to those in the aforementioned configuration, as long as the cables connected to the electrical components 92 can be routed in the plurality of second communication holes 103U1.

Figure 16:
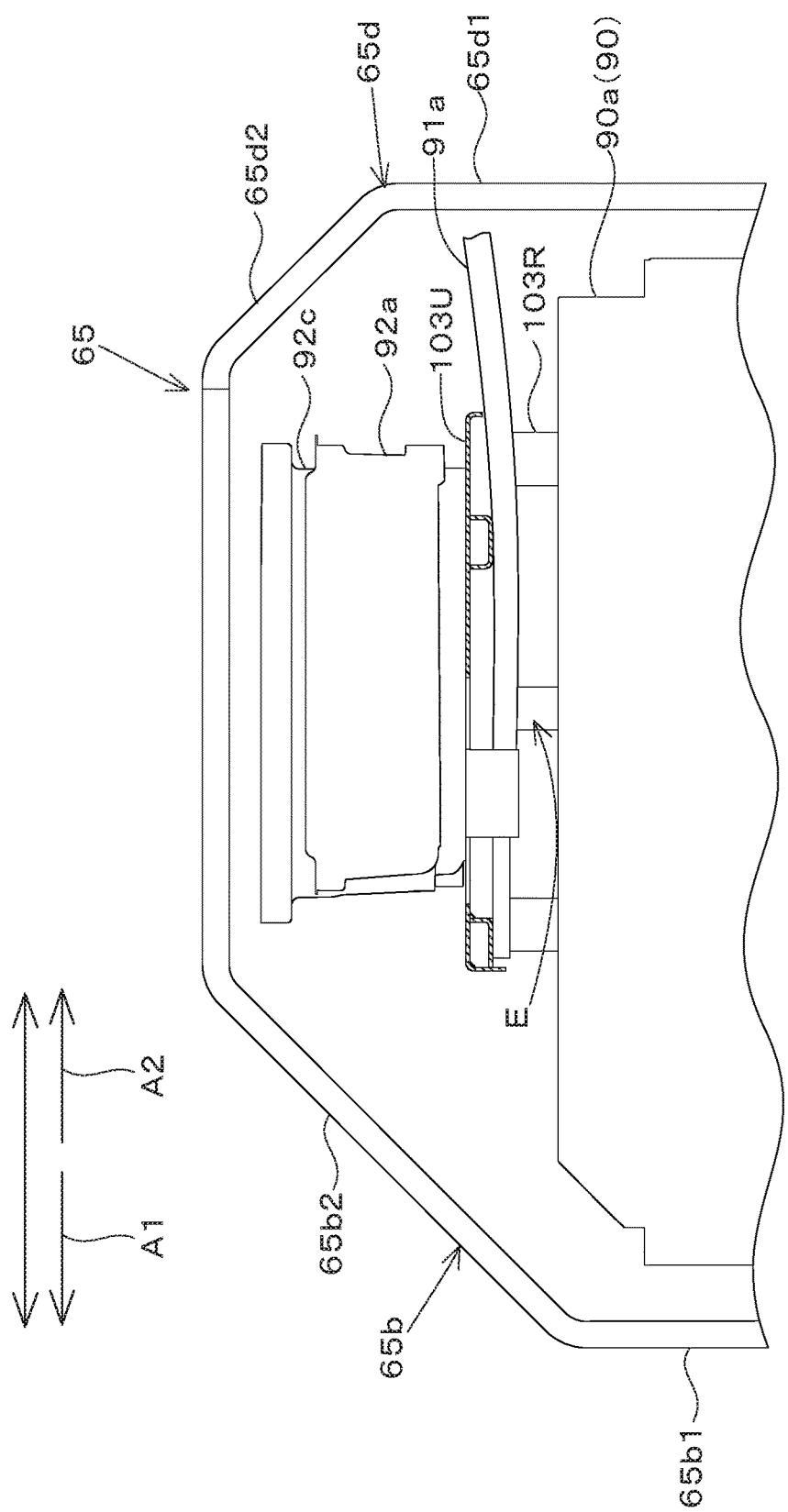
FIG. 16 is a left-side sectional view illustrating a routing space and illustrating a battery unit, electrical components, and a support stay.
Figure 17:
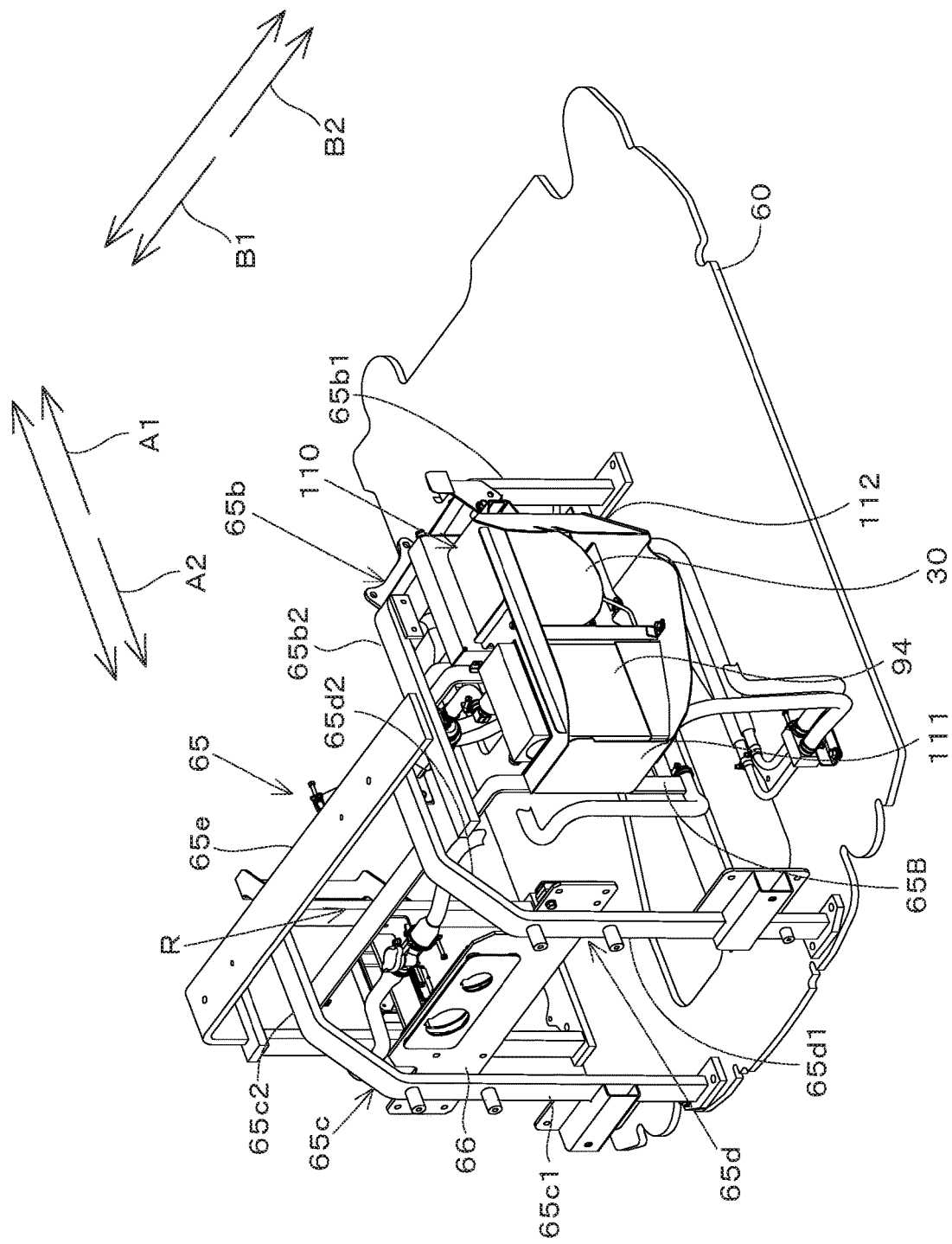
FIG. 17 is a right-rear perspective view illustrating a radiator, a fluid cooler, a shroud, a support frame, and a swivel substrate.

As illustrated in FIG. 16, a gap (routing space) E is formed between the lower surface of the coupling stay 103U and the upper surface of the battery unit 90. In the routing space E, various cables connected to the electrical components 92 provided in the swiveling working machine 1 are routed. In the present embodiment, a cable 91a that is connected to a lower portion of the inverter 92b and connected to the electric motor 91 is routed in the routing space E.

As illustrated in FIG. 4, FIG. 5, FIG. 6, and FIG. 17, the swiveling working machine 1 includes a shroud 110 for disposing the radiator 94 and the fluid cooler 30 above the hydraulic pump P and the electric motor 91. The shroud 110 is a structure body that surrounds and supports both the radiator 94 (radiator fan 94a) and the fluid cooler 30 (fluid-cooler fan 30a). The shroud 110 supports the radiator fan 94a and the fluid-cooler fan 30a to be arranged side by side in the front-rear direction. Specifically, the shroud 110 supports the radiator fan 94a on the front side and supports the fluid-cooler fan 30a on the rear side. The shroud 110 has a fixation portion 111 and a guide portion 112.

Figure 18:
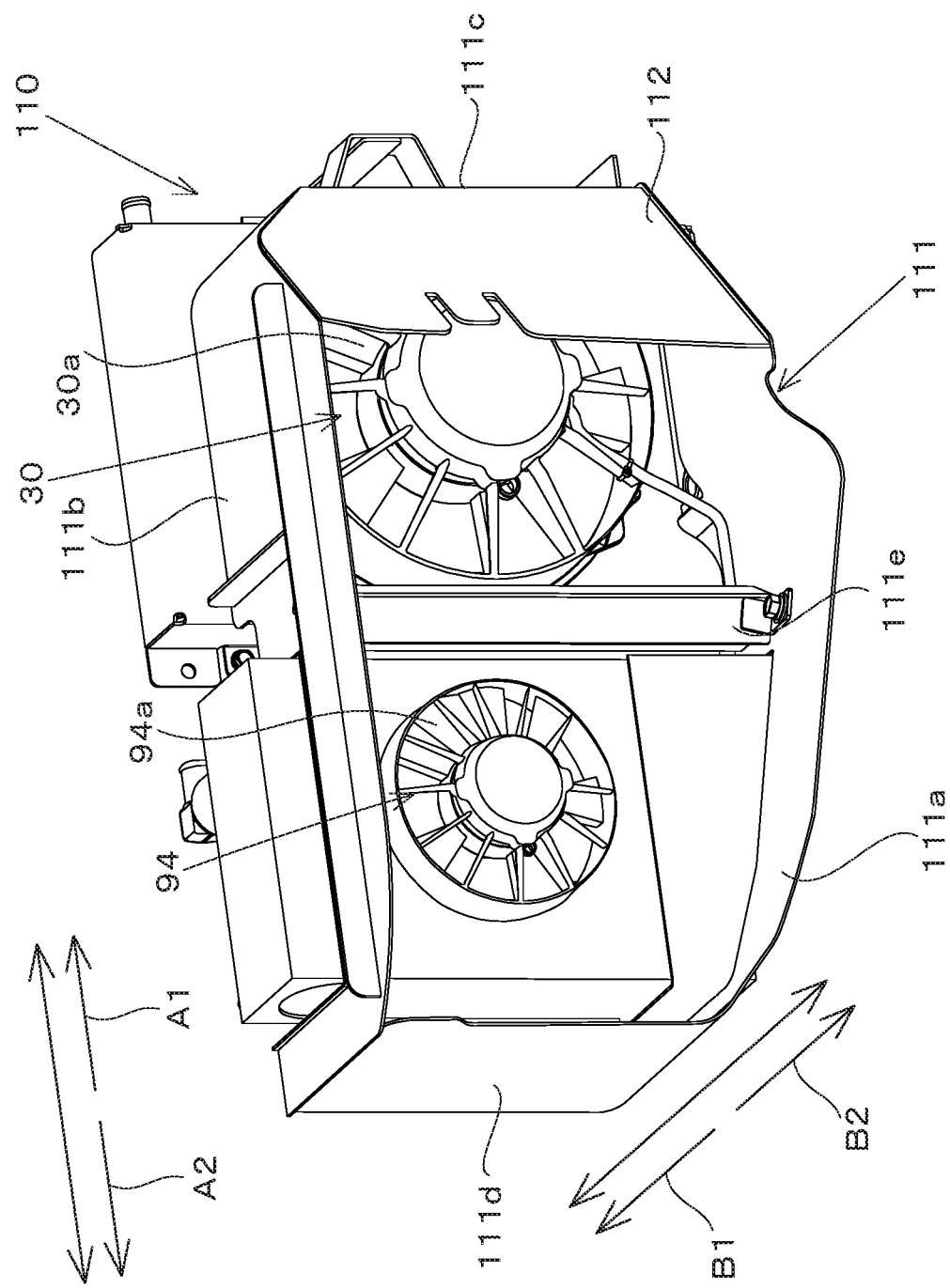
FIG. 18 is a right-rear perspective view illustrating a radiator, a fluid cooler, and a shroud.
Figure 19:
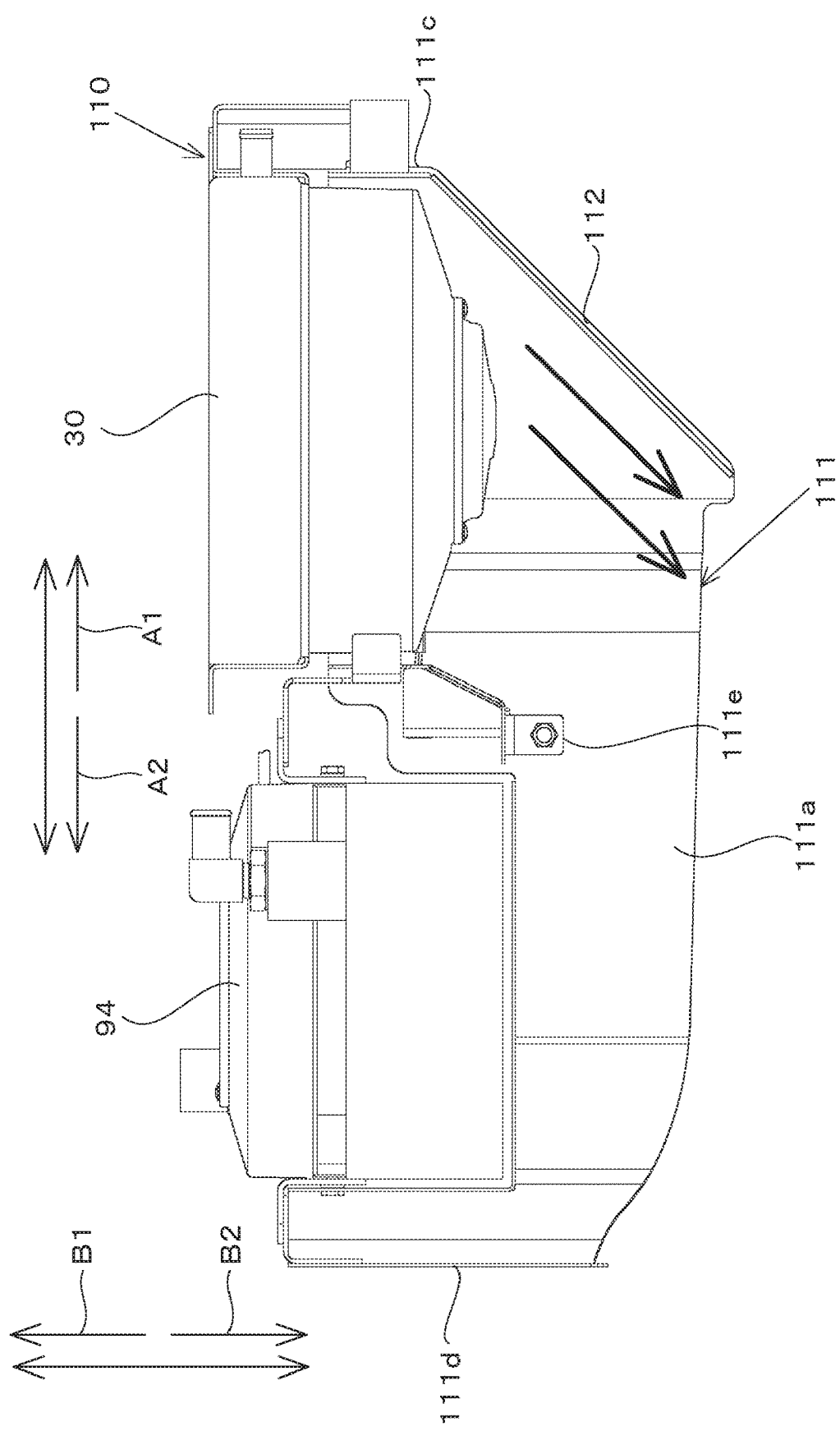
FIG. 19 is a plan view illustrating a positional relationship among a radiator, a fluid cooler, and a shroud.

As illustrated in FIG. 18 and FIG. 19, the fixation portion 111 surrounds the radiator fan 94a and the fluid-cooler fan 30a and supports the radiator 94 and the fluid cooler 30. The fixation portion 111 covers the front side of the radiator fan 94a and covers the rear side of the fluid-cooler fan 30a. The fixation portion 111 also covers the upper side and the lower side of the radiator fan 94a and the fluid-cooler fan 30a. The fixation portion 111 has a lower plate portion 111a, an upper plate portion 111b, a front plate portion 111c, a rear plate portion 111d, and a partition wall 111e. The lower plate portion 111a is a plate-shaped part constituting the lower side of the fixation portion 111 and is disposed such that plate surfaces thereof are directed upward and downward.

As illustrated in FIG. 18, the upper plate portion 111b is a plate-shaped part constituting the upper side of the fixation portion 111 and is disposed such that plate surfaces thereof are directed upward and downward. The upper plate portion 111b is disposed above the lower plate portion 111a and is disposed to be away from and to face the lower plate portion 111a in the up-down direction.

As illustrated in FIG. 18, the front plate portion 111c is a plate-shaped part constituting the front side of the fixation portion 111. The front plate portion 111c extends upward from the front end of the lower plate portion 111a and reaches the front end of the upper plate portion 111b.

As illustrated in FIG. 18, the rear plate portion 111d is a plate-shaped part constituting the rear side of the fixation portion 111. The rear plate portion 111d extends upward from the rear end of the lower plate portion 111a and reaches the rear end of the upper plate portion 111b. In other words, the front plate portion 111c and the rear plate portion 111d are disposed to be away from and to face each other in the front-rear direction.

As illustrated in FIG. 18 and FIG. 19, the partition wall 111e is a wall that partitions the radiator fan 94a and the fluid-cooler fan 30a from each other. The partition wall 111e is disposed to extend in the up-down direction and couples a mid portion of the upper plate portion 111b in the front-rear direction and a mid portion of the lower plate portion 111a in the front-rear direction to each other.

As illustrated in FIG. 18 and FIG. 19, the guide portion 112 extends rearward and outward in the width direction from a front portion of the fixation portion 111 and guides at least one of cooling air generated by driving of the radiator fan 94a and cooling air generated by driving of the fluid-cooler fan 30a. In the present embodiment, the guide portion 112 guides cooling air generated by driving of the radiator fan 94a. The guide portion 112 is a straightening plate that extends to be inclined right-rearwardly from the front plate portion 111c and guides cooling air along plate surfaces. One end portion (left front end portion) of the guide portion 112 is provided outward (right side) end portion of the front plate portion 111c in the width direction. The other end portion (right rear end portion) of the guide portion 112 is inclined right-rearwardly and, in side view, reaches a mid portion of the fluid-cooler fan 30a in the front-rear direction and reaches a front portion of an opening of the exterior cover 70. In other words, the cooling air guided by the guide portion 112 is discharged to the outside from the rear room R through the opening.

Figure 20A:
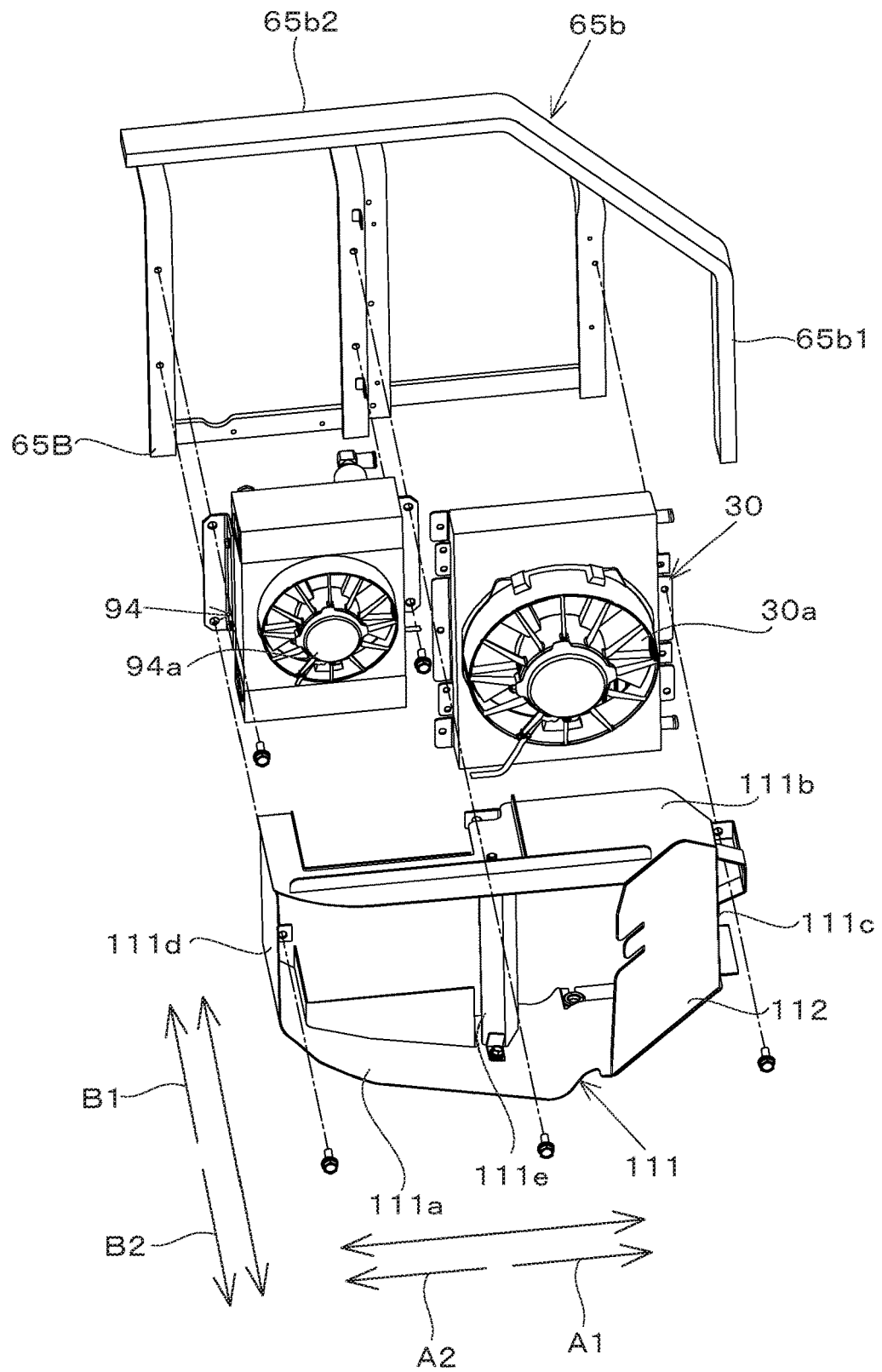
FIG. 20A is a view illustrating mounting of a radiator, a fluid cooler, and a shroud.
Figure 20B:
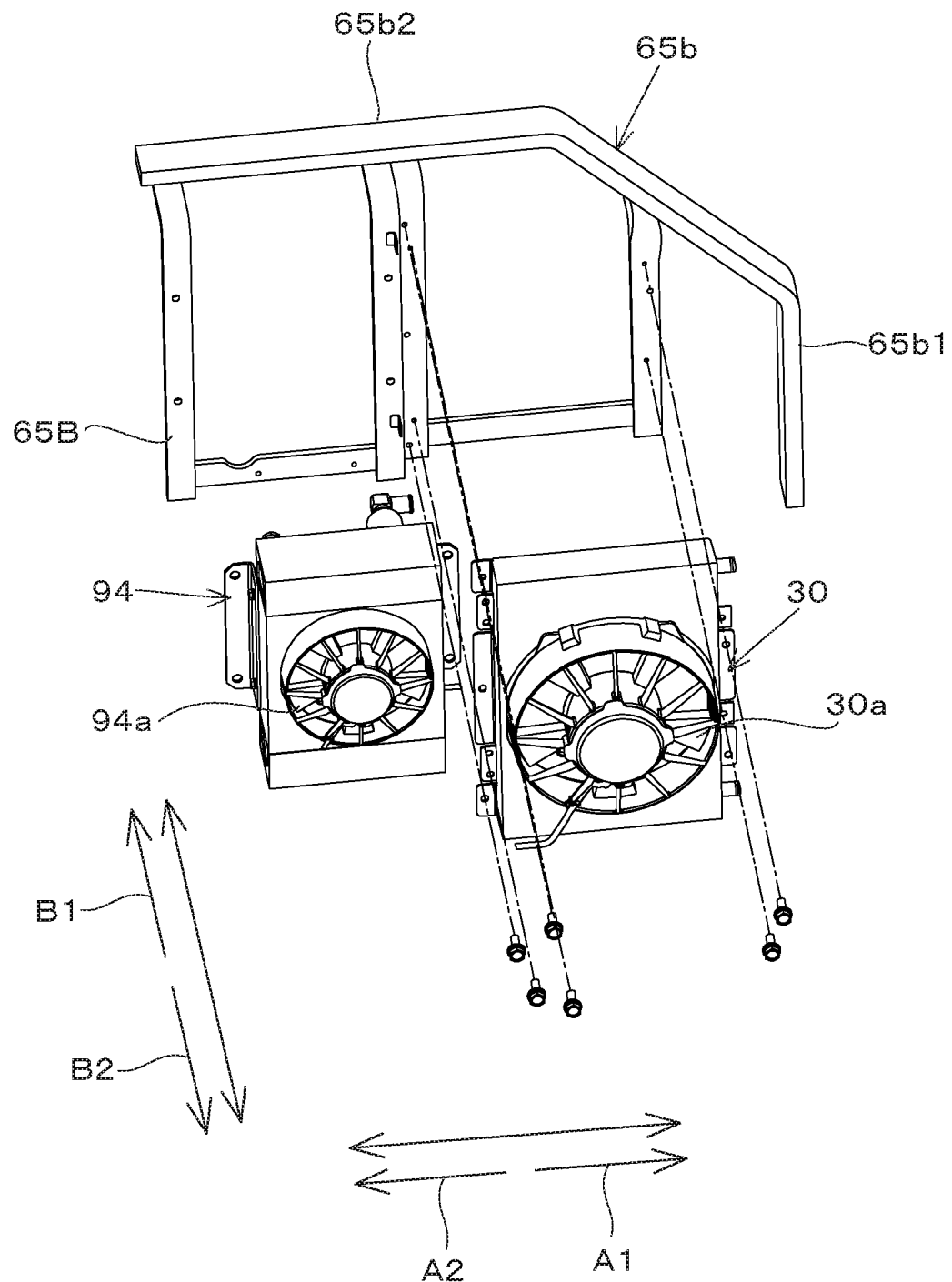
FIG. 20B is a view illustrating mounting of a radiator and a fluid cooler.

As illustrated in FIG. 4, FIG. 5, FIG. 6, and FIG. 17, the shroud 110 is disposed on the other side (right side) of the support frame 65 in the width direction. Specifically, as illustrated in FIG. 20A and FIG. 20B, the shroud 110 is fixed to a fixation bracket 65B attached to the first leg 65a. The fixation bracket 65B extends downward from the first extension portion 65a2 and reaches the right side and the upper side of the battery unit 90. The shroud 110 is attached and fixed by a fastening member, such as a bolt or the like. As illustrated in FIG. 20A, the shroud 110 is fastened together with the fluid cooler 30 and the radiator 94 by the fixation bracket 65B and the fastening member, thereby supporting the fluid cooler 30 and the radiator 94 together with the fixation bracket 65B. In the present embodiment, the rear plate portion 111d is fastened and fixed together with the rear side of the fluid cooler 30 and the rear side of the fixation bracket 65B. The partition wall 111e is fastened and fixed together with the front side of the radiator 94 and a mid portion of the fixation bracket 65B. The front plate portion 111c is fastened and fixed together with the front side of the radiator 94 and a front side of the fixation bracket 65B. Attaching of the fluid cooler 30 and the radiator 94 is not limited to that in the aforementioned configuration. As illustrated in FIG. 20B, the fluid cooler 30 and the radiator 94 may be fixed to the fixation bracket 65B separately from the shroud 110.

As illustrated in FIG. 11, the swiveling working machine 1 includes a controller 120 and a storage unit 121. The controller 120 is a device that includes an electric/electronic circuit, a program stored in a CPU or the like, and the like and controls various devices included in the swiveling working machine 1. For example, the controller 120 is provided around the operator seat 8 and controls the rotation speed of the electric motor 91 on the basis of an operation of the operable rotation-speed operation actuator 5c. The controller 120 is provided around the operator seat 8 and also controls start of the swiveling working machine 1 on the basis of an operation of a starter switch 7 with which the swiveling working machine 1 can be started and operated.

The storage unit 121 is a nonvolatile memory or the like and stores various types of information and the like relating to the control of the controller 120. For example, the storage unit 121 stores information, such as a table or the like relating to the rotation speed of the electric motor 91 with respect to the operation amount of the rotation-speed operation actuator 5c.

As illustrated in FIG. 11, FIG. 12, and the like, the battery unit 90 includes a plurality of batteries 90a. The plurality of batteries 90a are connected in parallel to each other. The batteries 90a can store electric power and are each, for example, a secondary battery, such as a lithium ion battery, a lead storage battery, and the like. The batteries 90*a* each have a plurality of cells in the inside thereof, and the plurality of cells are electrically connected in series and/or in parallel. In the present embodiment, the battery unit 90 has two batteries 90*a*. The number of the batteries 90*a* of the battery unit 90 is not limited to two and may be three or more as long as being plural.

As illustrated in FIG. 11, the swiveling working machine 1 includes a connection switch unit 131. The connection switch unit 131 switches, for each of the batteries 90*a*, the power supply path 132 from the battery 90*a* to the electric motor 91 between a connected state and an interrupted state. The connection switch unit 131 switches between the connected state and the interrupted state by, for example, performing an opening-closing operation of at least some or one of relays of the power supply path 132. Consequently, the battery unit 90 outputs electric power from, among the plurality of batteries 90*a*, the battery 90*a* in the connected state and stops output of electric power from the other battery 90*a* in the interrupted state. Control of the connection switch unit 131, that is, selection of the battery 90*a* that outputs electric power from the battery unit 90 are performed by the controller 120.

Each battery 90*a* has a BMU (battery management unit) 123 that monitors and controls the battery 90*a*. The BMU 123 obtains the voltage, the temperature, the current of the battery 90*a*, the terminal voltage of the cells in the inside thereof, and the like and calculates the remaining capacity of the battery 90*a*. The BMU 123 can control opening-closing of a relay in the inside of the battery 90*a* and can control starting and stopping of power supply of the battery 90*a*. The BMU 123 may be incorporated in each battery 90*a* and may be set outside of each battery 90*a*.

The controller 120 causes, among the plurality of batteries 90*a*, one battery 90*a* to be in the connected state and selects the one battery 90*a* as an output battery that outputs electric power from the battery unit 90, and causes the other battery 90*a* to be in the interrupted state and selects the other battery 90*a* as a stopped battery that does not output electric power. The controller 120 has a battery control unit 120*a* that performs switching control of the output battery.

The battery control unit 120*a* is connected to the connection switch unit 131 in a wired or wireless manner to be capable of communicating with each other and controls the connection switch unit 131 by transmitting a signal. Consequently, the battery control unit 120*a* switches the connected state and the interrupted state of the plurality of batteries 90*a* and performs switching control (switching) of the output battery and the stopped battery.

The battery control unit 120*a* performs switching control of the output battery and the stopped battery on the basis of a predetermined condition. Specifically, when driving of the working device 20 is prohibited or limited by the driving limitation device 47, the battery control unit 120*a* selects the output battery and the stopped battery on the basis of a selector 122 connected to the controller 120 to be capable of communicating with each other, and the remaining capacity of each of the plurality of batteries 90*a*. In other words, the battery control unit 120*a* performs switching of the output battery after the driving of the working device 20 is prohibited or limited by the driving limitation device 47.

Specifically, the controller 120 has a state acquisition unit 120*d* that acquires information indicating whether the driving limitation device 47 is in a state of allowing driving of the working device 20 or in a state of prohibiting or limiting driving of the working device. On the basis of the information acquired by the state acquisition unit 120*d*, the battery control unit 120*a* switches the output battery after driving of the working device 20 is prohibited or limited by the driving limitation device 47. In the present embodiment, the state acquisition unit 120*d* is connected to the controller 120 and acquires information on whether the unload valve 48 is at the supply position 48*a* or at the interruption position 48*b* on the basis of a signal obtained from a sensor that detects the operational state of the unload operation actuator 5*b*.

As long as the controller 120 selects the output battery and the stopped battery in a state in which the working device 20 is not driven, the controller 120 may be configured to detect, separately from the operation of the driving limitation device 47, a state in which the working device 20 is not driven and select the output battery and the stopped battery. For example, the controller 120 may acquire operation information of the operation device 5 and acquire information on whether the hydraulic equipment M and the working device 20 are not driven.

The battery control unit 120*a* selects, as the output battery, the battery 90*a* that is selected and designated via the selector 122. The battery control unit 120*a* selects, as the stopped battery, the battery 90*a* that is not selected and designated via the selector 122.

The selector 122 selects one battery 90*a* from the plurality of batteries 90*a* on the basis of an operation by an operator. That is, the selector 122 receives from an operator an instruction for selecting the battery 90*a* that is to be selected as the output battery. For example, the selector 122 is a plurality of operation switches disposed around the operator seat 8 and on which a pressing operation can be performed. The plurality of operation switches are each in association with a corresponding one of the batteries 90*a*. When one operation switch is operated, one battery 90*a* in association with the one operation switch is selected.

The configuration of the selector 122 is not particularly limited as long as being operable to select one battery 90*a* from the plurality of batteries 90*a*. The selector 122 may be a selector that is to be operated in conjunction with a display device 124*a* to select the battery 90*a*. The selector 122 may be a selector that is to be operated to select an icon of one battery 90*a* from a plurality of icons of the batteries 90*a* displayed on the display device 124*a* by a key-button operation, a jog-dial operation, a touch-panel operation, or the like.

On the basis of a remaining capacity detected by the capacity detector, the battery control unit 120*a* limits the battery 90*a* that can be selected as the output battery by the selector 122 to the battery 90*a* whose remaining capacity is more than or equal to a first threshold value that is set to a value greater than zero.

When supply of electric power to the electric motor 91 is stopped due to a lack (for example, the remaining capacity is less than the first threshold value) of the remaining capacity of the battery 90*a* that has been selected as the output battery and when the other batteries 90*a* include batteries 90*a* each having a remaining capacity capable of supplying electric power to the electric motor 91, the battery control unit 120*a* switches the output battery to any of the batteries 90*a* each having the remaining capacity.

When the remaining capacity of the output battery is zero and when there are the batteries 90*a* whose remaining capacities are more than zero and less than the first threshold value, the battery control unit 120*a* limits the batteries 90*a* that can be selected as the output battery by the selector 122 to the batteries 90*a* whose remaining capacities are more than zero and switches the output battery to any of the batteries 90*a* each having a remaining capacity capable of supplying electric power to the electric motor 91. Alternatively, when the remaining capacity of the output battery is zero and when there are batteries 90a whose remaining capacities are more than zero and less than the first threshold value, the battery control unit 120a may select, without depending on selection by the selector 122, a battery 90a whose remaining capacity is more than zero and less than the first threshold value as the output battery automatically.

The capacity detector detects each of the remaining capacities of the batteries 90a. The capacity detector is connected to the controller 120 in a wired or wireless manner to be capable of communicating with each other and outputs information on the detected remaining capacities of the batteries 90a to the controller 120. In the present embodiment, the function of the capacity detector is performed by the BMU 123 provided at each of the plurality of batteries 90a. For example, the BMU 123 detects the remaining capacity of the battery 90a by using the terminal voltage of a cell in the inside of the battery 90a and a voltage measurement method. The method of detecting the remaining capacity of the battery 90a is not limited to the voltage measurement method and may be a method such as a coulomb counter method, a battery cell modelling method, an impedance track method, or the like. The capacity detector may be provided separately from the BMU 123.

When the remaining capacity of the battery 90a selected as the output battery is decreased to be less than the first threshold value and when the other batteries 90a include batteries 90a whose remaining capacities are more than or equal to the first threshold value, the battery control unit 120a switches the output battery to any of the batteries 90a whose remaining capacities are more than or equal to the first threshold value. As illustrated in FIG. 11, the battery control unit 120a has a selection unit 120a1. The selection unit 120a1 selects one of the plurality of batteries 90a as the output battery. Specifically, when the battery unit 90 includes the batteries 90a whose remaining capacities are more than or equal to the first threshold value, the selection unit 120a1 selects any of the batteries 90a whose remaining capacities are more than or equal to the first threshold value as the output battery. In other words, when the battery unit 90 includes the batteries 90a whose remaining capacities are more than or equal to the first threshold value, the selection unit 120a1 does not select the batteries 90a whose remaining capacities are less than the first threshold value as the output battery. In this case, for example, among the batteries 90a whose remaining capacities are less than the first threshold value and more than or equal to zero, the battery 90a whose remaining capacity is largest may be selected.

The swiveling working machine 1 includes a notification device 124. On the basis of a remaining capacity detected by the capacity detector (BMU 123), the battery control unit 120a causes the notification device 124 to issue a notification to urge switching of the output battery, when the remaining capacity of the battery 90a selected as the output battery is decreased to be less than the first threshold value. When the remaining capacity of the battery 90a selected as the output battery is decreased to be less than the first threshold value and when the other batteries 90a do not include batteries 90a whose remaining capacities are more than or equal to the first threshold value, the battery control unit 120a causes the notification device 124 to issue a notification to urge charging. Further, when the remaining capacity of the battery 90a selected as the output battery is decreased to be less than a second threshold value, which is smaller than the first threshold value, the controller 120 causes the notification device 124 to issue a notification of a warning of depletion of the remaining capacity.

The notification device 124 is a device that notifies an operator or a supervisor of the remaining capacities of the plurality of batteries 90a detected by the capacity detector (BMU 123). The notification device 124 is connected to the controller 120 to be capable of communicating with each other and is controlled by the controller 120. The notification device 124 notifies an operator boarding on the swiveling working machine 1 of the remaining capacities of the batteries 90a by sound, light, an image, or a combination thereof. Specifically, when the notification device 124 notifies of the remaining capacities of the batteries 90a by an image, the notification device 124 is the display device 124a, such as a monitor, that is provided at the swiveling working machine 1 and that displays the image.

Figure 21A:
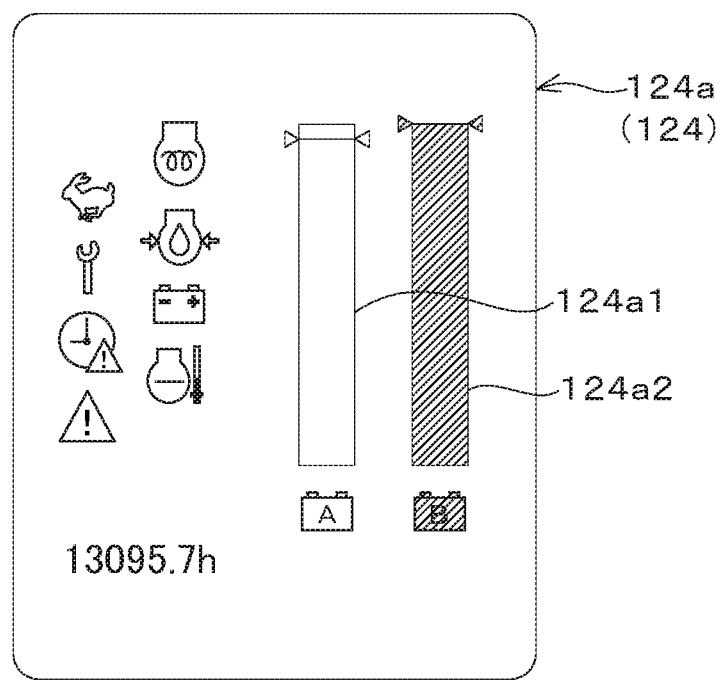
FIG. 21A is a first view illustrating a screen displayed on a display.
Figure 21B:
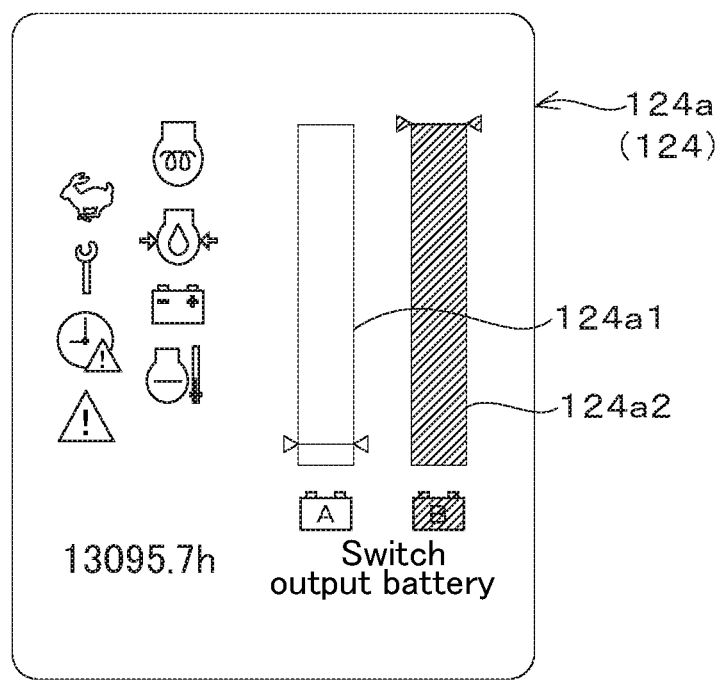
FIG. 21B is a second view illustrating a screen displayed on a display.
Figure 21C:
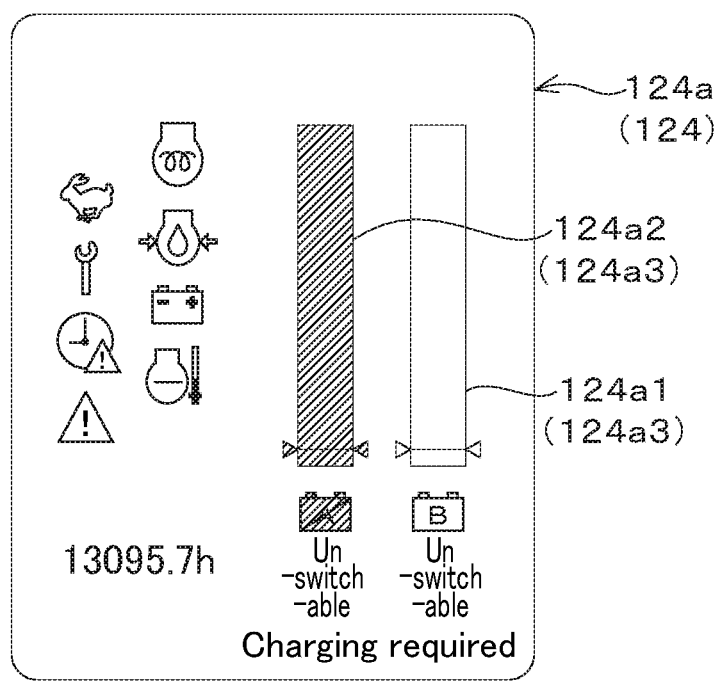
FIG. 21C is a third view illustrating a screen displayed on a display.
Figure 21D:
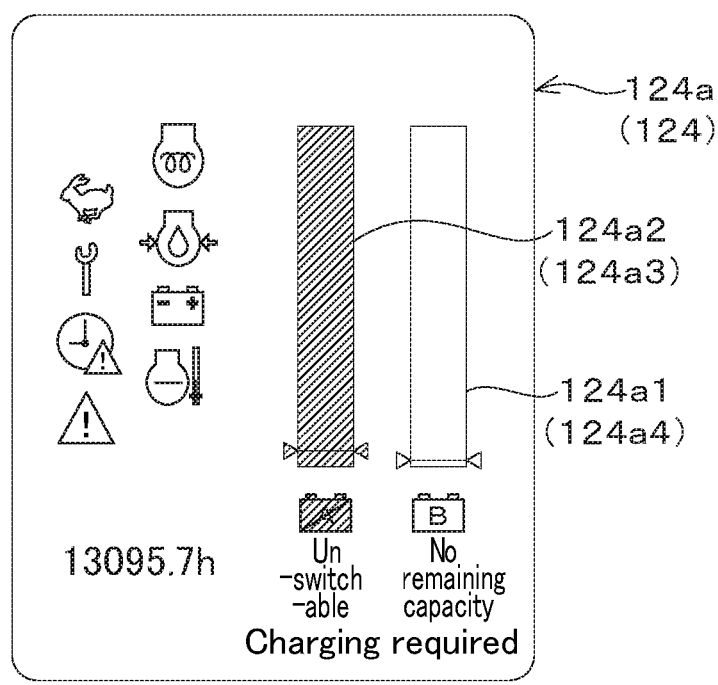
FIG. 21D is a fourth view illustrating a screen displayed on a display.

As illustrated in FIG. 21A, the battery control unit 120a causes the display device 124a to display the remaining capacity of each of the batteries 90a. The battery control unit 120a causes an indication 124a1 of the remaining capacity of the output battery and an indication 124a2 of the remaining capacity of the stopped battery in different display forms. For example, the indication 124a2 of the remaining capacity of the stopped battery is indicated in a grey-out form. As illustrated in FIG. 21B, when the remaining capacity of the output battery is decreased to be less than the first threshold value, the battery control unit 120a causes a message to urge switching of the output battery to be displayed in the vicinity of the indication 124a1 of the remaining capacity of the output battery. As illustrated in FIG. 21C, when the remaining capacity of the output battery is decreased to be less than the first threshold value and when the other batteries 90a do not include the batteries 90a whose remaining capacities are more than or equal to the first threshold value, the battery control unit 120a causes a message that switching as the output battery is not possible and a message to urge charging to be displayed in an indication 124a3 of the remaining capacities of the batteries 90a whose remaining capacities are less than the first threshold value and/or in the vicinity of the indication 124a3. As illustrated in FIG. 21D, when the remaining capacity of the output battery is decreased to be less than the second threshold value, the battery control unit 120a causes a message that the output battery has no remaining capacity and a message to urge charging to be displayed in an indication 124a4 of the remaining capacities of the batteries 90a whose remaining capacities are less than the second threshold value and/or in the vicinity of the indication 124a4.

When the notification device 124 issues a notification of the remaining capacities of the batteries 90a by sound, the notification device 124 is a sound output device 124b (speaker) that performs notification by sound. As long as the notification device 124 can notify an operator or a supervisor of the remaining capacities of the batteries 90a, the notification device 124 may be a light emitting device 124c (indicator) that is provided around the operator seat 8 and that includes a plurality of lamps (for example, LED electric lamps), and the notification device 124 is any one or more of the display device 124a, the sound output device 124b, and the light emitting device 124c.

The battery control unit 120a performs first processing, second processing, and third processing, thereby switching the output battery. Specifically, when switching the output battery, the battery control unit 120a first instructs the connection switch unit 131 to cause, among the plurality of batteries 90a including the output battery, all of the batteries 90a to be in the interrupted state (first processing).

After the first processing, the battery control unit 120*a* instructs the connection switch unit 131 to cause the battery 90*a* that is to be selected as the output battery to be in the connected state (second processing). In addition, the controller 120 causes the battery 90*a* selected as the output battery in the second processing and the inverter 92*b* to be in a mutually connected state.

After the second processing, the battery control unit 120*a* instructs the battery 90*a* to start power supply to the electric motor 91 from the battery 90*a* that has been selected as the output battery and caused to be in the connected state. Specifically, the battery control unit 120*a* instructs the BMU 123 provided at each of the plurality of batteries 90*a* to start power supply.

Figure 22A:
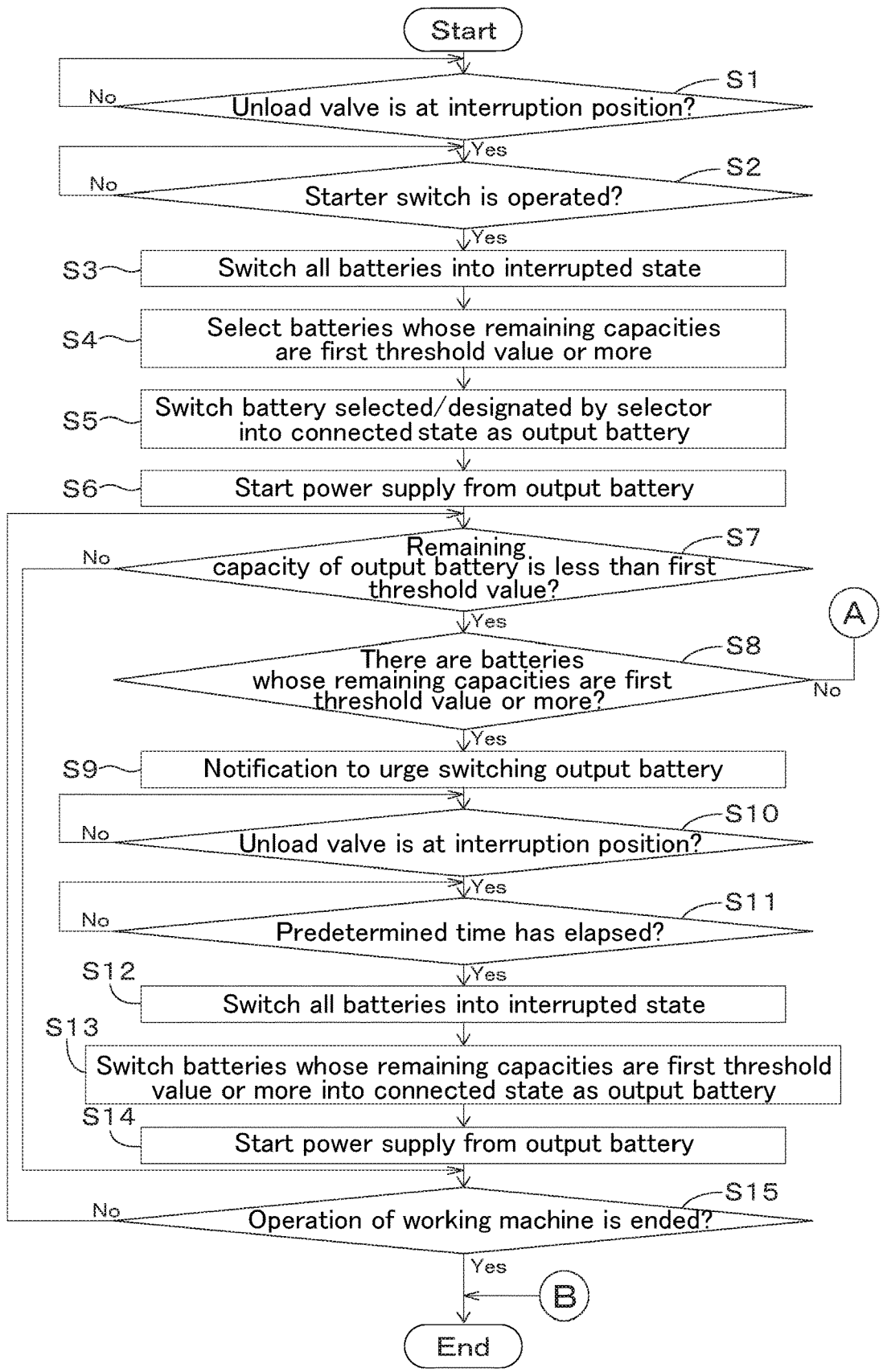
FIG. 22A is a diagram describing a series of selection of an output battery by a controller.
Figure 22B:
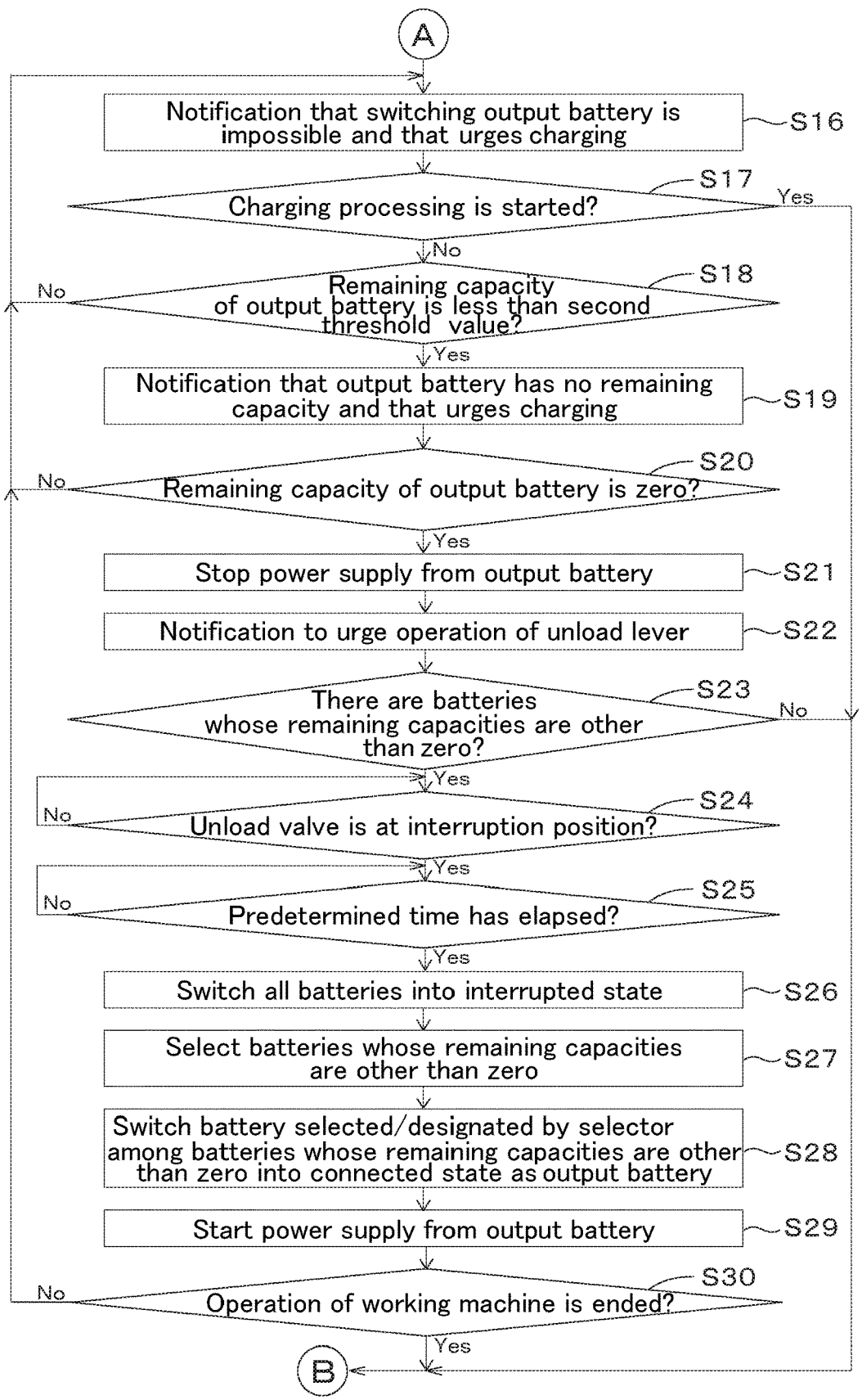
FIG. 22B is a diagram describing a series of selection of an output battery by a controller.

Hereinafter, with reference to mainly FIG. 22A and FIG. 22B, a series of the flow of selection of the output battery and the stopped battery by the controller 120 (battery control unit 120*a*) will be described. First, the controller 120 determines whether the unload valve 48 is at the interruption position 48*b* (S1). When determined that the unload valve 48 is not at the interruption position 48*b* (S1, No), the controller 120 continues processing of S1 and monitors that the unload valve 48 is switched to the interruption position 48*b*.

When determined that the unload valve 48 is at the interruption position 48*b* (S1, Yes), the controller 120 determines whether the starter switch 7 is operated on the basis of an operation signal input from the starter switch 7 (S2). When the starter switch 7 is not operated (S2, No), the controller 120 continues processing of S2 and monitors that the starter switch 7 is operated.

When determined that the starter switch 7 is operated (S2, Yes), the battery control unit 120*a* instructs the connection switch unit 131 to cause, among the plurality of batteries 90*a* including the output battery, all of the batteries 90*a* to be in the interrupted state, and the connection switch unit 131 switches all of the batteries 90*a* into the interrupted state (first processing, S3).

When performed the first processing (S3), the battery control unit 120*a* selects, on the basis of a remaining capacity detected by the BMU 123, the batteries 90*a* that can be selected as the output battery by the selector 122 to the batteries 90*a* whose remaining capacities are more than or equal to the first threshold value (S4) and selects, as the output battery from the batteries 90*a* selected to be selectable, the battery 90*a* designated by an operator by operating the selector 122, and switches the battery 90*a* into the connected state (S5). Specifically, the battery control unit 120*a* instructs the connection switch unit 131 to cause the battery 90*a* that is to be selected as the output battery to be in the connected state. The connection switch unit 131 switches the battery 90*a* into the connected state, and the controller 120 causes the battery 90*a* and the inverter 92*b* to be in a mutually connected state (second processing).

Next, after the second processing, the battery control unit 120*a* instructs the BMU 123 to start power supply to the electric motor 91 from the battery 90*a* that has been selected as the output battery and caused to be in the connected state. The BMU 123 controls opening-closing of the relay in the inside of the battery 90*a* and causes power supply of the output battery to be started (third processing, S6).

Thereafter, on the basis of the remaining capacity of the output battery detected by the BMU 123, the battery control unit 120*a* determines whether the remaining capacity of the output battery is less than the first threshold value (S7). When determined that the remaining capacity of the output battery is more than or equal to the first threshold value (S7, No), the battery control unit 120*a* proceeds to processing of S15.

When determined that the remaining capacity of the output battery is less than the first threshold value (S7, Yes), the battery control unit 120*a* determines, on the basis of the remaining capacity of the output battery detected by the BMU 123, whether there are the batteries 90*a* whose remaining capacities are more than or equal to the first threshold value (S8).

When determined that there are the batteries 90*a* whose remaining capacities are more than or equal to the first threshold value (S8, Yes), the battery control unit 120*a* causes a message to urge switching of the output battery to be displayed, as illustrated in FIG. 21B, in the vicinity of, for example, the indication 124*a*1 of the remaining capacity of the output battery in the display device 124*a* and causes the notification device 124 to issue a notification to urge switching of the output battery (S9).

Thereafter, the battery control unit 120*a* determines whether the unload valve 48 is at the interruption position 48*b* (S10). When determined that the unload valve 48 is not at the interruption position 48*b* (S10, No), the battery control unit 120*a* continues processing of S10 and monitors that the unload valve 48 is switched to the interruption position 48*b*.

When determined that the unload valve 48 is at the interruption position 48*b* (S10, Yes), the battery control unit 120*a* determines whether a predetermined time has elapsed since the unload valve 48 is switched to the interruption position 48*b* (S11). When determined that the predetermined time has not elapsed (S11, No), the battery control unit 120*a* continues processing of S11 and monitors that the predetermined time has elapsed. When determined that the predetermined time has elapsed (S11, Yes), the battery control unit 120*a* instructs the connection switch unit 131 to cause, among the plurality of batteries 90*a* including the output battery, all of the batteries 90*a* to be in the interrupted state, and the connection switch unit 131 switches all of the batteries 90*a* into the interrupted state (first processing, S12).

Next the selection unit 120*a*1 selects, as the output battery, any of the batteries 90*a* whose remaining capacities are more than or equal to the first threshold value in the battery unit 90. The battery control unit 120*a* instructs the connection switch unit 131 to cause the battery 90*a* selected by the selection unit 120*a*1 to be in the connected state as the output battery. The connection switch unit 131 switches the battery 90*a* to be in the connected state. The controller 120 causes the battery 90*a* and the inverter 92*b* to be in a mutually connected state (second processing, S13).

Next, the battery control unit 120*a* instructs the BMU 123 to start power supply to the electric motor 91 from the battery 90*a* that has been selected as the output battery and caused to be in the connected state. The BMU 123 controls opening-closing of the relay in the inside of the battery 90*a* and causes power supply of the output battery to be started (third processing, S14). Thereafter, the battery control unit 120*a* determines whether to end operation of the working machine 1 (S15). When determined not to end the operation (S15, No), the battery control unit 120*a* returns to processing of S7.

When determined to end the operation (S16, Yes), the battery control unit 120*a* ends a series of control relating to switching of the output battery and performs predetermined operation-stop processing. Determination of whether to end the operation of the working machine 1 may be performed on the basis of, for example, whether an engine stopping switch is operated. The aforementioned operation-stop processing may include, for example, processing of switching all of the batteries 90a into the interrupted state.

When the battery control unit 120a determines in S8 that there are no batteries 90a whose remaining capacities are more than or equal to the first threshold value (S8, No), as illustrated in FIG. 21C, the battery control unit 120a causes a message that it is not possible to switch the output battery to be displayed, for example, in the indication 124a3 of the display device 124a and/or in the vicinity of the indication 124a3, and causes the notification device 124 to issue a notification that switching the output battery is impossible and that urges charging (S16).

Next, the battery control unit 120a acquires a signal from the BMU 123 and determines whether charging processing is started (S17). When charging processing is started, the battery control unit 120a ends a series of control relating to switching of the output battery.

When charging processing is not started (S17, No), the battery control unit 120a determines, on the basis of the remaining capacity of the output battery detected by the BMU 123, whether the remaining capacity of the output battery is less than the second threshold value (S18). When determined that the remaining capacity of the output battery is less than the second threshold value (S18, No), the battery control unit 120a returns to processing of S16.

When the battery control unit 120a determines that the remaining capacity of the output battery is less than the second threshold value (S18, Yes), as illustrated in FIG. 21D, the battery control unit 120a causes a message that the output battery has no remaining capacity and a message to urge charging to be displayed in the indication 124a4 of the remaining capacities of the batteries 90a whose remaining capacities are less than the second threshold value and/or in the vicinity of the indication 124a4 (S19).

Thereafter, on the basis of the remaining capacity of the output battery detected by the BMU 123, the battery control unit 120a determines whether the remaining capacity of the output battery is zero (S20). When determined that the remaining capacity of the output battery is not zero (S20, No), the battery control unit 120a returns to processing of S16.

When determined that the remaining capacity of the output battery is zero (S20, Yes), the battery control unit 120a instructs the BMU 123 to stop power supply to the electric motor 91 from the battery 90a in the connected state as the output battery, and the BMU 123 controls opening-closing of the relay in the inside of the battery 90a and causes power supply of the output battery to be stopped (S21). That is, when the remaining capacity of the output battery is zero, the battery control unit 120a interrupts connection between the output battery and the power supply path (power supply line) 132 by controlling opening-closing of the relay.

Figure 21E:
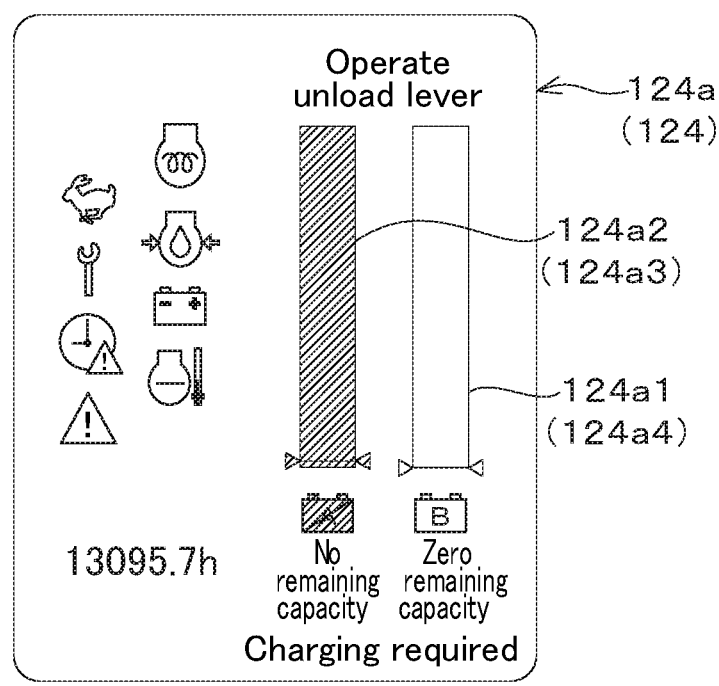
FIG. 21E is a fifth view illustrating a screen displayed on a display.

As illustrated in FIG. 21E, the battery control unit 120a causes the notification device 124 to issue a notification to urge operation of the unload operation actuator 5b (S22) and determines, on the basis of the remaining capacity of the output battery detected by the BMU 123, whether there are the batteries 90a whose remaining capacities are other than zero, that is, the batteries 90a whose remaining capacities are more than zero (S23). When determined that there are no batteries 90a whose remaining capacities are other than zero (S23, No), the battery control unit 120a ends a series of control relating to switching of the output battery.

When determined that there are the batteries 90a whose remaining capacities are other than zero (S23, Yes), the battery control unit 120a determines whether the unload valve 48 is at the interruption position 48b (S24). When determined that the unload valve 48 is not at the interruption position 48b (S24, No), the battery control unit 120a continues processing of S24 and monitors that the unload valve 48 is switched to the interruption position 48b.

When determined that the unload valve 48 is at the interruption position 48b (S24, Yes), the battery control unit 120a determines whether a predetermined time has elapsed since the unload valve 48 is switched to the interruption position 48b (S25). When determined that the predetermined time has not elapsed (S25, No), the battery control unit 120a continues processing of S11 and monitors that the predetermined time has elapsed. When determined that the predetermined time has elapsed (S25, Yes), the battery control unit 120a instructs the connection switch unit 131 to cause, among the plurality of batteries 90a including the output battery, all of the batteries 90a to be in the interrupted state, and the connection switch unit 131 switches all of the batteries 90a into the interrupted state (first processing, S26).

Next, on the basis of a remaining capacity detected by the BMU 123, the battery control unit 120a selects the batteries 90a that can be selected as the output battery by the selector 122 to the batteries whose remaining capacities are other than zero (S27), and selects, as the output battery from the batteries 90a selected to be selectable, the battery 90a that is designated by an operator by operating the selector 122, and switches the battery 90a into the connected state (S28). Specifically, the battery control unit 120a instructs the connection switch unit 131 to cause the battery 90a that is to be selected as the output battery to be in the connected state. The connection switch unit 131 switches the battery 90a into the connected state, and the controller 120 causes the battery 90a and the inverter 92b to be in a mutually connected state (second processing).

Next, after the second processing, the battery control unit 120a instructs the BMU 123 to start power supply to the electric motor 91 from the battery 90a that has been selected as the output battery and caused to be in the connected state. The BMU 123 controls opening-closing of the relay in the inside of the battery 90a and causes power supply of the output battery to be started (third processing, S29).

Thereafter, the battery control unit 120a determines whether to end operation of the working machine 1 (S30) and, when determined to end the operation (S30, Yes), ends a series of control relating to switching of the output battery, as in S15, and performs predetermined operation-stop processing. When determined not to end the operation (S30, No), the battery control unit 120a returns to processing of S16.

As illustrated in FIG. 11, the swiveling working machine 1 includes a first drive motor 30b that drives the fluid-cooler fan 30a, and a second drive motor 94b that drives the radiator fan 94a. The fluid-cooler fan 30a and the radiator fan 94a can be each independently driven separately from the electric motor 91. Hereinafter, control of the fluid-cooler fan 30a and the radiator fan 94a will be described.

As illustrated in FIG. 11, the first drive motor 30b and the second drive motor 94b are each connected to the controller 120. The controller 120 has a fan control unit 120b that controls driving of the first drive motor 30b and the second drive motor 94b. The fan control unit 120b controls each of the first drive motor 30b (radiator fan 94a) and the second drive motor 94b (fluid-cooler fan 30a) independently.

As illustrated in FIG. 11, the swiveling working machine 1 includes a water-temperature detector 126 and a fluid-temperature detector 127. The water-temperature detector 126 is a sensor that detects the temperature of cooling water (refrigerant) as a voltage value. The water-temperature detector 126 is provided in, for example, the sending water path 95*b* and detects the temperature of cooling water that flows toward the radiator 94. The water-temperature detector 126 is connected to the controller 120 in a wired or wireless manner and outputs, as a signal, detected temperature information of the cooling water to the controller 120.

The fluid-temperature detector 127 is a sensor that detects the temperature of a hydraulic fluid as a voltage value. The fluid-temperature detector 127 is provided in, for example, the second pipe line 42 and detects the temperature of the hydraulic fluid that flows toward the fluid cooler 30. The fluid-temperature detector 127 is connected to the controller 120 in a wired or wireless manner and outputs, as a signal, detected temperature information of the hydraulic fluid to the controller 120.

On the basis of the temperature of the cooling water detected by the water-temperature detector 126 and a previously set control map, the fan control unit 120*b* controls driving of the radiator fan 94*a* such that the temperature of the cooling water does not exceed a set temperature. When the temperature of the hydraulic fluid detected by the fluid-temperature detector 127 is less than a predetermined value, the fan control unit 120*b* stops driving of the fluid-cooler fan 30*a*. When the temperature of the hydraulic fluid detected by the fluid-temperature detector 127 is more than or equal to the predetermined value, the fan control unit 120*b* controls such that the temperature of the hydraulic fluid does not exceed a set temperature on the basis of the previously set control map.

As illustrated in FIG. 11, the operation device 5 has the rotation-speed operation actuator 5*c*, and the controller 120 has a rotation-speed control unit 120*c*. The rotation-speed operation actuator 5*c* receives an input of setting of a rotation speed range (the upper limit value and the lower limit value of the rotation speed) of the electric motor 91 from an operator. Specifically, a plurality of selectable rotation speed ranges are previously set, and an operator can select a desired rotation speed range by operating the rotation-speed operation actuator 5*c*.

The rotation-speed control unit 120*c* has a normal mode and an AI (automatic idle) mode. In the normal mode, the rotation-speed control unit 120*c* controls, within a rotation speed range set by using the rotation-speed operation actuator 5*c*, the rotation speed of the electric motor 91 in accordance with the load of the hydraulic pump P or consumed current of the electric motor 91, which changes in response to the operation state of the working device 20. In the AI mode, the rotation-speed control unit 120*c* controls the rotation speed of the electric motor 91 to a predetermined idling rotation speed (for example, 500 rpm) that is set to be lower than the lower limit value (for example, 1500 rpm) of the rotation speed settable by using the rotation-speed operation actuator 5*c*.

The rotation-speed control unit 120*c* switches between the normal mode and the AI mode on the basis of a current value detected by a current detector that detects the current (current value) of electric power output from the battery unit 90 or the inverter 92*b*. When the magnitude of the current value to be output by the battery unit 90 can be changed in accordance with the load of the electric motor 91, the current detector detects the current value output from the battery unit 90 or the inverter 92*b*. When the magnitude of the current value to be output by the battery unit 90 cannot be changed in accordance with the load of the electric motor 91, the current detector detects the current value output from the inverter 92*b*. The current detector is connected to the controller 120 in a wireless or wired manner to be capable of communicating with each other and outputs a detected current value to the controller 120.

In the present embodiment, the battery unit 90 can change the magnitude of a current value to be output. The current detector is a detector that detects the current value output from the battery unit 90 and is, for example, the BMU 123 provided in the battery unit 90.

For example, when the operation lever 5*a* is operated, the spools are moved by the operation, and the controlling valves V1 to V8 supply the hydraulic fluid of an amount in proportion to a moved amount of each of respective spools to the hydraulic equipment M to be controlled. Consequently, the load of the hydraulic pump P that delivers the hydraulic fluid is increased, and the current consumption amount of the electric motor 91 that drives the hydraulic pump P is increased. Thus, the battery unit 90 increases the magnitude of the current value to be output, and the current value detected by the BMU 123 is increased. In other words, when the amount of operation of the operation lever 5*a* from a neutral position is increased, the current value detected by the BMU 123 is increased.

When the operation lever 5*a* is operated from an operated state to the neutral position side, the operation amount of the operation lever 5*a* is decreased, which decreases the load of the hydraulic pump P and decreases the current consumption amount of the electric motor 91 that drives the hydraulic pump P. Thus, the battery unit 90 decreases the magnitude of the current value to be output, and the current value detected by the BMU 123 is decreased. In other words, when the amount of operation of the operation lever 5*a* from the neutral position is decreased, the current value detected by the BMU 123 is decreased.

In a case where the current detector detects the current value output from the inverter 92*b*, when the operation lever 5*a* is operated from the neutral position, that is, when the operation amount of the operation lever 5*a* is increased, the load of the hydraulic pump P is increased, and the current consumption amount of the electric motor 91 that drives the hydraulic pump P is increased. Thus, the inverter 92*b* increases the magnitude of the current value to be output, and the current value detected by the current detector is increased. In other words, when the amount of operation of the operation lever 5*a* from the neutral position is increased, the current value detected by the current detector is increased.

When the operation lever 5*a* is operated from an operated state to the neutral position side, the operation amount of the operation lever 5*a* is decreased, which decreases the load of the hydraulic pump P and decreases the current consumption amount of the electric motor 91 that drives the hydraulic pump P. Thus, the inverter 92*b* decreases the magnitude of the current value to be output, and the current value detected by the current detector is decreased. In other words, when the amount of operation of the operation lever 5*a* from the neutral position is decreased, the current value detected by the current detector is decreased.

Detailed description of switching between the normal mode and the AI mode of the rotation-speed control unit 120*c* is as follows. When the current value detected by the current detector (BMU 123) is more than or equal to a predetermined value (third threshold value), the rotation-speed control unit 120*c* sets a range of the motor rotation speed of the electric motor 91 in accordance with a setting operation with respect to the rotation-speed operation actuator 5c (normal mode). When the current value detected by the BMU 123 is less than the third threshold value, the rotation-speed control unit 120c switches to the AI mode and sets the motor rotation speed of the electric motor 91 to a predetermined idling rotation speed.

In detail, when the current value detected by the BMU 123 is less than the third threshold value, the rotation-speed control unit 120c sets, for a predetermined time (for example, three seconds, four seconds, or the like) since the current value became less than the third threshold value, the motor rotation speed of the electric motor 91 in accordance with a current value detected by the current detector within a range set by the rotation-speed operation actuator 5c. After a lapse of the predetermined time, the rotation-speed control unit 120c switches to the AI mode and sets the motor rotation speed of the electric motor 91 to the predetermined idling rotation speed. Specifically, when the detected current value is less than the third threshold value, the rotation-speed control unit 120c sets, for a predetermined time since the current value became the third threshold value, the motor rotation speed to the lower limit value of the range set by the rotation-speed operation actuator 5c. After a lapse of the predetermined time, the rotation-speed control unit 120c switches to the AI mode and sets the motor rotation speed of the electric motor 91 to an idling rotation speed that is a rotation speed lower than the lower limit value of the aforementioned range.

In other words, when the current value detected by the BMU 123 is less than a predetermined value in the normal mode, the rotation-speed control unit 120c maintains the normal mode for a predetermined time and switches to the AI mode after the lapse of the predetermined time.

When the current value detected by the BMU 123 is more than or equal to the predetermined value in the AI mode, the rotation-speed control unit 120c switches to the normal mode immediately. The third threshold value is a threshold value previously set and stored in the storage unit 121. The third threshold value is set on the basis of a current value of electric power output from the battery unit 90 or the inverter 92b when the operation lever 5a is not operated and the hydraulic equipment M (working device 20) is not operated. The third threshold value can be changed optionally by an external terminal that is connected to the controller 120 to be capable of communicating with each other and that is to be operated by a supervisor or an operator.

As illustrated in FIG. 1, the hydraulic circuit of the swiveling working machine 1 has a heating circuit H that performs heating of the inside of the protecting mechanism 80 by using, as a heat medium, the hydraulic fluid used in the hydraulic circuit. The heating circuit H has a heater 130, and the first pipe line 41 and the second pipe line 42 described above.

The heater 130 exchanges heat with the heat of the hydraulic fluid that flows in the fluid passage 40 and performs heating of the inside of the protecting mechanism 80. The heater 130 performs heat exchange between, of the fluid passage 40, a fluid passage in which the hydraulic fluid warmed by driving of the hydraulic pump P and the hydraulic equipment M flows and a medium such as peripheral air or the like. The heater 130 is provided at, of the hydraulic circuit, the fluid passage 40 that is provided either one of the first pipe line 41 and the second pipe line 42 and that differs from at least the fluid passage 40 in which the hydraulic fluid cooled (whose heat is removed) by the fluid cooler 30 flows. In the present embodiment, the heater 130 is provided at a mid portion of the second pipe line 42. The second pipe line 42 includes a first part 42a in which the hydraulic fluid discharged from the hydraulic equipment M is caused to flow to the heater 130, and a second part 42b in which the hydraulic fluid discharged from the heater 130 is caused to flow to the radiator 94.

As illustrated in FIG. 1, the heater 130 has a heat exchange portion 130a and a blower fan 130b. The heat exchange portion 130a is a part in the inside of which the hydraulic fluid flows and exchanges heat with a medium such as peripheral air or the like. In the present embodiment, the heat exchange portion 130a is a plurality of fins. The plurality of fins 130a are directed in a predetermined direction and disposed parallel to each other with a predetermined space therebetween. The insides of the plurality of fins 130a are hollow, and the insides of the plurality of fins 130a are in communication with each other from the fin on one end side toward the fin on the other end side. In other words, the hydraulic fluid supplied from the first part 42a flows into the fin on the one end side, and the hydraulic fluid flows toward the fin on the other end side through the insides of the fins at a mid portion. The hydraulic fluid supplied to the fin on the other end side is discharged to the second part 42b.

The blower fan 130b is a fan that is electrically driven and that sends air. The blower fan 130b sends air from the heater 130 to the inside of the protecting mechanism 80. Specifically, the blower fan 130b sends the air around the plurality of fins 130a to the inside of the protecting mechanism 80. Consequently, heating of the inside of the protecting mechanism 80 can be performed by sending, to the inside of the protecting mechanism 80, the air that has exchanged heat with the hydraulic fluid via the plurality of fins 130a and that has been heated.

The swiveling working machine 1 can perform heating of the inside of the protecting mechanism 80 separately from the heater 130. Specifically, at least one of the first pipe line 41 and the second pipe line 42 is routed on the outer side or the inner side of the protecting mechanism 80 and exchanges heat with air around the first pipe line 41 and the second pipe line 42, thereby performing heating of the inside of the protecting mechanism 80. In the present embodiment, the first pipe line 41 is routed on the lower side of a floor material (step) inside the protecting mechanism 80, on the lower side of the operator seat 8, and the like, and air with which heat has been exchanged flows into the inside of the protecting mechanism 80 through a hole, such as a slit, formed in the floor material. The hole formed in the floor material may have an operable shutter member and may be optionally switchable between a communicated state in which the periphery of the first pipe line 41 and the inside of the protecting mechanism 80 are in communication with each other and an interrupted state in which communication thereof is interrupted. Alternatively, a configuration in which a fan that sends air is provided around the first pipe line 41 and the second pipe line 42 and in which heat-exchanged warm air around the first pipe line 41 and the second pipe line 42 is sent to the inside of the protecting mechanism 80 may be employed.

As illustrated in FIG. 1, the hydraulic circuit may include a bypass pipe line 50 that is provided at at least one of the first pipe line 41 and the second pipe line 42 and that is routed in the inside of the protecting mechanism 80 and performs heating of the inside of the protecting mechanism 80, as long as the hydraulic circuit can perform heating of the inside of the protecting mechanism 80 by using the hydraulic fluid as a medium. The bypass pipe line 50 is a fluid passage whose mid portion is routed in the inside of the protecting mechanism 80. The bypass pipe line 50 branches off from, for example, a part (third part) of the first pipe line 41 near the hydraulic pump P and joins a part (fourth part) of the first pipe line 41 near the hydraulic equipment M.

At a branch point where the bypass pipe line 50 branches off from the first pipe line 41, an operation valve 51 is provided. The operation valve 51 is, for example, a two-position switching valve with a solenoid valve and is switched between a first position and a second position by energizing or deenergizing the solenoid of the solenoid valve. The first position is a position where the hydraulic fluid that flows from the first pipe line 41 to the bypass pipe line 50 is restricted while the hydraulic fluid that flows from the third part to the fourth part of the first pipe line 41 is allowed. The second position is a position where the hydraulic fluid that flows from the first pipe line 41 to the bypass pipe line 50 is allowed while the hydraulic fluid that flows from the third part to the fourth part of the first pipe line 41 is restricted. That is, when the operation valve 51 is positioned at the first position, the hydraulic fluid is not caused to flow in the bypass pipe line 50, and heating of the inside of the protecting mechanism 80 is not performed (non-heating state). When the operation valve 51 is positioned at the second position, the hydraulic fluid is caused to flow in the bypass pipe line 50, and heating of the inside of the protecting mechanism 80 is performed (heating state).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

In the above-described embodiment, an example in which the present invention is applied to a swiveling working machine, such as a backhoe, has been described; however, application targets of the present invention are not limited thereto. For example, the present invention may be applied to the other construction machinery including a wheel loader, a compact track loader, a skid steer loader, and the like and may be applied to agricultural machinery including a tractor, a combine, a rice transplanter, a lawn mower, and the like.

What is claimed is:

1. A swiveling working machine comprising:
   a swivel base;
   a working device provided on a front side of the swivel base;
   a battery unit;
   an electric motor that is driven by electric power output by the battery unit; and
   a hydraulic pump that delivers a hydraulic fluid by driving of the electric motor,
   wherein the battery unit is disposed at a rear portion of the swivel base, and
   wherein the electric motor and the hydraulic pump are disposed sideward of the battery unit side by side in a front-rear direction.

2. The swiveling working machine according to claim 1,
   wherein the swivel base is rotatable around a swiveling axis extending in an up-down direction, and
   wherein the battery unit, the electric motor, and the hydraulic pump are disposed rearward of the swiveling axis.

3. The swiveling working machine according to claim 2, comprising:
   a lower traveling body that supports the swivel base rotatably around the swiveling axis and that is capable of traveling,
   wherein a rear portion of the battery unit is positioned rearward of a rear end portion of the lower traveling body.

4. The swiveling working machine according to claim 1, comprising:
   a cooling mechanism that is disposed sideward of the battery unit and above the hydraulic pump and the electric motor and that cools the hydraulic fluid and the electric motor.

5. The swiveling working machine according to claim 4, comprising:
   a cover that covers the battery unit, the electric motor, and the hydraulic pump,
   wherein the cooling mechanism discharges air outwardly in a width direction from a space defined by the cover.

6. The swiveling working machine according to claim 1, comprising:
   a lower traveling body that supports the swivel base rotatably around a swiveling axis and that is capable of traveling;
   a cover that covers the battery unit, the electric motor, and the hydraulic pump; and
   a support frame that is provided at the swivel base and that supports the cover,
   wherein a rear portion of the support frame is positioned rearward of a rear portion of the lower traveling body.

7. The swiveling working machine according to claim 6, comprising:
   a protecting mechanism that is provided on the swivel base and that protects an operator seat,
   wherein the protecting mechanism is supported by the support frame.

8. The swiveling working machine according to claim 1, comprising:
   a hydraulic-fluid tank that stores a hydraulic fluid;
   hydraulic equipment that is driven by the hydraulic fluid delivered by the hydraulic pump; and
   a controlling valve that is mounted on the swivel base and that regulates the hydraulic fluid delivered by the hydraulic pump and controls the hydraulic equipment,
   wherein the hydraulic-fluid tank and the controlling valve are disposed forward of the battery unit.

9. The swiveling working machine according to claim 8, comprising:
   a protecting mechanism that is provided on the swivel base and protects an operator seat,
   wherein a position of a center of gravity of the battery unit is disposed on one side with respect to a center line of the swivel base in a width direction, the protecting mechanism is disposed on the one side with respect to the center line and forward of the battery unit, and the controlling valve is disposed on the one side with respect to the center line and below the protecting mechanism, and
   wherein the electric motor and the hydraulic pump are disposed on another side with respect to the center line and sideward of the battery unit, and the hydraulic-fluid tank is disposed on the other side with respect to the center line and forward of the electric motor and the hydraulic pump.

10. The swiveling working machine according to claim 1,
    wherein a position of a center of gravity of the battery unit is disposed on one side with respect to a center line of the swivel base in a width direction, and
    wherein the working device is disposed on another side with respect to the center line.

11. The swiveling working machine according to claim 1, comprising:
   a radiator fan that cools a radiator; and
   a fluid-cooler fan that cools a fluid cooler separately from the radiator fan.

12. The swiveling working machine according to claim 11, comprising:
   a controller that controls driving of the radiator fan and driving of the fluid-cooler fan,
   wherein the controller controls each of the radiator fan and the fluid-cooler fan independently.

13. The swiveling working machine according to claim 1,
   wherein the battery unit includes a plurality of batteries connected in parallel to each other,
   wherein the swiveling working machine comprises
      a controller that selects, among the plurality of batteries, an output battery that supplies electric power to the electric motor, and
      a connection switch unit that switches, for each of the batteries, a power supply path from the battery to the electric motor between a connected state and an interrupted state, and
   wherein the controller performs
      first processing of causing each of the batteries to be in the interrupted state when selecting the output battery,
      second processing of, after the first processing, causing a battery that is to be selected as the output battery to be in the connected state, and
      third processing of, after the second processing, causing the battery selected as the output battery to start power supply to the electric motor.

14. An electric working machine comprising:
   an electric motor;
   a battery unit that supplies electric power to the electric motor;
   a hydraulic pump that is driven by the electric motor and delivers a hydraulic fluid;
   hydraulic equipment that is driven by the hydraulic fluid; and
   a working device that is operated by the hydraulic equipment,
   wherein the battery unit includes a plurality of batteries connected in parallel to each other,
   wherein the electric working machine comprises
      a controller that selects, among the plurality of batteries, an output battery that supplies electric power to the electric motor, and
      a connection switch unit that switches, for each of the batteries, a power supply path from the battery to the electric motor between a connected state and an interrupted state, and
   wherein the controller performs
      first processing of causing each of the batteries to be in the interrupted state when selecting the output battery,
      second processing of, after the first processing, causing a battery that is to be selected as the output battery to be in the connected state, and
      third processing of, after the second processing, causing the battery selected as the output battery to start power supply to the electric motor.

* * * * *